US012724858B2

(12) United States Patent
Ishii et al.

(10) Patent No.: US 12,724,858 B2
(45) Date of Patent: Sep. 1, 2026

(54) NFT ISSUING METHOD, COMPUTER, AND COMPUTER-READABLE MEDIUM

(71) Applicant: Wacom Co., Ltd., Saitama (JP)

(72) Inventors: Ryoji Ishii, Saitama (JP); Joss Daniel Giffard-Burley, Frome (GB); Avinav Khanal, Dusseldorf (DE)

(73) Assignee: Wacom Co., Ltd., Saitama (JP)

( * ) Notice: Subject to any disclaimer, the term of this patent is extended or adjusted under 35 U.S.C. 154(b) by 98 days.

(21) Appl. No.: 18/652,679

(22) Filed: May 1, 2024

(65) Prior Publication Data

US 2024/0281803 A1 Aug. 22, 2024

Related U.S. Application Data

(63) Continuation of application No. PCT/JP2022/040402, filed on Oct. 28, 2022.

(30) Foreign Application Priority Data

Nov. 5, 2021 (JP) ................................ 2021-181352

(51) Int. Cl.
*G06F 21/16* (2013.01)
*G06F 21/10* (2013.01)
(Continued)

(52) U.S. Cl.
CPC .......... *G06F 21/16* (2013.01); *G06F 21/1014* (2023.08); *G06F 21/64* (2013.01); *H04L 9/3247* (2013.01); *H04L 2209/608* (2013.01)

(58) Field of Classification Search
CPC ............ G06F 21/16; G06F 21/64–645; H04N 1/32144–32352
See application file for complete search history.

(56) References Cited

U.S. PATENT DOCUMENTS

2002/0019743 A1 2/2002 Nakamura
2003/0235411 A1* 12/2003 Morikawa ............... G03B 7/02 396/281

(Continued)

FOREIGN PATENT DOCUMENTS

JP 2002041058 A 2/2002
JP 6404435 B1 10/2018
JP 2020068388 A 4/2020

OTHER PUBLICATIONS

English Translation of International Search Report, mailed Dec. 6, 2022, for PCT Patent Application No. PCT/JP2022/040402. (2 pages).

(Continued)

*Primary Examiner* — Jay Huang

(74) *Attorney, Agent, or Firm* — Seed Intellectual Property Law Group LLP

(57) ABSTRACT

An NFT (Non-Fungible Token) issuing method according to the present disclosure includes receiving a selection of a first artwork in which a watermark is embedded, authenticating, in reference to the watermark and information concerning a user who selects the first artwork, whether or not the user is an artist of the first artwork, and generating a first NFT indicating the first artwork when the authenticating succeeds. Embodiments of the present disclosure can prevent NFT conversion of a digital artwork by a person who does not have a legitimate right.

18 Claims, 37 Drawing Sheets

(51) Int. Cl.

*G06F 21/64* (2013.01)
*H04L 9/32* (2006.01)

(56) References Cited

U.S. PATENT DOCUMENTS

| | | | | |
|---|---|---|---|---|
| 2005/0069129 | A1* | 3/2005 | Ho | G06T 1/0028 713/193 |
| 2007/0253592 | A1* | 11/2007 | Sun | H04L 9/3247 382/100 |
| 2013/0022230 | A1* | 1/2013 | Tadano | G06F 21/16 382/100 |
| 2018/0068091 | A1* | 3/2018 | Gaidar | G06F 21/16 |
| 2021/0256070 | A1* | 8/2021 | Tran | G06F 16/9536 |
| 2021/0390161 | A1 | 12/2021 | Nakadaira et al. | |
| 2022/0239495 | A1* | 7/2022 | Norton | H04L 9/0825 |

OTHER PUBLICATIONS

World Wide Web Consortium (W3C), "Decentralized Identifiers (DIDs) v1.0," Jul. 19, 2022, URL=https://www.w3.org/TR/did-core/, retrieved Apr. 15, 2024. (113 pages).

World Wide Web Consortium (W3C), "Verifiable Credentials Data Model v1.0," Jul. 19, 2018, URL=https://www.w3.org/TR/vc-data-model/, retrieved on Apr. 15, 2024. (55 pages).

* cited by examiner

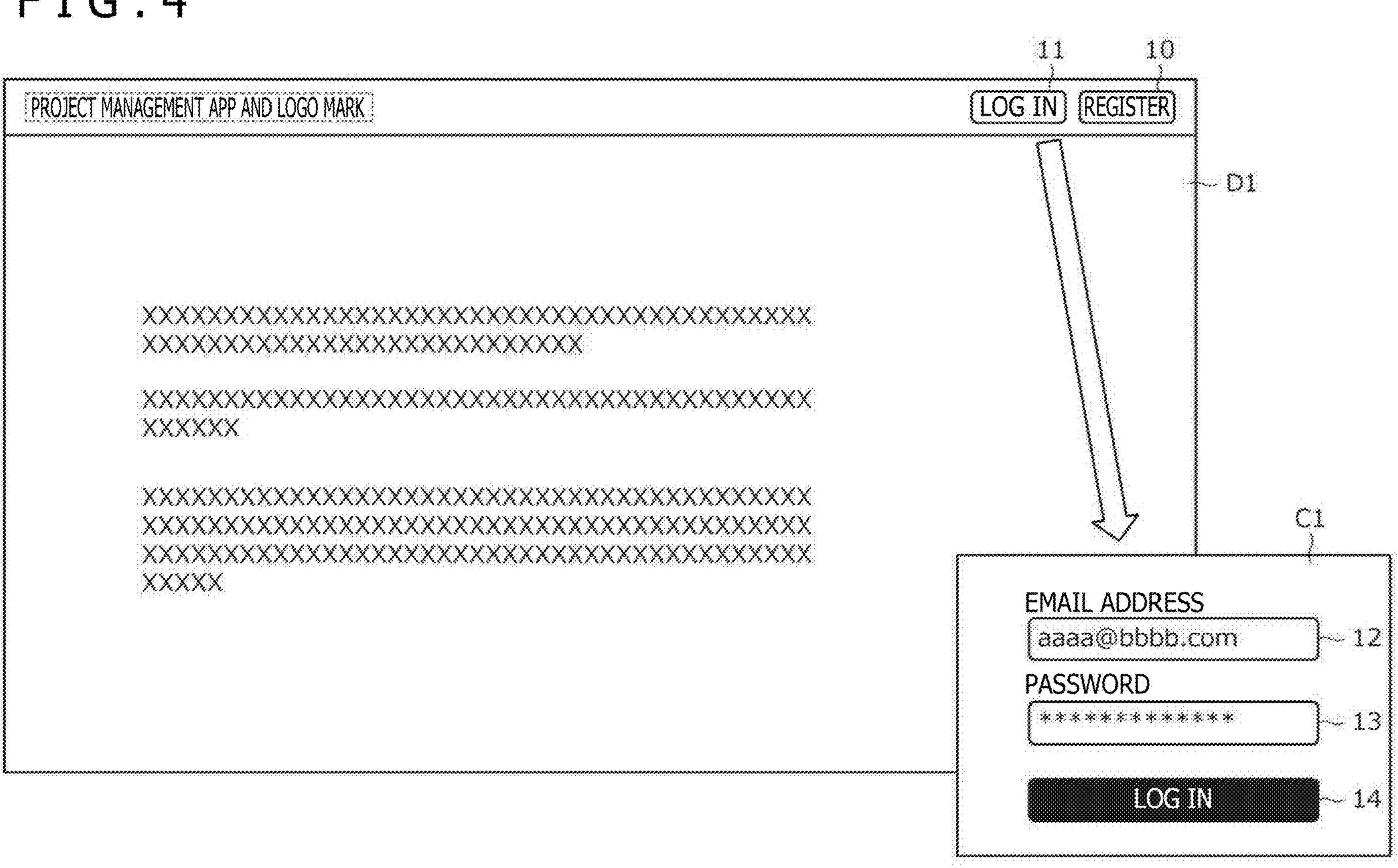
F I G . 4
PROJECT MANAGEMENT APP AND LOGO MARK
11
10
LOG IN
REGISTER
D1
C1
EMAIL ADDRESS
aaaa@bbbb.com
12
PASSWORD
13
LOG IN
14

D2s
D2m
LOGO MARK
PROJECT
USAGE APPLICATION
20
USAGE RIGHT CERTIFICATE
21
PROJECT
22
D2
D3
NEW PROJECT
23
TARO TOKKYO

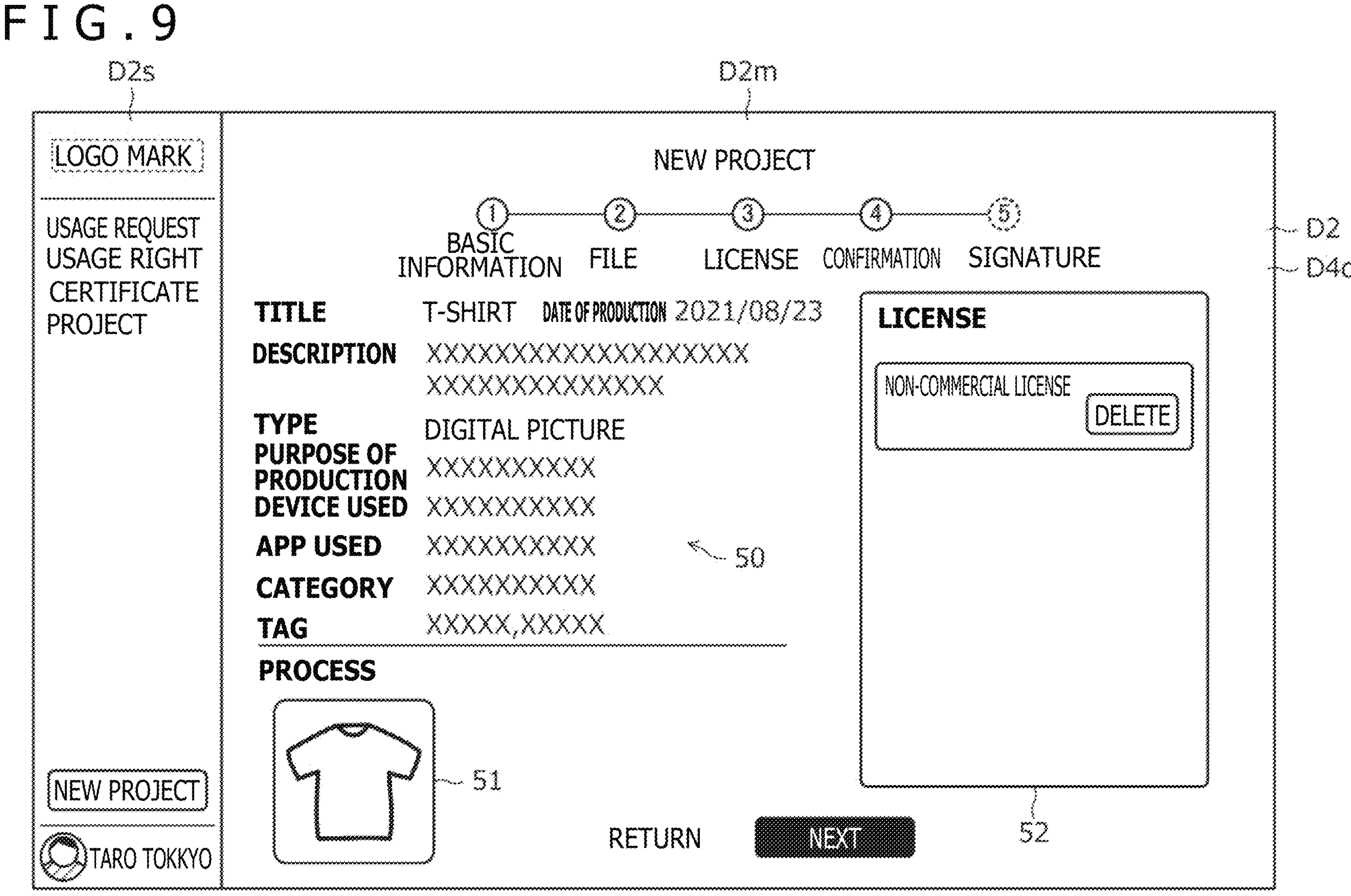
FIG. 9
D2s
D2m
D2
D4d
LOGO MARK
USAGE REQUEST
USAGE RIGHT
CERTIFICATE
PROJECT
NEW PROJECT
TARO TOKKYO
NEW PROJECT
1 BASIC INFORMATION
2 FILE
3 LICENSE
4 CONFIRMATION
5 SIGNATURE
TITLE
T-SHIRT
DATE OF PRODUCTION 2021/08/23
DESCRIPTION
XXXXXXXXXXXXXXXXXXX
XXXXXXXXXXXXXX
TYPE
DIGITAL PICTURE
PURPOSE OF PRODUCTION
XXXXXXXXXX
DEVICE USED
XXXXXXXXXX
APP USED
XXXXXXXXXX
CATEGORY
XXXXXXXXXX
TAG
XXXXX,XXXXX
PROCESS
50
51
52
LICENSE
NON-COMMERCIAL LICENSE
DELETE
RETURN
NEXT

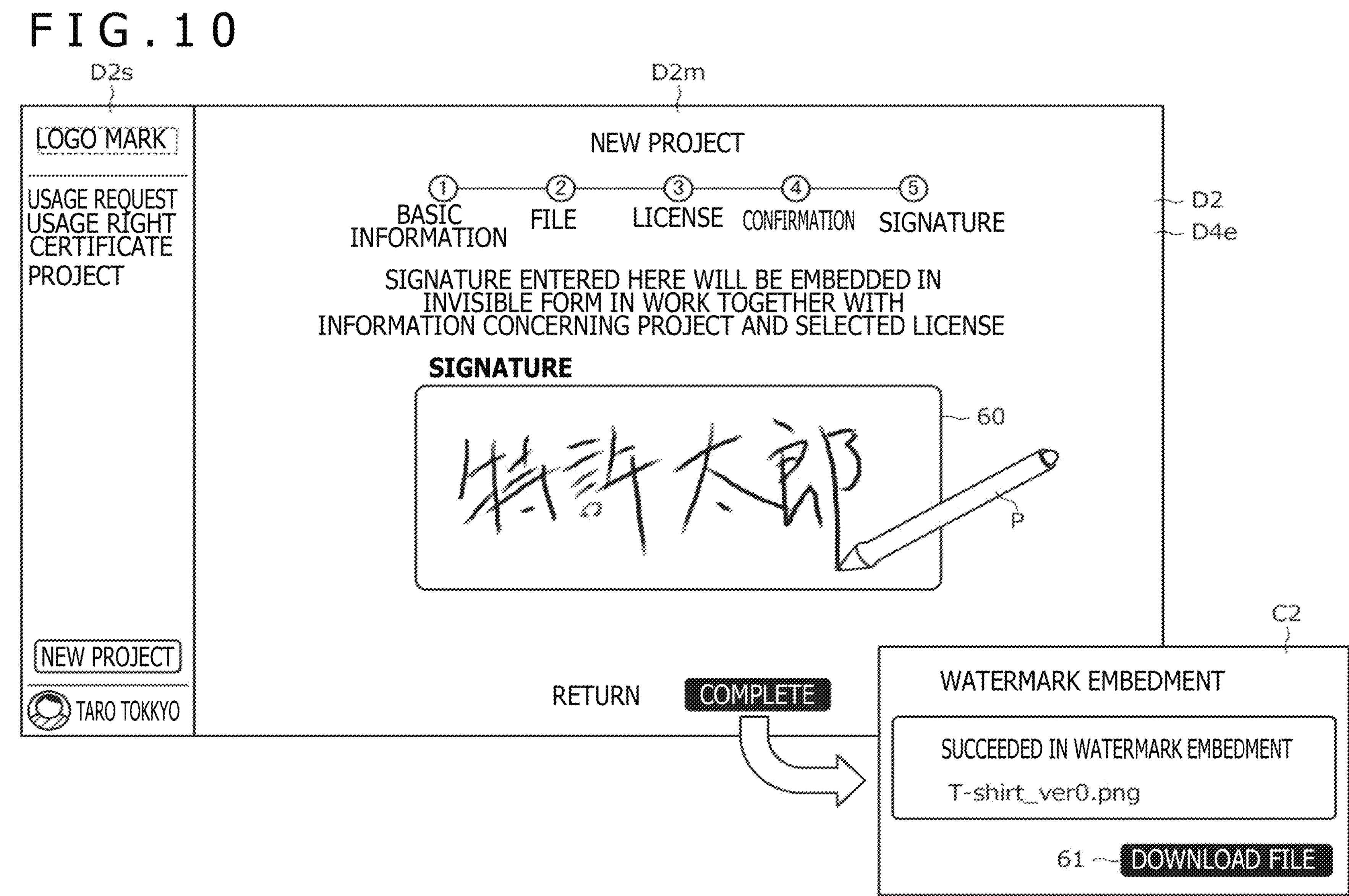
FIG. 10
D2s
D2m
LOGO MARK
USAGE REQUEST
USAGE RIGHT
CERTIFICATE
PROJECT
NEW PROJECT
TARO TOKKYO
NEW PROJECT
① BASIC INFORMATION
② FILE
③ LICENSE
④ CONFIRMATION
⑤ SIGNATURE
D2
D4e
SIGNATURE ENTERED HERE WILL BE EMBEDDED IN INVISIBLE FORM IN WORK TOGETHER WITH INFORMATION CONCERNING PROJECT AND SELECTED LICENSE
SIGNATURE
特許太郎
60
P
RETURN
COMPLETE
C2
WATERMARK EMBEDMENT
SUCCEEDED IN WATERMARK EMBEDMENT
T-shirt_ver0.png
61
DOWNLOAD FILE

FIG. 12

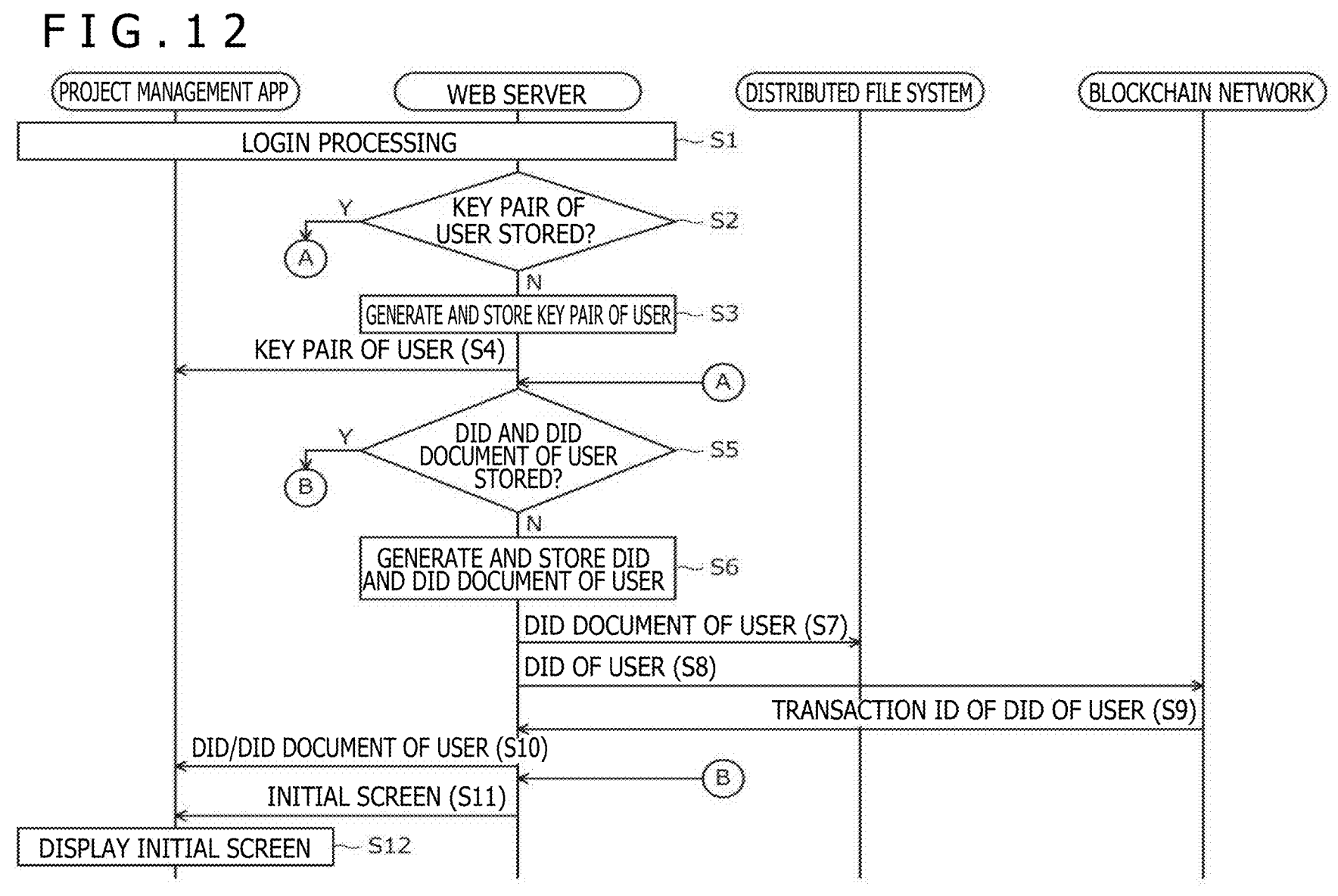

PROJECT MANAGEMENT APP

WEB SERVER

DISTRIBUTED FILE SYSTEM

BLOCKCHAIN NETWORK

LOGIN PROCESSING

S1

KEY PAIR OF USER STORED?

S2

Y

N

A

GENERATE AND STORE KEY PAIR OF USER

S3

KEY PAIR OF USER (S4)

A

DID AND DID DOCUMENT OF USER STORED?

S5

Y

N

B

GENERATE AND STORE DID AND DID DOCUMENT OF USER

S6

DID DOCUMENT OF USER (S7)

DID OF USER (S8)

TRANSACTION ID OF DID OF USER (S9)

DID/DID DOCUMENT OF USER (S10)

B

INITIAL SCREEN (S11)

DISPLAY INITIAL SCREEN

S12

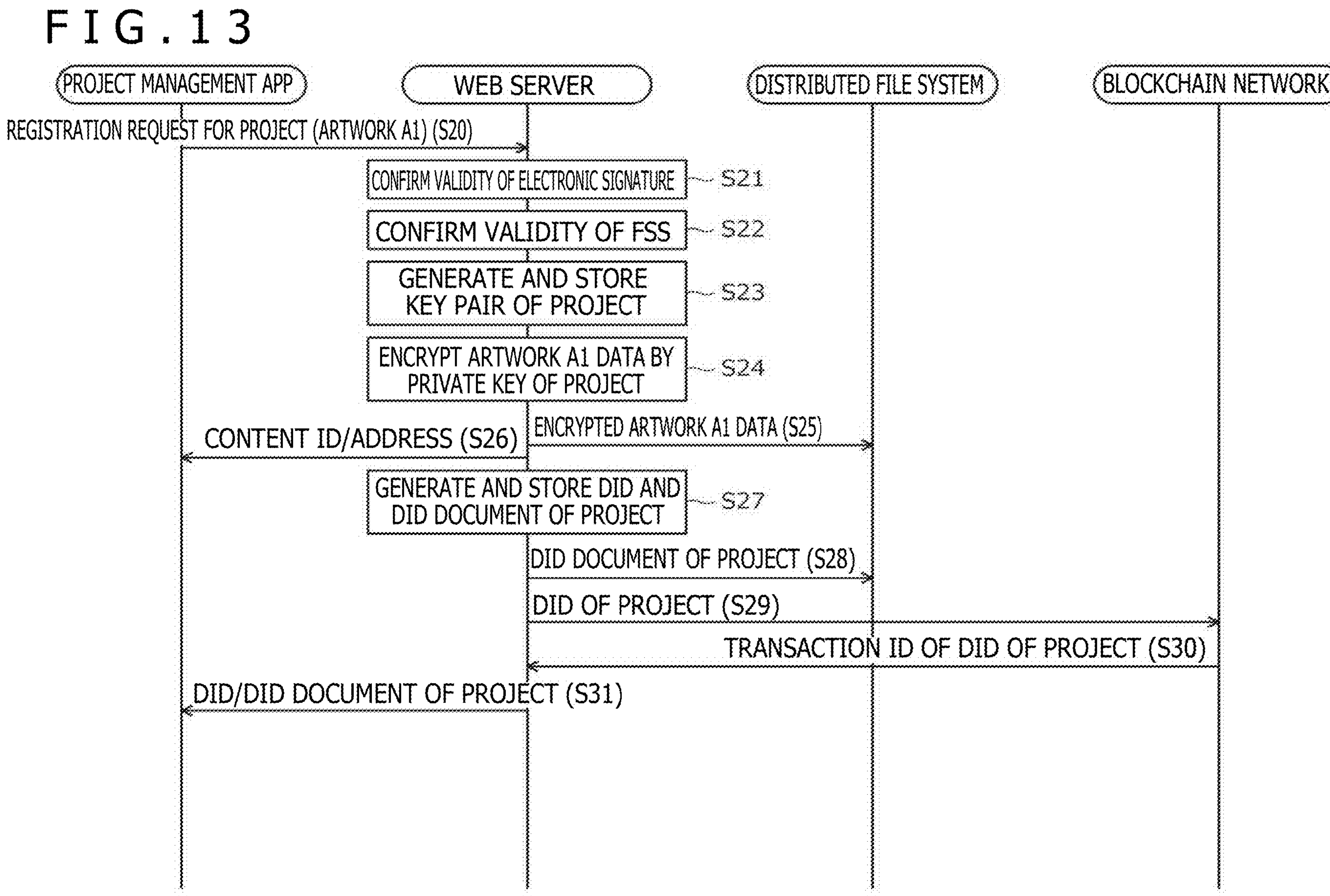
FIG. 13
PROJECT MANAGEMENT APP
WEB SERVER
DISTRIBUTED FILE SYSTEM
BLOCKCHAIN NETWORK
REGISTRATION REQUEST FOR PROJECT (ARTWORK A1) (S20)
CONFIRM VALIDITY OF ELECTRONIC SIGNATURE
S21
CONFIRM VALIDITY OF FSS
S22
GENERATE AND STORE KEY PAIR OF PROJECT
S23
ENCRYPT ARTWORK A1 DATA BY PRIVATE KEY OF PROJECT
S24
CONTENT ID/ADDRESS (S26)
ENCRYPTED ARTWORK A1 DATA (S25)
GENERATE AND STORE DID AND DID DOCUMENT OF PROJECT
S27
DID DOCUMENT OF PROJECT (S28)
DID OF PROJECT (S29)
TRANSACTION ID OF DID OF PROJECT (S30)
DID/DID DOCUMENT OF PROJECT (S31)

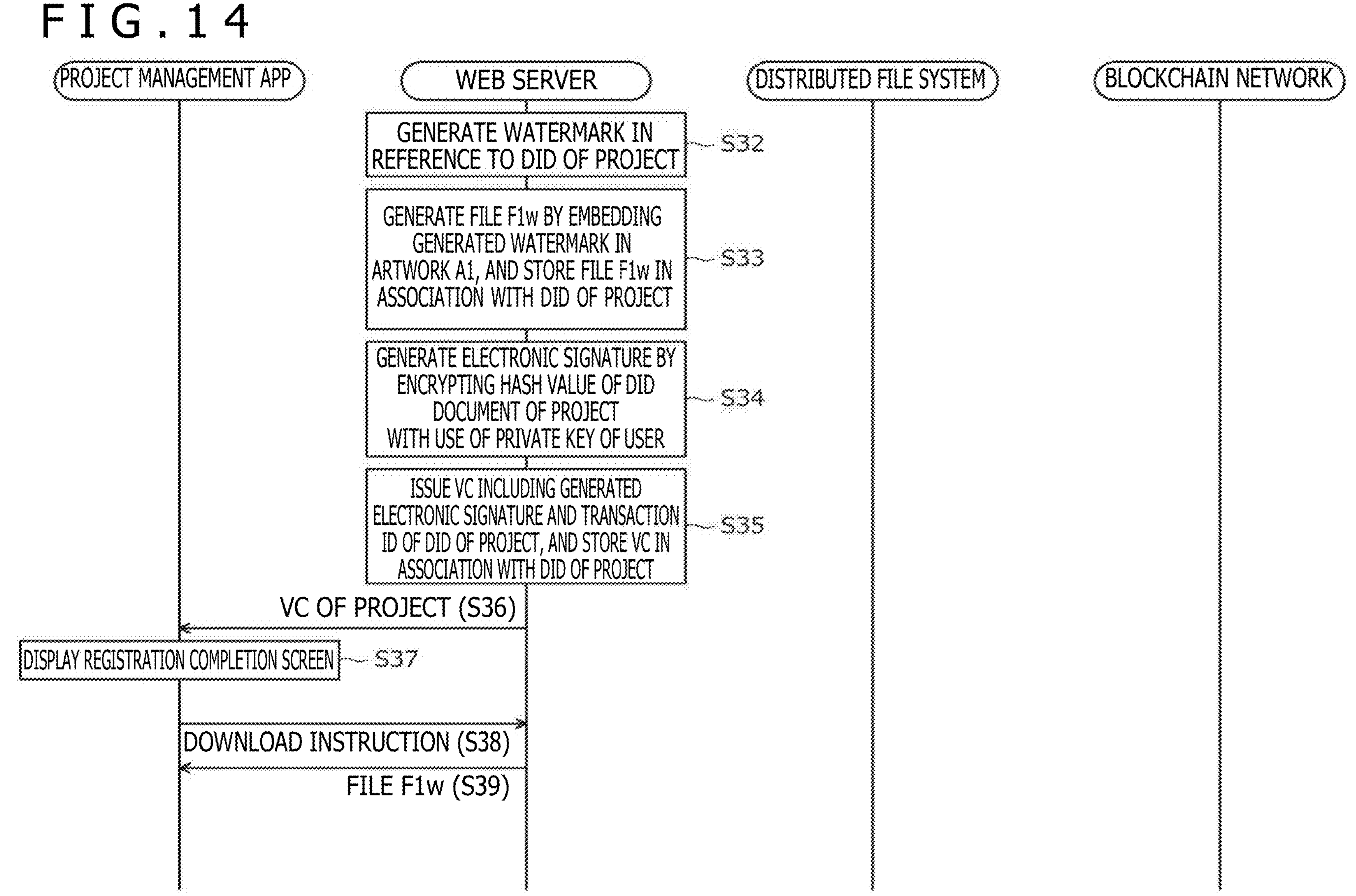
FIG. 14
PROJECT MANAGEMENT APP
WEB SERVER
DISTRIBUTED FILE SYSTEM
BLOCKCHAIN NETWORK
GENERATE WATERMARK IN REFERENCE TO DID OF PROJECT
S32
GENERATE FILE F1w BY EMBEDDING GENERATED WATERMARK IN ARTWORK A1, AND STORE FILE F1w IN ASSOCIATION WITH DID OF PROJECT
S33
GENERATE ELECTRONIC SIGNATURE BY ENCRYPTING HASH VALUE OF DID DOCUMENT OF PROJECT WITH USE OF PRIVATE KEY OF USER
S34
ISSUE VC INCLUDING GENERATED ELECTRONIC SIGNATURE AND TRANSACTION ID OF DID OF PROJECT, AND STORE VC IN ASSOCIATION WITH DID OF PROJECT
S35
VC OF PROJECT (S36)
DISPLAY REGISTRATION COMPLETION SCREEN
S37
DOWNLOAD INSTRUCTION (S38)
FILE F1w (S39)

FIG.15A

| | |
|---|---|
| USER INFORMATION | : NAME, PHOTOGRAPH, EMAIL ADDRESS, AND LIKE |
| PUBLIC KEY | : PUBLIC KEY OF USER |

DID DOCUMENT OF USER

FIG.15B

| | |
|---|---|
| ARTIST | : DID OF USER |
| SIGNATURE | : HASH VALUE OF FSS OF USER |
| STORAGE LOCATION | : ADDRESS OF ENCRYPTED ARTWORK A1 DATA |
| PUBLIC KEY | : PUBLIC KEY OF PROJECT |
| METADATA | : METADATA OF PROJECT |

DID DOCUMENT OF PROJECT

FIG.15C

| | |
|---|---|
| ISSUANCE DATE AND TIME | : 0000/00/00 00:00:00 |
| ISSUER | : DID OF USER |
| ELECTRONIC SIGNATURE OF ISSUER | : ELECTRONIC SIGNATURE GENERATED BY ENCRYPTING HASH VALUE OF DID DOCUMENT OF PROJECT BY PRIVATE KEY OF USER |
| TRANSACTION ID | : TRANSACTION ID OF DID OF PROJECT |

VC OF PROJECT

D2s
D2m
LOGO MARK
USAGE REQUEST
USAGE RIGHT CERTIFICATE
PROJECT
T-SHIRT
NEW PROJECT
TARO TOKKYO
T-SHIRT
D2
D5
DETAILS F
FILE HI
2021/0
ICENSE
SHARING
N-COMMERCIAL LICENSE
EDIT
PLEASE DRAG AND DROP FILE, OR CLICK BUTTON TO SELECT FILE
SELECT FROM COMPUTER
71
70
CANCEL
NEXT
C3

FIG. 17

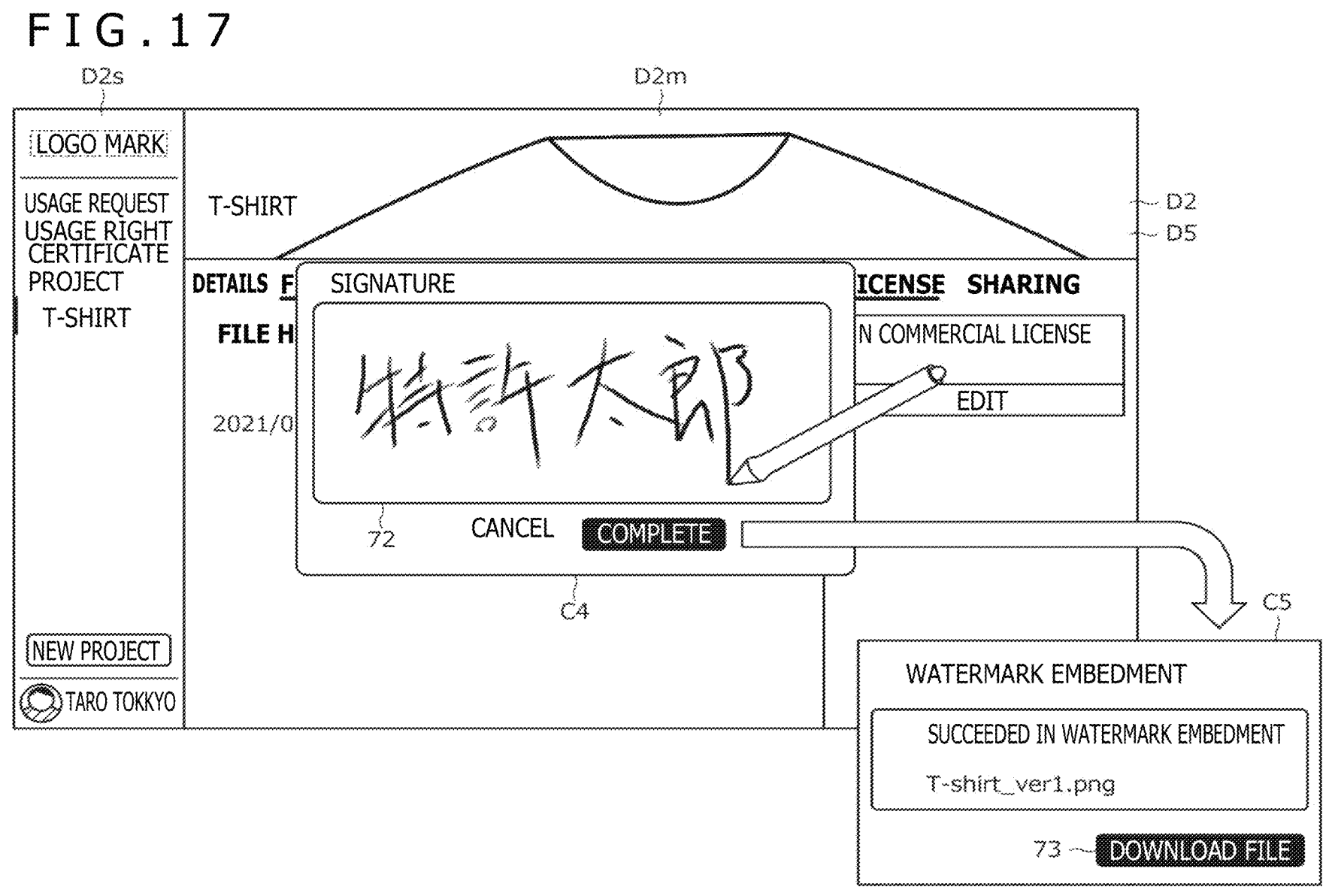

D2s
LOGO MARK
USAGE REQUEST
USAGE RIGHT CERTIFICATE
PROJECT
T-SHIRT
NEW PROJECT
TARO TOKKYO

D2m
D2
D5
T-SHIRT
DETAILS F
FILE H
2021/0
ICENSE SHARING
N COMMERCIAL LICENSE
EDIT

SIGNATURE
72
CANCEL
COMPLETE
C4

C5
WATERMARK EMBEDMENT
SUCCEEDED IN WATERMARK EMBEDMENT
T-shirt_ver1.png
DOWNLOAD FILE
73

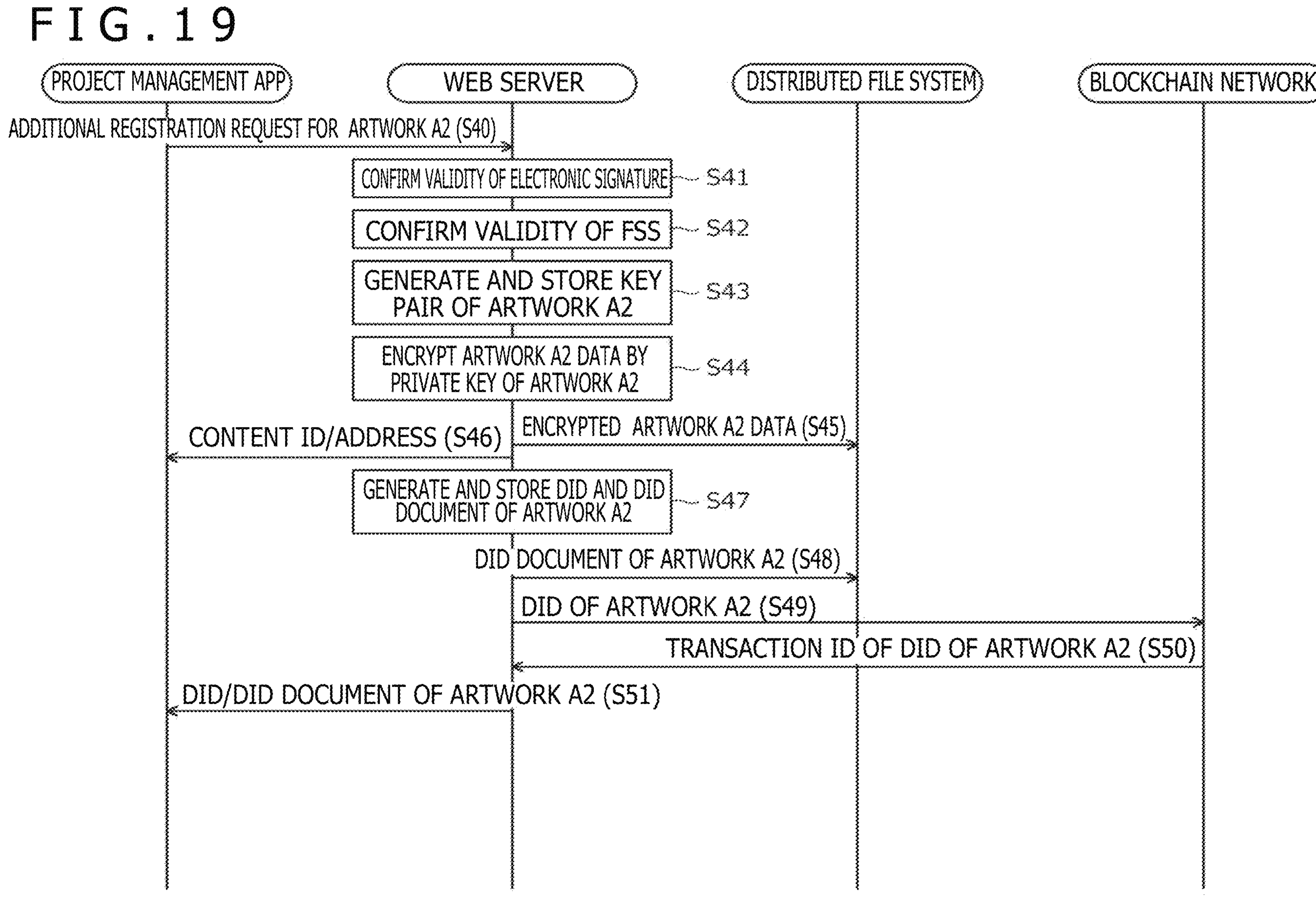
FIG. 19
PROJECT MANAGEMENT APP
WEB SERVER
DISTRIBUTED FILE SYSTEM
BLOCKCHAIN NETWORK
ADDITIONAL REGISTRATION REQUEST FOR ARTWORK A2 (S40)
CONFIRM VALIDITY OF ELECTRONIC SIGNATURE
S41
CONFIRM VALIDITY OF FSS
S42
GENERATE AND STORE KEY PAIR OF ARTWORK A2
S43
ENCRYPT ARTWORK A2 DATA BY PRIVATE KEY OF ARTWORK A2
S44
ENCRYPTED ARTWORK A2 DATA (S45)
CONTENT ID/ADDRESS (S46)
GENERATE AND STORE DID AND DID DOCUMENT OF ARTWORK A2
S47
DID DOCUMENT OF ARTWORK A2 (S48)
DID OF ARTWORK A2 (S49)
TRANSACTION ID OF DID OF ARTWORK A2 (S50)
DID/DID DOCUMENT OF ARTWORK A2 (S51)

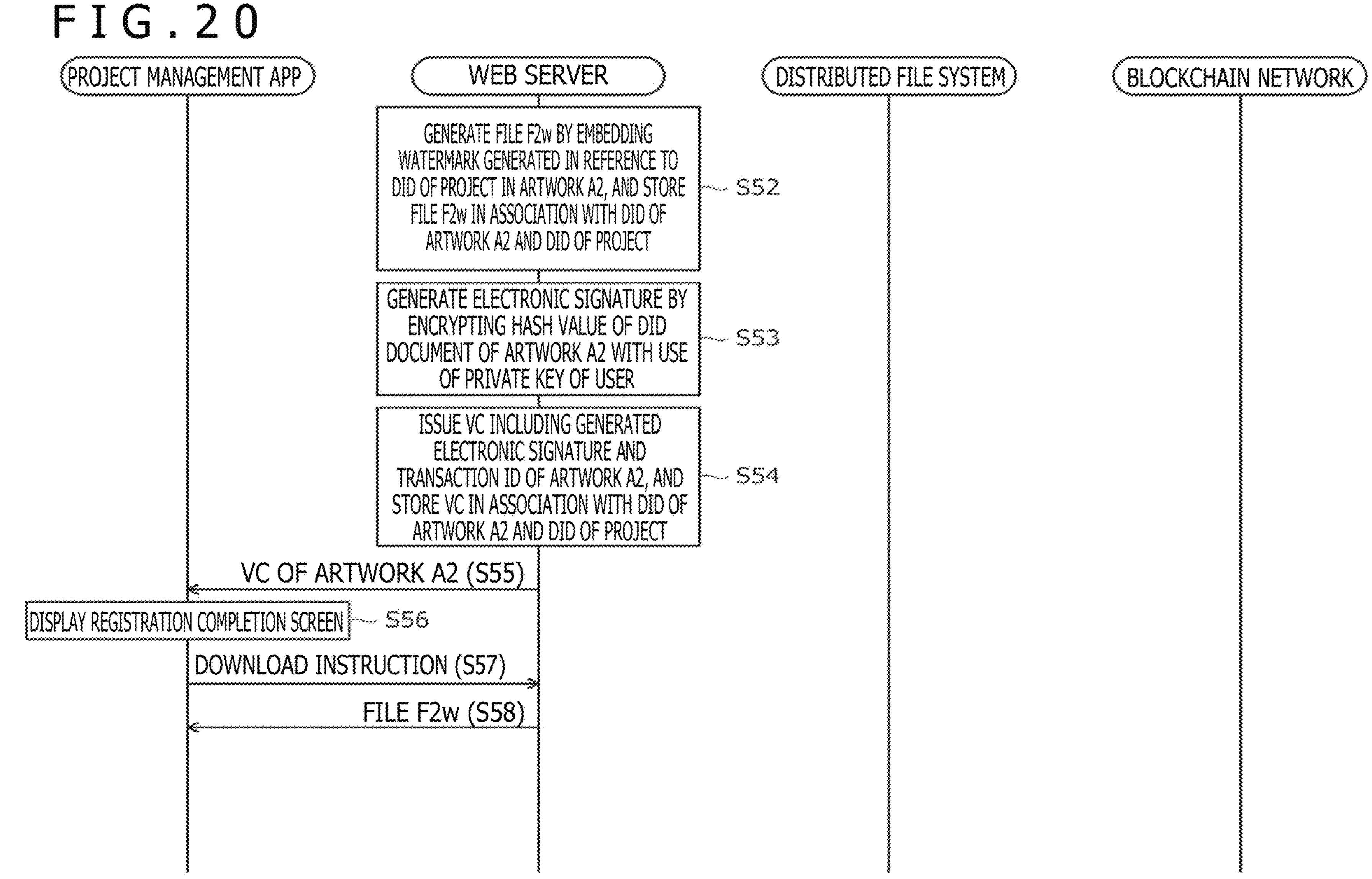
FIG. 20
PROJECT MANAGEMENT APP
WEB SERVER
DISTRIBUTED FILE SYSTEM
BLOCKCHAIN NETWORK
GENERATE FILE F2w BY EMBEDDING WATERMARK GENERATED IN REFERENCE TO DID OF PROJECT IN ARTWORK A2, AND STORE FILE F2w IN ASSOCIATION WITH DID OF ARTWORK A2 AND DID OF PROJECT
S52
GENERATE ELECTRONIC SIGNATURE BY ENCRYPTING HASH VALUE OF DID DOCUMENT OF ARTWORK A2 WITH USE OF PRIVATE KEY OF USER
S53
ISSUE VC INCLUDING GENERATED ELECTRONIC SIGNATURE AND TRANSACTION ID OF ARTWORK A2, AND STORE VC IN ASSOCIATION WITH DID OF ARTWORK A2 AND DID OF PROJECT
S54
VC OF ARTWORK A2 (S55)
DISPLAY REGISTRATION COMPLETION SCREEN
S56
DOWNLOAD INSTRUCTION (S57)
FILE F2w (S58)

FIG. 21A

| | |
|---|---|
| ARTIST | : DID OF USER |
| SIGNATURE | : HASH VALUE OF FSS OF USER |
| STORAGE LOCATION | : ADDRESS OF ENCRYPTED ARTWORK A2 DATA |
| PUBLIC KEY | : PUBLIC KEY OF ARTWORK A2 |
| METADATA | : METADATA OF PROJECT |

DID DOCUMENT OF ARTWORK A2

FIG. 21B

| | |
|---|---|
| ISSUANCE DATE AND TIME | : 0000/00/00 00:00:00 |
| ISSUER | : DID OF USER |
| ELECTRONIC SIGNATURE OF ISSUER | : ELECTRONIC SIGNATURE GENERATED BY ENCRYPTING HASH VALUE OF DID DOCUMENT OF ARTWORK A2 BY PRIVATE KEY OF USER |
| TRANSACTION ID | : TRANSACTION ID OF DID OF ARTWORK A2 |

VC OF ARTWORK A2

CERTIFICATE MANAGEMENT APP AND LOGO MARK
LOG IN
80
D10
C10
EMAIL ADDRESS
aaaa@bbbb.com
81
PASSWORD
82
LOG IN
83

D11s
D11m
LOGO MARK
CERTIFICATE
ISSUED
DRAFT
D11
D12
90
ISSUE COPYRIGHT CERTIFICATE
ARTIST
WORK NAME
CERTIFICATE TYPE
91
ISSUE USAGE RIGHT CERTIFICATE
TARO TOKKYO

Figure 24:
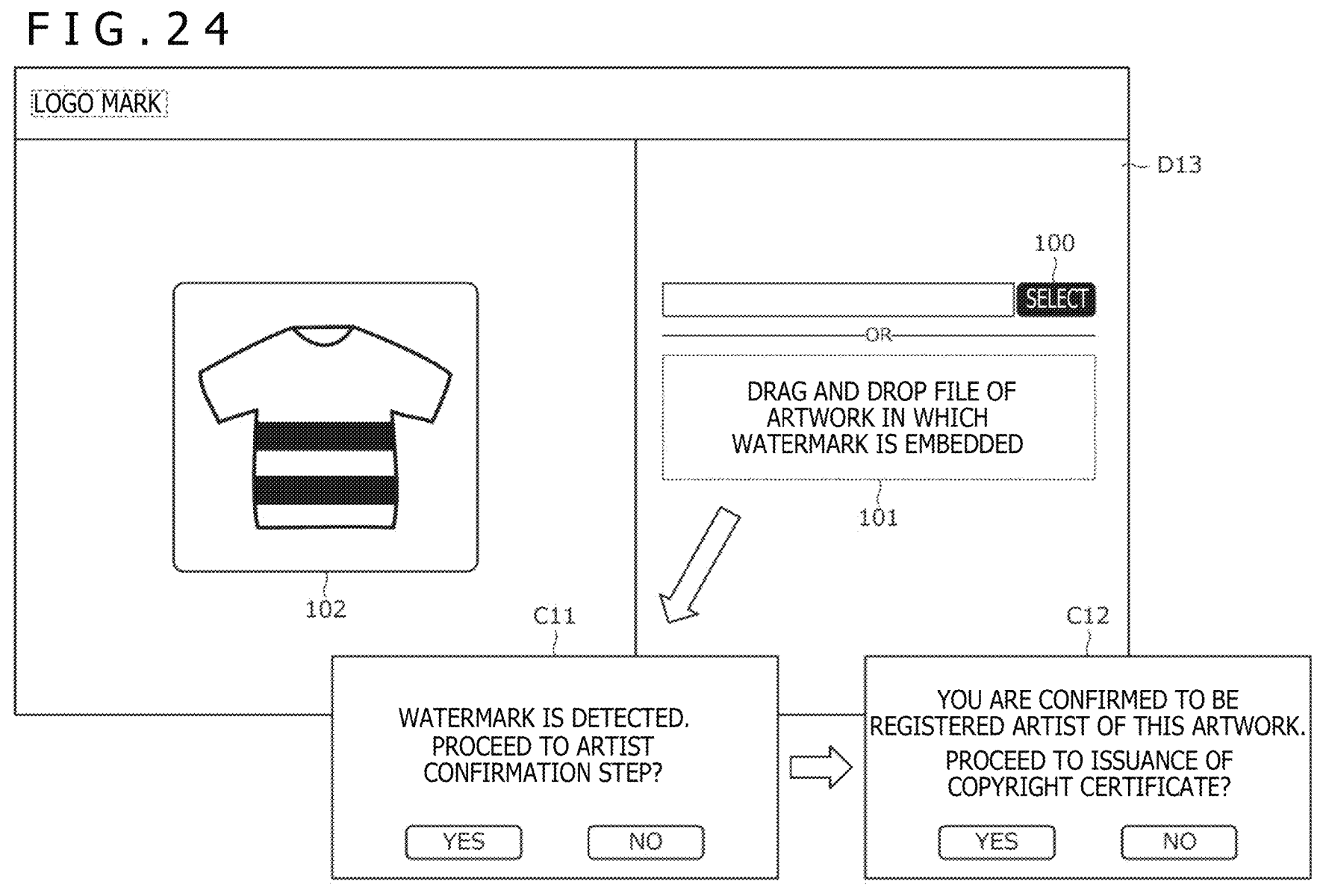

LOGO MARK

100

SELECT

OR

DRAG AND DROP FILE OF ARTWORK IN WHICH WATERMARK IS EMBEDDED

101

102

C11

WATERMARK IS DETECTED. PROCEED TO ARTIST CONFIRMATION STEP?

YES

NO

C12

YOU ARE CONFIRMED TO BE REGISTERED ARTIST OF THIS ARTWORK. PROCEED TO ISSUANCE OF COPYRIGHT CERTIFICATE?

YES

NO

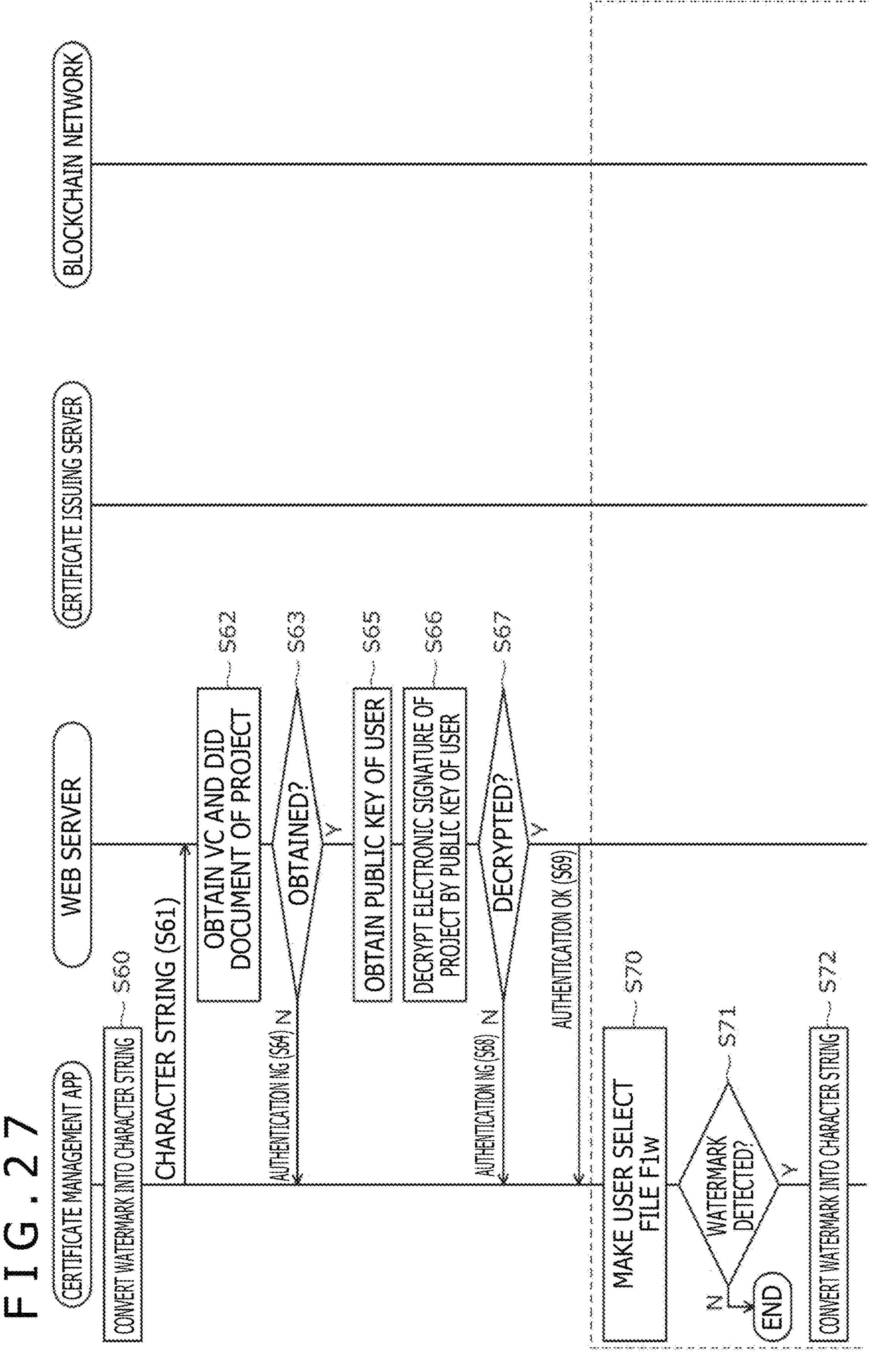
FIG. 27
CERTIFICATE MANAGEMENT APP
WEB SERVER
CERTIFICATE ISSUING SERVER
BLOCKCHAIN NETWORK
CONVERT WATERMARK INTO CHARACTER STRING
S60
CHARACTER STRING (S61)
OBTAIN VC AND DID DOCUMENT OF PROJECT
S62
OBTAINED?
S63
Y
N
AUTHENTICATION NG (S64)
OBTAIN PUBLIC KEY OF USER
S65
DECRYPT ELECTRONIC SIGNATURE OF PROJECT BY PUBLIC KEY OF USER
S66
DECRYPTED?
S67
Y
N
AUTHENTICATION NG (S68)
AUTHENTICATION OK (S69)
MAKE USER SELECT FILE F1w
S70
WATERMARK DETECTED?
S71
Y
N
END
CONVERT WATERMARK INTO CHARACTER STRING
S72

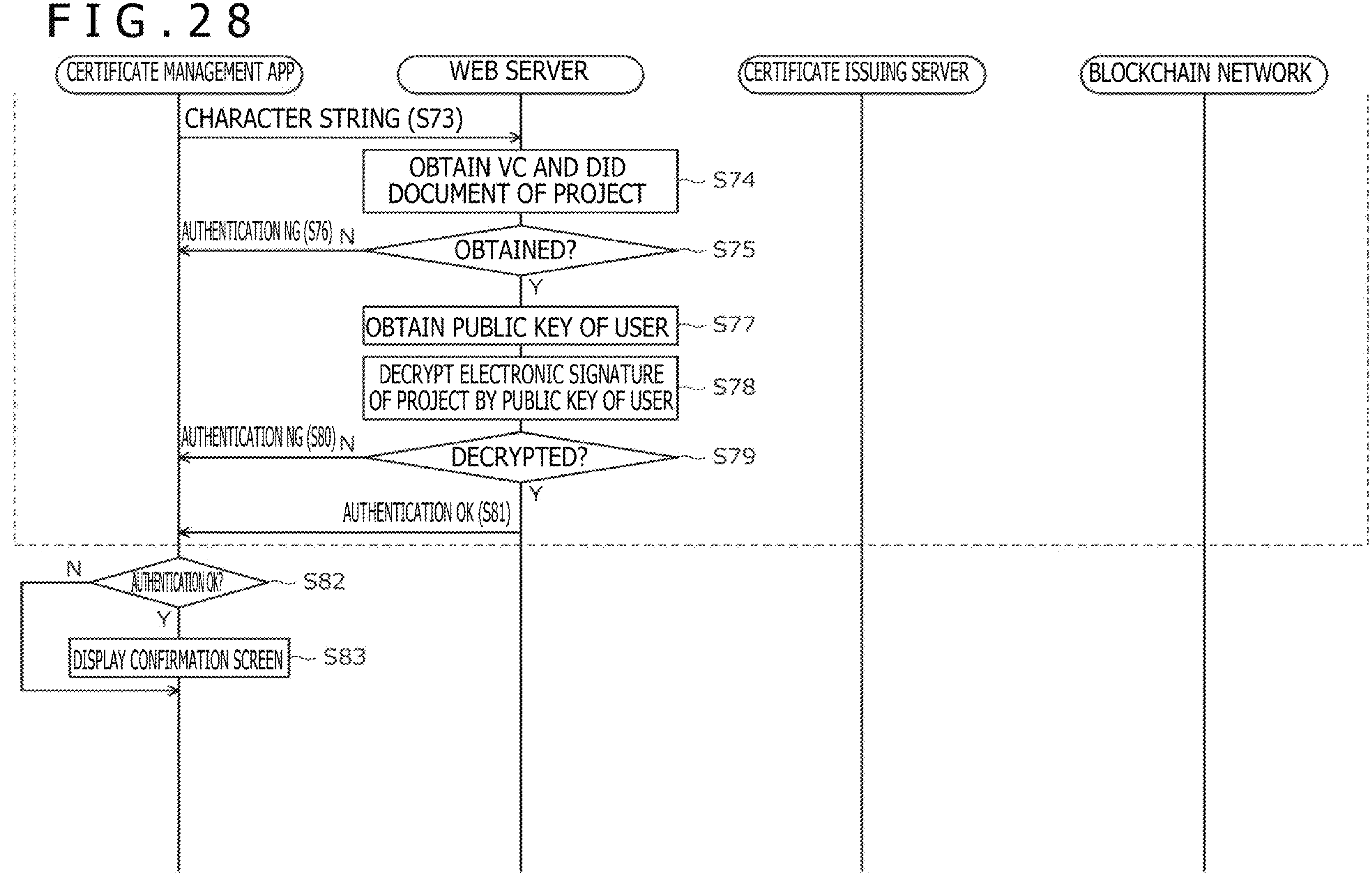
FIG. 28
CERTIFICATE MANAGEMENT APP
WEB SERVER
CERTIFICATE ISSUING SERVER
BLOCKCHAIN NETWORK
CHARACTER STRING (S73)
OBTAIN VC AND DID DOCUMENT OF PROJECT
S74
AUTHENTICATION NG (S76)
N
OBTAINED?
S75
Y
OBTAIN PUBLIC KEY OF USER
S77
DECRYPT ELECTRONIC SIGNATURE OF PROJECT BY PUBLIC KEY OF USER
S78
AUTHENTICATION NG (S80)
N
DECRYPTED?
S79
Y
AUTHENTICATION OK (S81)
N
AUTHENTICATION OK?
S82
Y
DISPLAY CONFIRMATION SCREEN
S83

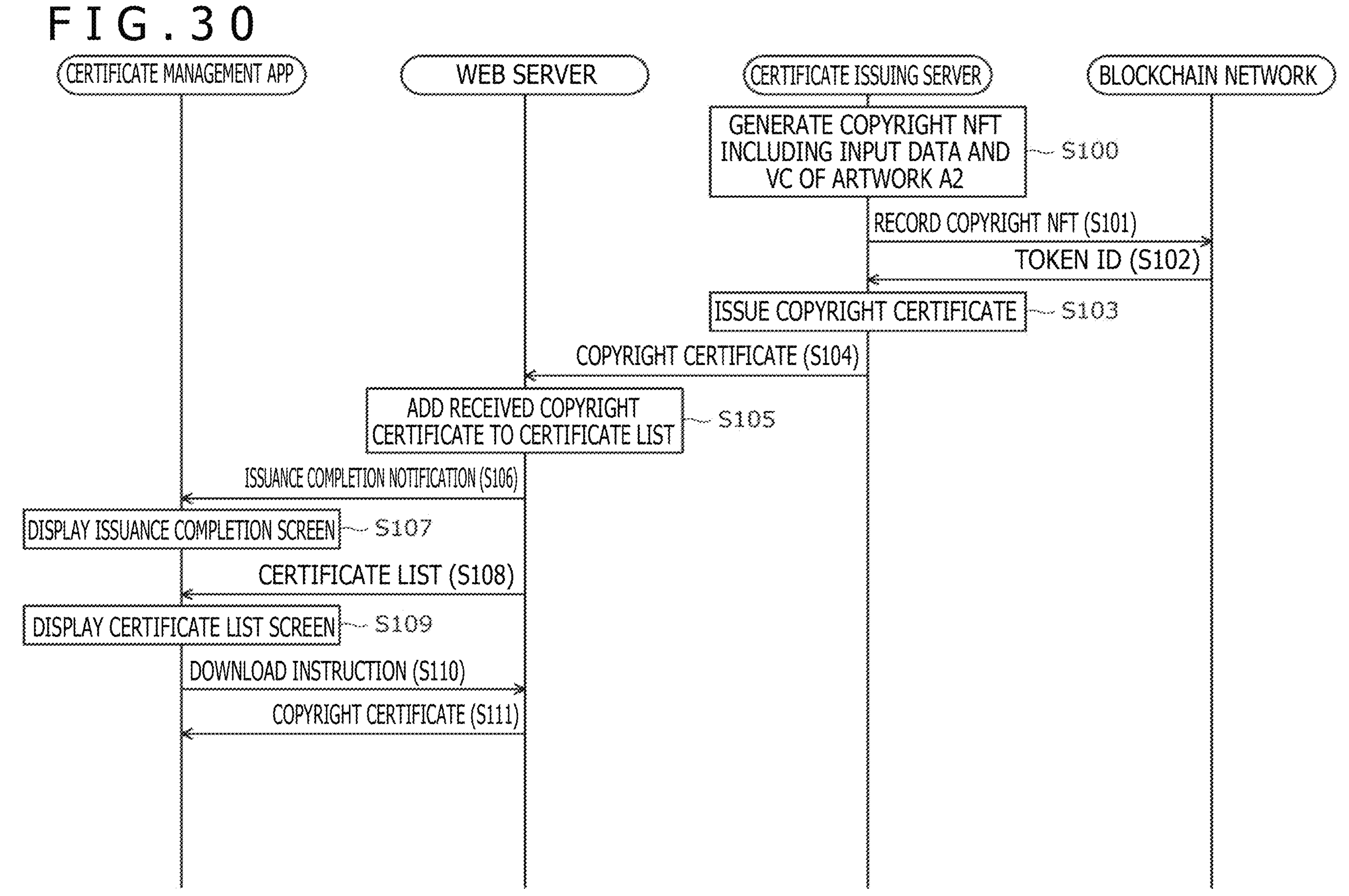
FIG. 30
CERTIFICATE MANAGEMENT APP
WEB SERVER
CERTIFICATE ISSUING SERVER
BLOCKCHAIN NETWORK
GENERATE COPYRIGHT NFT INCLUDING INPUT DATA AND VC OF ARTWORK A2
S100
RECORD COPYRIGHT NFT (S101)
TOKEN ID (S102)
ISSUE COPYRIGHT CERTIFICATE
S103
COPYRIGHT CERTIFICATE (S104)
ADD RECEIVED COPYRIGHT CERTIFICATE TO CERTIFICATE LIST
S105
ISSUANCE COMPLETION NOTIFICATION (S106)
DISPLAY ISSUANCE COMPLETION SCREEN
S107
CERTIFICATE LIST (S108)
DISPLAY CERTIFICATE LIST SCREEN
S109
DOWNLOAD INSTRUCTION (S110)
COPYRIGHT CERTIFICATE (S111)

FIG. 31

| | |
|---|---|
| TOKEN ID | : Token12345 |
| OWNER | : WALLET ADDRESS OF USER |
| ISSUANCE DATE AND TIME | : 0000/00/00 00:00:00 |
| ADDITIONAL METADATA 1 | : DID OF ARTWORK A2 ENCRYPTED BY PRIVATE KEY OF SERVICE |
| ADDITIONAL METADATA 2 | : INPUT DATA OF INFORMATION INPUT SCREEN |

COPYRIGHT CERTIFICATE OF ARTWORK A2

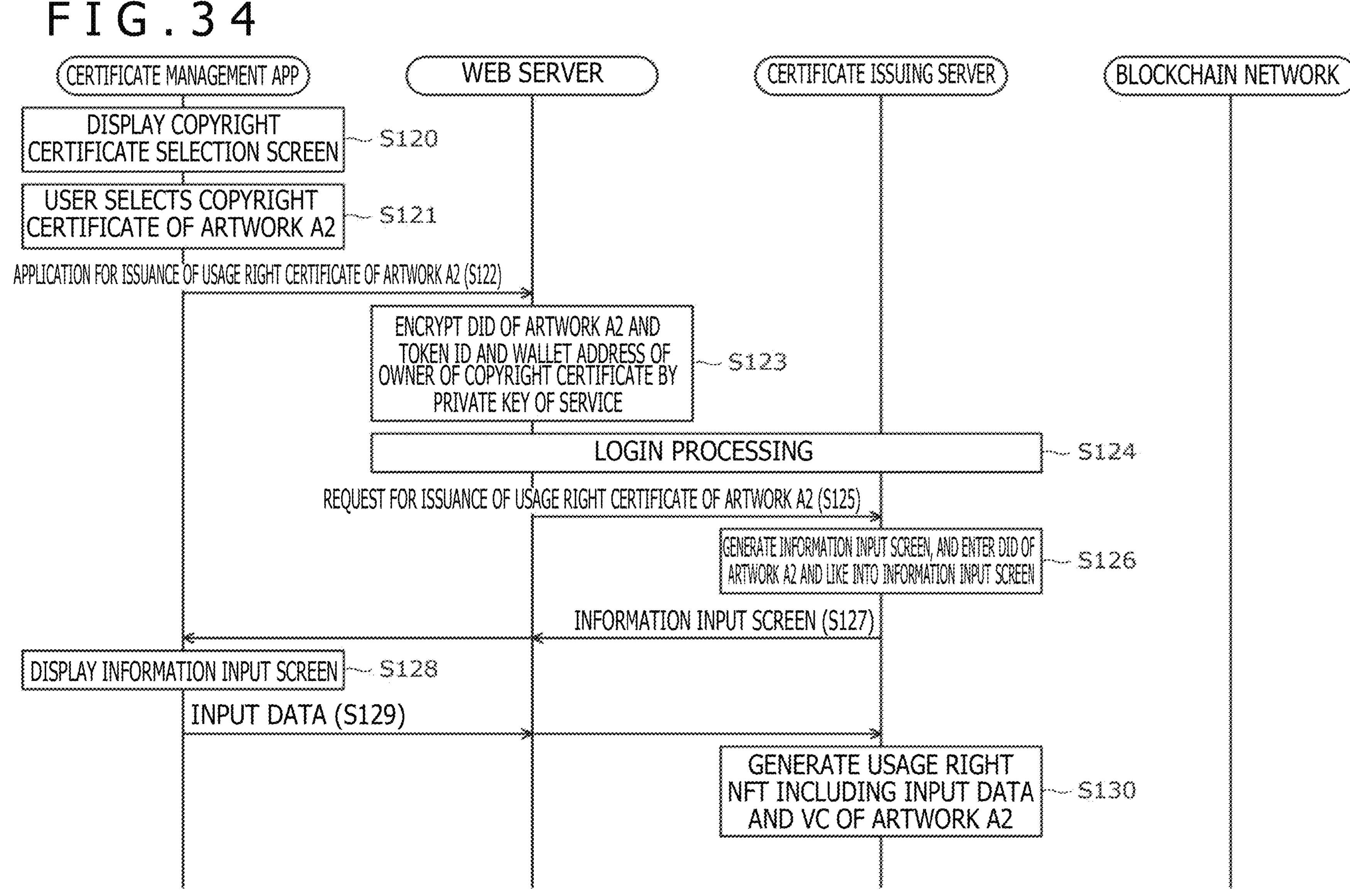
FIG. 34
CERTIFICATE MANAGEMENT APP
WEB SERVER
CERTIFICATE ISSUING SERVER
BLOCKCHAIN NETWORK
DISPLAY COPYRIGHT CERTIFICATE SELECTION SCREEN
S120
USER SELECTS COPYRIGHT CERTIFICATE OF ARTWORK A2
S121
APPLICATION FOR ISSUANCE OF USAGE RIGHT CERTIFICATE OF ARTWORK A2 (S122)
ENCRYPT DID OF ARTWORK A2 AND TOKEN ID AND WALLET ADDRESS OF OWNER OF COPYRIGHT CERTIFICATE BY PRIVATE KEY OF SERVICE
S123
LOGIN PROCESSING
S124
REQUEST FOR ISSUANCE OF USAGE RIGHT CERTIFICATE OF ARTWORK A2 (S125)
GENERATE INFORMATION INPUT SCREEN, AND ENTER DID OF ARTWORK A2 AND LIKE INTO INFORMATION INPUT SCREEN
S126
INFORMATION INPUT SCREEN (S127)
DISPLAY INFORMATION INPUT SCREEN
S128
INPUT DATA (S129)
GENERATE USAGE RIGHT NFT INCLUDING INPUT DATA AND VC OF ARTWORK A2
S130

FIG. 36

| | |
|---|---|
| TOKEN ID | : Token12346 |
| OWNER | : WALLET ADDRESS OF USER |
| ISSUANCE DATE AND TIME | : 0000/00/00 00:00:00 |
| ADDITIONAL METADATA 1 | : DID OF ARTWORK A2 ENCRYPTED BY PRIVATE KEY OF SERVICE |
| ADDITIONAL METADATA 2 | : TOKEN ID OF COPYRIGHT CERTIFICATE ENCRYPTED BY PRIVATE KEY OF SERVICE |
| ADDITIONAL METADATA 3 | : WALLET ADDRESS OF OWNER OF COPYRIGHT CERTIFICATE ENCRYPTED BY PRIVATE KEY OF SERVICE |
| ADDITIONAL METADATA 4 | : INPUT DATA OF INFORMATION INPUT SCREEN |

USAGE RIGHT CERTIFICATE OF ARTWORK A2

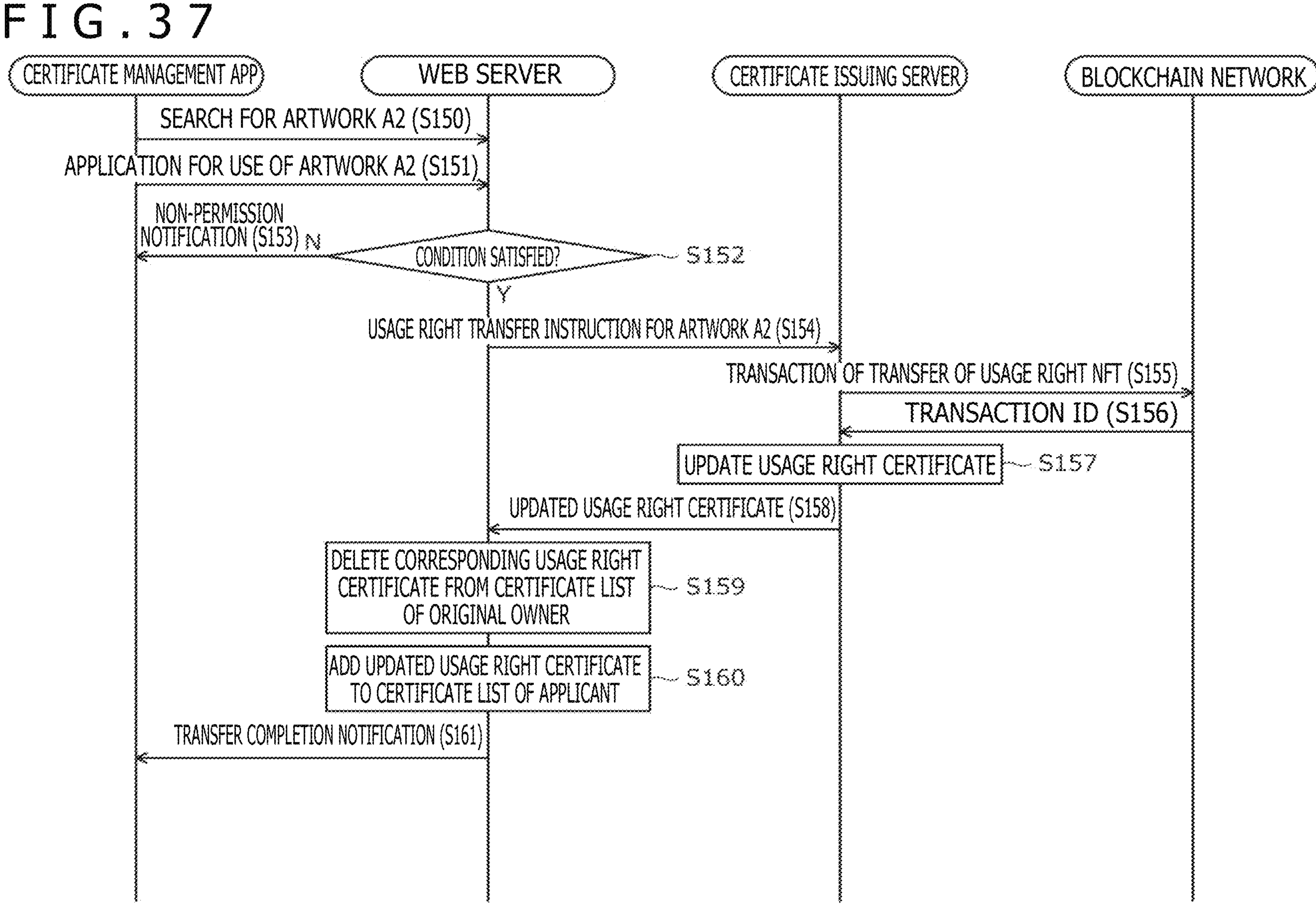
FIG. 37
CERTIFICATE MANAGEMENT APP
WEB SERVER
CERTIFICATE ISSUING SERVER
BLOCKCHAIN NETWORK
SEARCH FOR ARTWORK A2 (S150)
APPLICATION FOR USE OF ARTWORK A2 (S151)
NON-PERMISSION NOTIFICATION (S153)
N
CONDITION SATISFIED?
S152
Y
USAGE RIGHT TRANSFER INSTRUCTION FOR ARTWORK A2 (S154)
TRANSACTION OF TRANSFER OF USAGE RIGHT NFT (S155)
TRANSACTION ID (S156)
UPDATE USAGE RIGHT CERTIFICATE
S157
UPDATED USAGE RIGHT CERTIFICATE (S158)
DELETE CORRESPONDING USAGE RIGHT CERTIFICATE FROM CERTIFICATE LIST OF ORIGINAL OWNER
S159
ADD UPDATED USAGE RIGHT CERTIFICATE TO CERTIFICATE LIST OF APPLICANT
S160
TRANSFER COMPLETION NOTIFICATION (S161)

FIG. 38

| | |
|---|---|
| TOKEN ID | : Token12346 |
| OWNER | : WALLET ADDRESS OF SECOND OWNER |
| ISSUANCE DATE AND TIME | : 0000/00/00 00:00:00 |
| ADDITIONAL METADATA 1 | ; DID OF PROJECT ENCRYPTED BY PRIVATE KEY OF SERVICE |
| ADDITIONAL METADATA 2 | ; TOKEN ID OF COPYRIGHT CERTIFICATE ENCRYPTED BY PRIVATE KEY OF SERVICE |
| ADDITIONAL METADATA 3 | : WALLET ADDRESS OF OWNER OF COPYRIGHT CERTIFICATE ENCRYPTED BY PRIVATE KEY OF SERVICE |
| ADDITIONAL METADATA 4 | : INPUT DATA OF INFORMATION INPUT SCREEN |
| OWNER HISTORY 1 | : WALLET ADDRESS OF FIRST OWNER AND TRANSFER DATE AND TIME |

USAGE RIGHT CERTIFICATE OF ARTWORK A2

NFT ISSUING METHOD, COMPUTER, AND COMPUTER-READABLE MEDIUM

BACKGROUND

Technical Field

The present disclosure relates to an NFT issuing method, a computer, and a computer-readable medium.

Description of the Related Art

In recent years, there have been an increasing number of cases in which a non-fungible token (Non-Fungible Token; hereinafter referred to as an "NFT") indicating digital content is issued by being registered on a blockchain and the trading of the digital content is performed by the trading of the NFT.

Patent Document 1 discloses the recording on the blockchain of transactions indicating the trading of items that "exert an effect (value) on a network or in a real world." The trading of an NFT is also recorded on the blockchain as a transaction, as with the items in Patent Document 1.

In addition, self-sovereign identity (Self-Sovereign Identity; hereinafter referred to as "SSI") has been drawing attention in recent years. SSI is a mechanism that solves various problems caused by centralized ID management, by enabling a person himself/herself to retain and control his/her own identity (Identity; hereinafter referred to as an "ID") without the intervention of a management entity. In SSI, information is identified by a decentralized identity (Decentralized Identity; hereinafter referred to as a "DID") as a decentralized ID managed by the blockchain. The information identified by the DID is referred to as a DID document, and is stored in a distributed file system. Non-Patent Document 1 describes the standards of the DID and the DID document.

In addition, SSI uses certificates referred to as verifiable certificates (Verifiable Credentials; hereinafter referred to as "VCs"). A VC is information including an electronic signature generated by encrypting, by the private key of an issuer, the hash value of information to be authenticated. A person who receives the VC together with the information to be authenticated derives the hash value of the received information, and decrypts the electronic signature by a public key of the issuer. The person confirms the authenticity of the received information by comparing the derived hash value and the decrypted electronic signature with each other. Non-Patent Document 2 describes the standards of the VC.

PRIOR ART DOCUMENTS

Patent Document

Patent Document 1: Japanese Patent No. 6404435

Non-Patent Document

Non-Patent Document 1: World Wide Web Consortium, "Decentralized Identifiers (DIDs) v1.0," [online], [retrieved on Oct. 30, 2021], the Internet, <URL: "https://www.w3.org/TR/did-core/">

Non-Patent Document 2: World Wide Web Consortium, "Verifiable Credentials Data Model 1.0," [online], [retrieved on Oct. 30, 2021], the Internet, <URL: "https://www.w3.org/TR/vc-data-model/">

BRIEF SUMMARY

Technical Problem

Now, with the present NFT mechanism, a person other than an artist who produced digital artwork can generate the NFT of the digital artwork freely (that is, without obtaining a permission of the artist). As a result, there occurs a situation in which the location of ownership of the digital artwork remains unclear or the artist does not obtain a legitimate reward. An improvement has therefore been demanded.

It is accordingly an object of the present disclosure to provide an NFT issuing method, a computer, and a computer-readable medium that can prevent the NFT conversion of digital artwork by a person who does not have a legitimate right.

Technical Solution

According to the present disclosure, there is provided an NFT issuing method including receiving a selection of a first artwork in which a watermark is embedded, authenticating, in reference to the watermark and information concerning a user who selects the first artwork, whether or not the user is an artist of the first artwork, and generating a first NFT indicating the first artwork when the authenticating succeeds.

According to the present disclosure, there is provided a computer including a processor, and a memory storing instructions that, when executed by the processor, cause the computer to: receive a selection of a first artwork in which a watermark is embedded, authenticate, in reference to the watermark and information concerning a user who selects the first artwork, whether or not the user is an artist of the first artwork, and generate a first NFT indicating the first artwork when authentication of the user succeeds.

According to the present disclosure, there is provided a non-transitory computer-readable medium storing a program that, when executed by a computer perform, causes the computer to: receive a selection of a first artwork in which a watermark is embedded, authenticate, in reference to the watermark and information concerning a user who selects the first artwork, whether or not the user is an artist of the first artwork, and generate a first NFT indicating the first artwork when authentication of the user succeeds.

Advantageous Effect

According to the present disclosure, it is possible to prevent the NFT conversion of digital artwork by a person who does not have a legitimate right.

BRIEF DESCRIPTION OF THE SEVERAL VIEWS OF THE DRAWINGS

FIG. 4 is a diagram illustrating a start screen D1 displayed at a time of a start of a project management app **3*a***.

FIG. 9 is a diagram illustrating a project registration screen D4*d* for allowing the user to confirm an input result on the project registration screens D4*a* to D4*c*.

FIG. 10 is a diagram illustrating a project registration screen D4*e* for obtaining a signature of the user.

FIG. 12 is a sequence diagram illustrating processing in a case where the user depresses a login button 14 illustrated in FIG. 4.

FIG. 13 is a sequence diagram illustrating processing in a case where the user depresses a "complete" button illustrated in FIG. 10.

FIG. 14 is a sequence diagram illustrating the processing in the case where the user depresses the "complete" button illustrated in FIG. 10.

FIG. 15A is a diagram illustrating an example of a configuration of a DID document of the user generated by the Web server 4 at S6 in FIG. 12, FIG. 15B is a diagram illustrating an example of a configuration of a DID document of the project generated by the Web server 4 at S27 in FIG. 13, and FIG. 15C is a diagram illustrating an example of a configuration of a VC of the project issued by the Web server 4 at S36 in FIG. 14.

FIG. 17 is a diagram illustrating a screen displayed when the user depresses a "next" button on a file selection screen C3 illustrated in FIG. 16.

FIG. 19 is a sequence diagram illustrating processing in a case where the user depresses a "complete" button illustrated in FIG. 17.

FIG. 20 is a sequence diagram illustrating the processing in the case where the user depresses the "complete" button illustrated in FIG. 17.

FIG. 21A is a diagram illustrating an example of a configuration of a DID document of the artwork A2 generated by the Web server 4 at S47 in FIG. 19, and FIG. 21B is a diagram illustrating an example of a configuration of VC of the artwork A2 issued by the Web server 4 at S54 in FIG. 20.

FIG. 24 is a diagram illustrating a file selection screen D13 for allowing the user to select a file constituting artwork as a target for which a copyright certificate is to be issued.

FIG. 27 is a sequence diagram illustrating processing in a case where the user depresses a "YES" button within a confirmation screen C11 illustrated in FIG. 24.

FIG. 28 is a sequence diagram illustrating the processing in the case where the user depresses the "YES" button within the confirmation screen C11 illustrated in FIG. 24.

FIG. 30 is a sequence diagram illustrating processing in a case where the user depresses a "YES" button within the confirmation screen C12 illustrated in FIG. 24.

FIG. 31 is a diagram illustrating an example of a configuration of the copyright certificate of the artwork A2 issued by the certificate issuing server 5 at S103 in FIG. 30.

FIG. 34 is a sequence diagram illustrating processing in a case where the user depresses a usage right certificate issuance menu 91 within the initial screen D11 illustrated in FIG. 26.

FIG. 36 is a diagram illustrating an example of a configuration of the usage right certificate of the artwork A2 issued by the certificate issuing server 5 at S133 in FIG. 35.

FIG. 37 is a sequence diagram illustrating processing in a case where the usage right of the artwork A2 is transferred from a certain user to another user.

FIG. 38 is a diagram illustrating an example of a configuration of the usage right certificate that has been updated at S157 in FIG. 37.

DETAILED DESCRIPTION

An embodiment of the present disclosure will hereinafter be described in detail with reference to the accompanying drawings.

Figure 1:
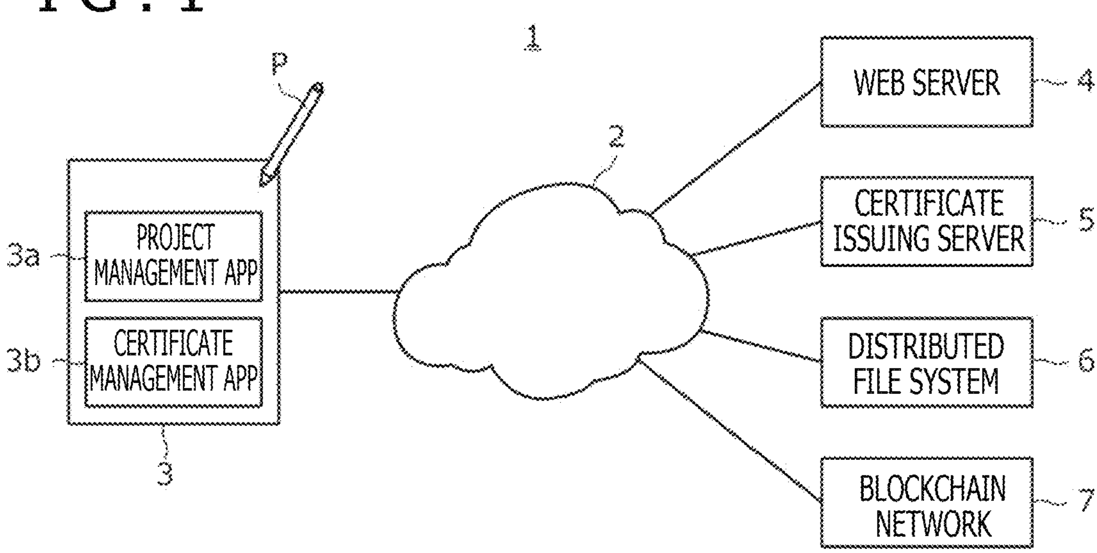
FIG. 1 is a diagram illustrating a configuration of an artwork management system 1 according to a present embodiment.

FIG. 1 is a diagram illustrating a configuration of an artwork management system 1 according to the present embodiment. As illustrated in the figure, the artwork management system 1 has a configuration in which a user terminal 3, a Web server 4, a certificate issuing server 5, a distributed file system 6, and a blockchain network 7 are interconnected via a network 2.

Figure 2:
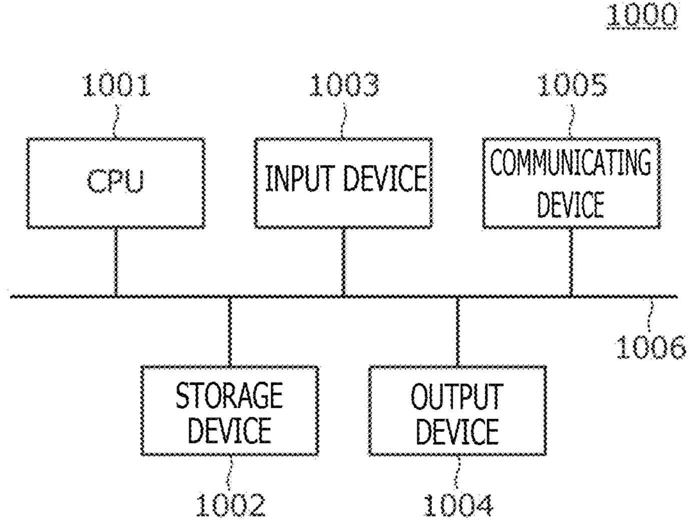
FIG. 2 is a diagram illustrating an example of a hardware configuration of a user terminal 3, a Web server 4, and a certificate issuing server 5.

FIG. 2 is a diagram illustrating an example of a hardware configuration of the user terminal 3, the Web server 4, and the certificate issuing server 5. Each of the user terminal 3, the Web server 4, and the certificate issuing server 5 can be constituted by a computer 1000 having the configuration illustrated in the figure. Incidentally, each of the Web server 4 and the certificate issuing server 5 may be constituted by a plurality of computers 1000 being coupled to each other.

As illustrated in FIG. 2, the computer 1000 has a configuration in which a CPU (Central Processing Unit) 1001, a storage device 1002, an input device 1003, an output device 1004, and a communicating device 1005 are interconnected via a bus 1006.

The CPU 1001 is a device (processor) that controls various parts of the computer 1000 and that reads and executes various kinds of programs stored in the storage device 1002. Various kinds of processing to be described with reference to the following FIGS. 3 to 38 are implemented by the CPUs 1001 of the user terminal 3, the Web server 4, and the certificate issuing server 5 executing programs stored in the storage devices 1002. The programs executed by the CPU 1001 of the user terminal 3 include a project management app 3*a* and a certificate management app 3*b* illustrated in FIG. 1.

The storage device 1002 includes a main storage device such as a DRAM (Dynamic Random Access Memory) and an auxiliary storage device such as a hard disk. The storage device 1002 plays a role of storing various kinds of programs for executing an operating system of the computer 1000 and various kinds of applications and data used by these programs.

The input device 1003 is a device that receives an input operation performed by a user and supplies the input operation to the CPU 1001. The input device 1003 includes, for example, a keyboard, a mouse, and a touch detecting device. Of these, the touch detecting device is a device including a touch sensor and a touch controller and is used to detect a pen input or a touch input. A pen P illustrated in FIG. 1 is an electronic pen used to perform a pen input to the touch detecting device of the user terminal 3. The pen input by the pen P is implemented by an active capacitance system or an electromagnetic induction system, for example.

The output device 1004 is a device that outputs a result of processing performed by the CPU 1001 to the user. The output device 1004 includes a display and a speaker, for example. The communicating device 1005 is a device for communicating with an external device. The communicating device 1005 transmits and receives data according to instructions of the CPU 1001. By using the communicating device 1005, each of the user terminal 3, the Web server 4, and the certificate issuing server 5 communicates with another device, a system, a network, and the like including the distributed file system 6 and the blockchain network 7 illustrated in the figure.

The description returns to FIG. 1. The user terminal 3 is a computer used for producing artwork, filing an application for the issuance of various kinds of certificates related to the produced artwork, filing an application for the use of artwork, inputting biometric signature data to be described later, and the like. While FIG. 1 illustrates one user terminal 3, a large number of user terminals 3 are connected to the network 2 in reality. Any computer such as a personal computer, a tablet terminal, or a smart phone can be used as specific hardware of the user terminal 3. Each of the artwork and the biometric signature data is digital data, and includes digital ink data (to be described later) generated when an artist performs a pen input to the input device 1003 of the user terminal 3 by using the pen P.

Figure 3:
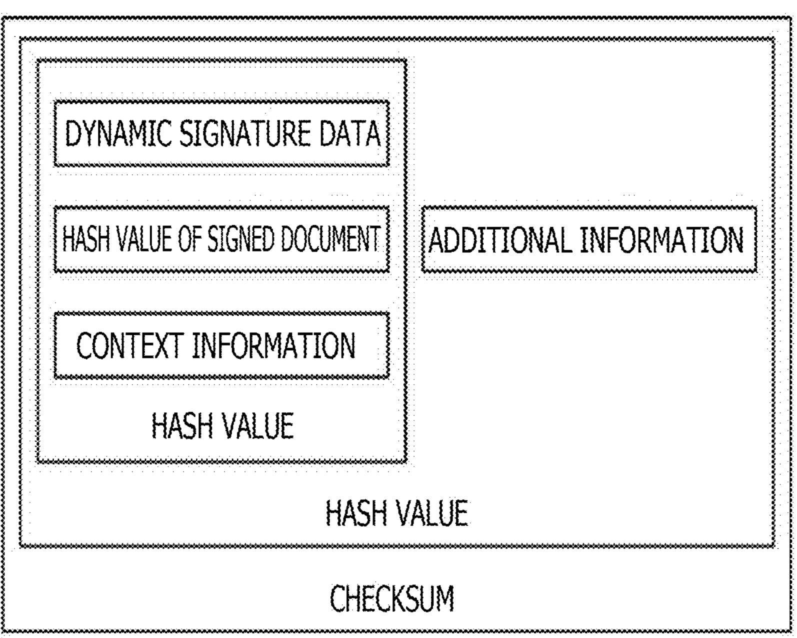
FIG. 3 is a diagram illustrating a configuration of biometric signature data.

FIG. 3 is a diagram illustrating a configuration of the biometric signature data. The biometric signature data is data generated according to WILL (Wacom Ink Layer Language) or FSS (Forensic Signature Stream), for example. As illustrated in the figure, the biometric signature data includes dynamic signature data, a hash value of a signed document, context information, additional information, a hash value of the dynamic signature data, the hash value of the signed document, and the context information, and a hash value of this hash value and the additional information as well as a checksum for detecting an error that can occur at times of transmission and reception of this hash value.

The dynamic signature data is digital ink data including a series of pieces of coordinate data constituting a line drawing. Each piece of coordinate data is data indicating the position of the pen P detected by the touch detecting device described above. With respect to detailed description of this detection, the touch sensor includes a plurality of X-electrodes each extending in a Y-direction and arranged at equal intervals in an X-direction and a plurality of Y-electrodes each extending in the X-direction and arranged at equal intervals in the Y-direction. In a case where the pen P is configured to be able to transmit a signal, the touch controller obtains coordinate data indicating the position of the pen P by receiving a burst signal transmitted by the pen P by each of the plurality of X-electrodes and the plurality of Y-electrodes. In a case where the pen P is unable to transmit a signal, on the other hand, the touch controller obtains coordinate data indicating the position of the pen P by transmitting a signal to each of the plurality of X-electrodes in order, receiving this signal by each of the plurality of Y-electrodes, and detecting a change in amplitude of the received signal. The touch controller is configured to collect coordinate data at a frequency of 100 times or 200 times per second, for example.

The hash value of the signed document is a hash value of a document signed by the artist (including a website) in order to generate the biometric signature data. Incidentally, the hash value is a value obtained by inputting target electronic data to a predetermined one-way hash function. The same is true for the other hash values to be described later.

The context information is information including the name data of the artist who signed, a signature date and time, a purpose of the signature, information concerning the touch detecting device used for the signature (a manufacturer name, a model name, and the like), information concerning an application used for the signature (an application name, version information, and the like), information concerning the operating system of the user terminal 3 (an operating system name, version information, and the like), address information of the user terminal 3 (an IP (Internet Protocol) address, a MAC (Media Access Control) address, and the like), and the like. The additional information is information that can freely be specified by an administrator of the artwork management system 1, other than the dynamic signature data, the hash value of the signed document, and the context information.

The description returns to FIG. 1. The Web server 4 is a computer that performs various kinds of processing according to a request or an application from the user terminal 3. The processing performed by the Web server 4 includes processing for registering and managing user information, processing for registering and managing a project for managing a production history of the artwork, processing for issuing various kinds of certificates related to the artwork, and processing for transferring a usage right of the artwork. Specific contents of the processing performed by the Web server 4 will be described later. Incidentally, in a case where the Web server 4 is constituted by a plurality of computers 1000 being coupled to each other, the various kinds of processing performed by the Web server 4 can be distributed to and performed by the plurality of computers 1000.

The certificate issuing server 5 is a computer that issues various kinds of certificates related to the artwork according to control of the Web server 4. The various kinds of certificates issued by the certificate issuing server 5 include a copyright certificate verifying the retention of a copyright of the artwork and a usage right certificate verifying the retention of a usage right of the artwork. Specific contents of processing performed by the certificate issuing server 5 will also be described later. Incidentally, in a case where the certificate issuing server 5 is constituted by a plurality of computers 1000 being coupled to each other, various kinds of processing performed by the certificate issuing server 5 can be distributed to and performed by the plurality of computers 1000.

The distributed file system 6 is a network of a plurality of computers connected on a peer-to-peer basis. The distributed file system 6 is configured to store desired electronic data. A specific distributed file system 6 may be an interplanetary file system (InterPlanetary File System), or may be a distributed file system of another kind. In one example, electronic data stored in the distributed file system 6 is identified by a hash value thereof. That is, in the distributed file system 6, the hash value of the stored electronic data functions as address information of the electronic data. In the following description, this address information will be referred to as "content ID." In the present embodiment, the distributed file system 6 is used to store encrypted artwork and various kinds of DID documents.

The blockchain network 7 is a network of a plurality of computers connected on a peer-to-peer basis. The blockchain network 7 is configured to record a smart contract transaction in a blockchain. To cite a specific example, the blockchain network 7 is an Ethereum network. The recording of the transaction in the blockchain is performed by a few computers connected to the blockchain network 7 (the computers will hereinafter be referred to as "miners").

Specifically, each block constituting the blockchain includes a block header and data (transaction data) indicating specific contents of the transaction. Of these, the block header includes a Merkle root as data formed by compressing the size of the transaction data, a hash value of an immediately preceding block, and a nonce value as a desired character string. The blockchain network 7 stipulates a rule that, in order to connect a new block to the blockchain, a hash value of the block must satisfy a predetermined condition (for example, a condition that the hash value be a value starting with "000"). Accordingly, the miners that intend to record a certain block in the blockchain perform work (mining) of finding a nonce value in a round-robin manner such that a hash value of the block header of the block satisfies the predetermined condition. A miner that has succeeded in finding the nonce value earliest as a result of this work connects the block to the blockchain. The recording of the transaction to the blockchain is thereby completed.

In the following, processing performed by each computer constituting the artwork management system I will be described specifically. In the following, with reference first to FIGS. 4 to 15, description will be made of processing for registering a project for managing the production history of artwork with the Web server 4. In this description, processing for registering user information with the Web server 4 will also be described. Subsequently, processing for adding artwork to the project (FIGS. 16 to 21), processing for issuing the copyright certificate of the artwork (FIGS. 22 to 31), and processing for issuing the usage right certificate of the artwork (FIGS. 32 to 36) will be described in order with reference to the respective drawings indicated in the parentheses. Finally, with reference to FIG. 37 and FIG. 38, description will be made of processing for transferring the usage right of the artwork.

Processing for Registering Project with Web Server 4

FIGS. 4 to 11 are diagrams illustrating an example of screens of the project management app 3*a* displayed on the display of the user terminal 3 when a project is registered with the Web server 4. The user who intends to register a new project including artwork starts the project management app 3*a* on the user terminal 3 of the user himself/herself and registers the project in the project management app 3*a*.

FIG. 4 illustrates a start screen D1 displayed at a time of a start of the project management app 3*a*. As illustrated in the figure, the start screen D1 of the project management app 3*a* includes a registration button 10 and a login button 11. Of these, the registration button 10 is a button for registering user information with the Web server 4. When the user who has not yet registered the user information depresses the registration button 10, the project management app 3*a* displays a new registration screen for the user information. When the user inputs the user information such as an email address, a password, a name, and a wallet address of the user on the blockchain network 7 in this new registration screen, the project management app 3*a* registers the input user information with the Web server 4. The user thus becomes able to use the project management app 3*a* and the certificate management app 3*b*.

When the user depresses the login button 11 on the start screen D1, the project management app 3*a* displays a login screen C1 including an email address input field 12, a password input field 13, and a login button 14, as illustrated in FIG. 4. When, on the login screen C1, the user inputs the registered email address and the registered password to the email address input field 12 and the password input field 13, respectively, and depresses the login button 14, the project management app 3*a* displays an initial screen D2 illustrated in FIG. 5.

Figure 5:
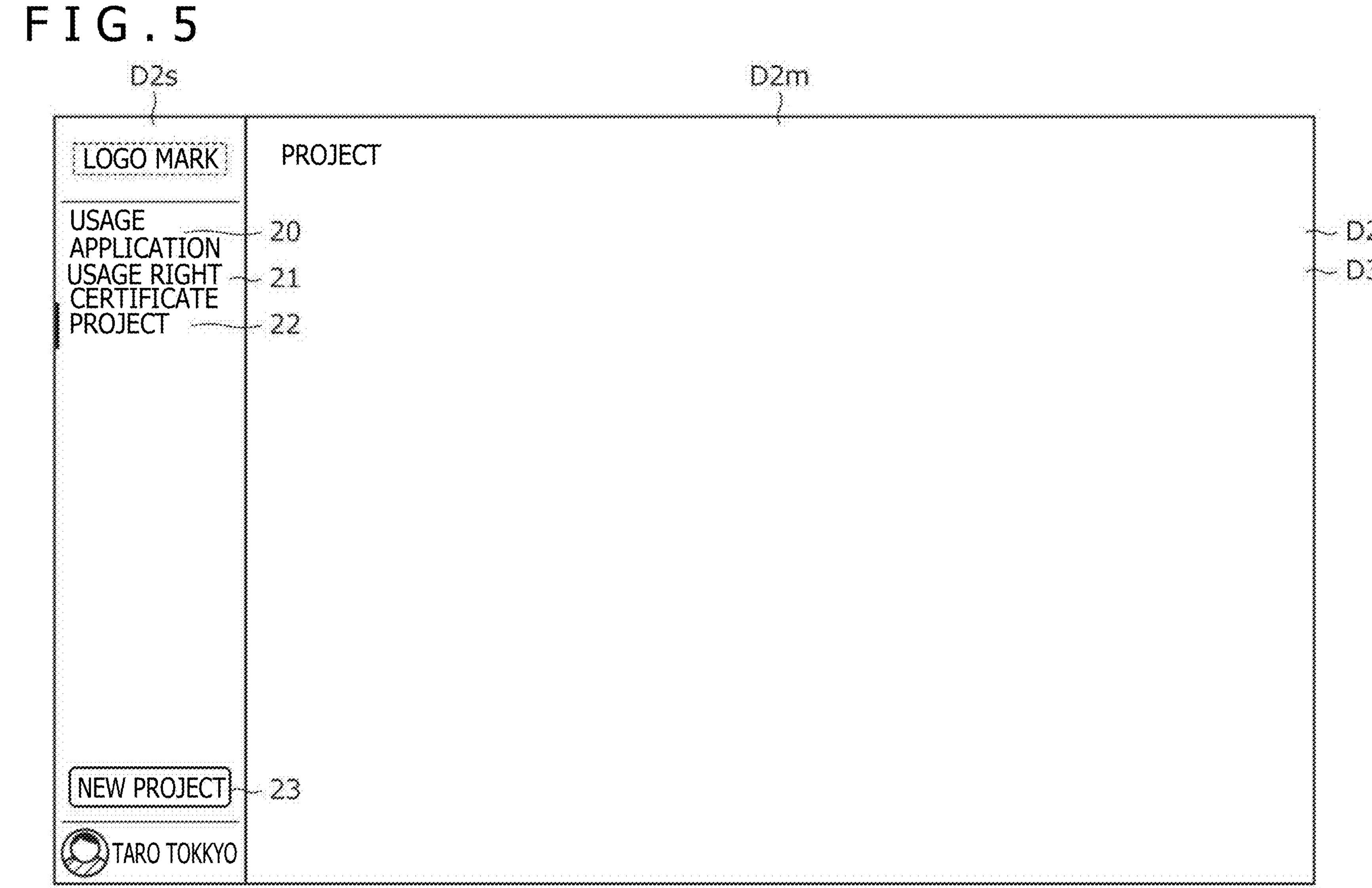
FIG. 5 is a diagram illustrating an initial screen D2 of the project management app 3*a*.

As illustrated in FIG. 5, the initial screen D2 of the project management app 3*a* has a frame configuration formed by disposing a side menu screen D2*s* along a side on a left side and disposing a main screen D2*m* on the right side of the side menu screen D2*s*. The main screen D2*m* displays contents corresponding to an item selected within the side menu screen D2*s*. Within the side menu screen D2*s*, respective menus of a usage application menu 20, a usage right certificate menu 21, and a project menu 22 are arranged in order from an upper end, and information indicating the logged-in user and a new project button 23 are arranged in order from a lower end.

The usage application menu 20 is a hyperlink for displaying, within the main screen D2*m*, a usage application screen for filing a usage application for artwork of another person. The usage right certificate menu 21 is a hyperlink for displaying, within the main screen D2*m*, a usage right certificate management screen for managing a usage right certificate obtained as a result of the usage application. A list of obtained usage right certificates is displayed within the usage right certificate management screen. The project menu 22 is a hyperlink for displaying, within the main screen D2*m*, a project management screen D3 for managing registered projects. A list of the registered projects is displayed within the project management screen D3. FIG. 5 illustrates a state in which the project management screen D3 is displayed within the main screen D2*m*. However, FIG. 5 illustrates a state in which there are no registered projects, and thus, no registered projects appear in the drawing.

The new project button 23 is a hyperlink for starting registration processing for a new project. When the user depresses the new project button 23, the project management app 3*a* displays a project registration screen D4*a* (see FIG. 6) within the main screen D2*m*.

Figure 6:
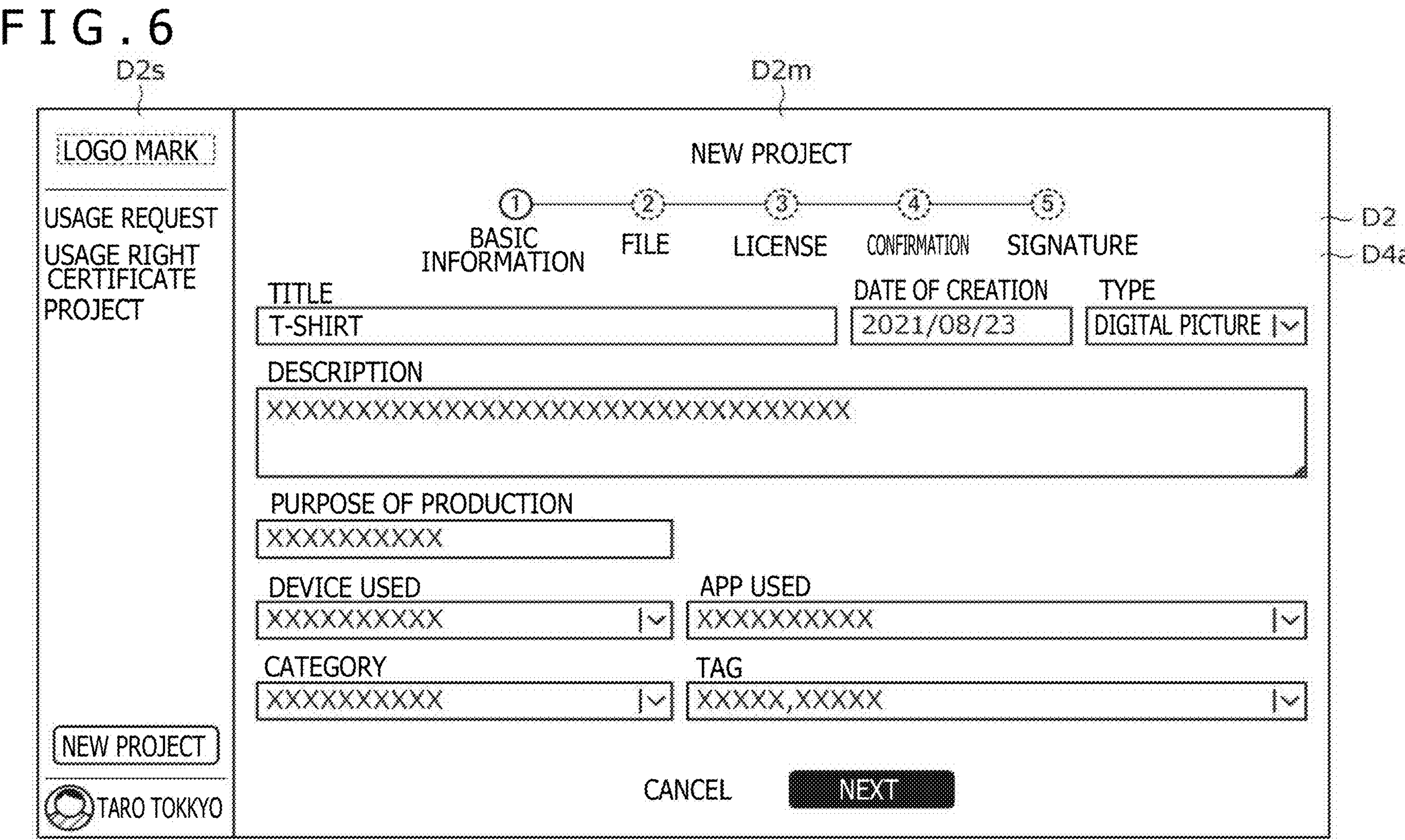
FIG. 6 is a diagram illustrating a project registration screen D4*a* for allowing a user to input basic information of a project.

The project registration screen D4*a* is a screen for allowing the user to register a new project. As illustrated in FIG. 6, the project registration screen D4*a* is configured such that processing can be advanced in order of the input of basic information of the project, selection of a file constituting artwork, the setting of a license condition(s), confirmation, and a signature. The project registration screens D4*a* to D4*e* illustrated in FIGS. 6 to 10 respectively correspond to respective items of processing for the input of the basic information of the project, the selection of the file constituting the artwork, the setting of the license condition(s), the confirmation, and the signature. The description will be given in order below.

Described with reference first to FIG. 6, the project registration screen D4*a* for allowing the user to input the basic information of the project includes various kinds of input fields (or selection fields) for inputting the basic information of the project such as a title of the project, a date of creation of the project, a type of the artwork constituting the project, a description of the project, a purpose of the production of the project and the artwork, a device used for the production of the artwork, an app used for the production of the artwork, and a category and a tag to be used in searching for the project or the artwork afterward. The basic information input here constitutes a part of metadata of the project. When the user depresses a "next" button on the project registration screen D4*a,* the project management app 3*a* displays a project registration screen D4*b* illustrated in FIG. 7 within the main screen D2*m*. When the user depresses a "cancel" button, on the other hand, the project management app 3*a* resets the input contents, and displays the initial screen D2 illustrated in FIG. 5 again.

Figure 7:
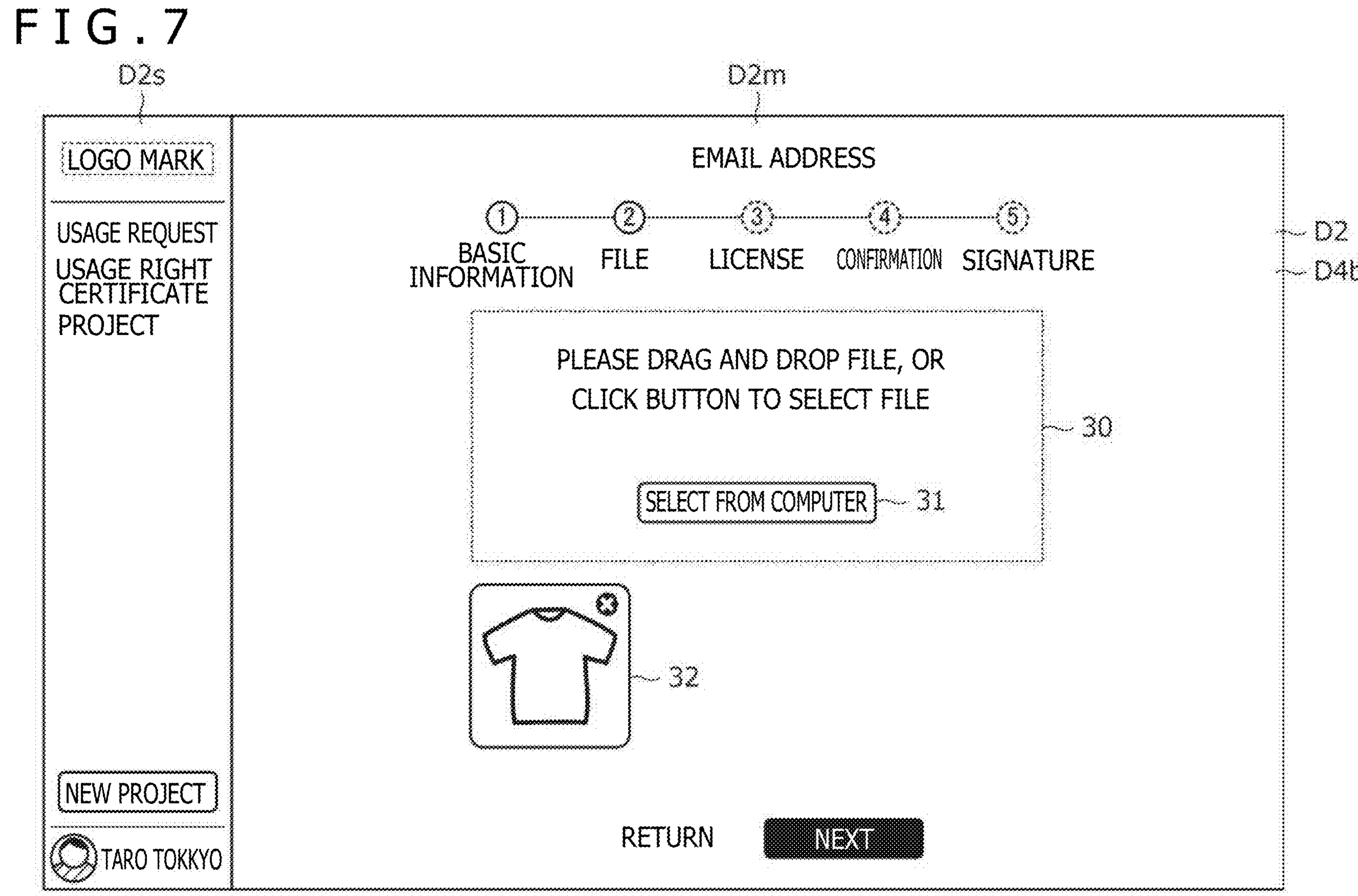
FIG. 7 is a diagram illustrating a project registration screen D4*b* for allowing the user to select a file constituting first artwork of the project.

The project registration screen D4*b* is a screen for allowing the user to select a file constituting first artwork of the project. As illustrated in FIG. 7, the project registration screen D4*b* includes a drop region 30 and a file selection button 31. The file that can be selected by the user on the project registration screen D4*b* is limited to a file constituting artwork, such as an image file, a moving image file, or a 3D (Three Dimensional) data file, for example. In the following, the file uploaded by the user here will be referred to as a "file F1," and artwork constituted by the file F1 will be referred to as "artwork A1." The artwork A1 as the first artwork of the project is preferably artwork in process of creation that will not be distributed later (that is, that cannot be owned by other than the artist).

When the user drags and drops the file F1 into the drop region 30 on the project registration screen D4*b,* or when the user selects the file F1 on a file selection screen displayed by the file selection button 31 being depressed, the project management app 3*a* obtains a path to the file F1 within the user terminal 3, and generates an icon 32 of the file F1 and displays the icon 32 within the screen. When the user thereafter depresses a "next" button, the project management app 3*a* displays a project registration screen D4*c* illustrated in FIG. 8 within the main screen D2*m*. When the user depresses a "return" button, on the other hand, the project management app 3*a* resets the selection result, and displays the project registration screen D4*a* illustrated in FIG. 6 within the main screen D2*m* again.

Figure 8:
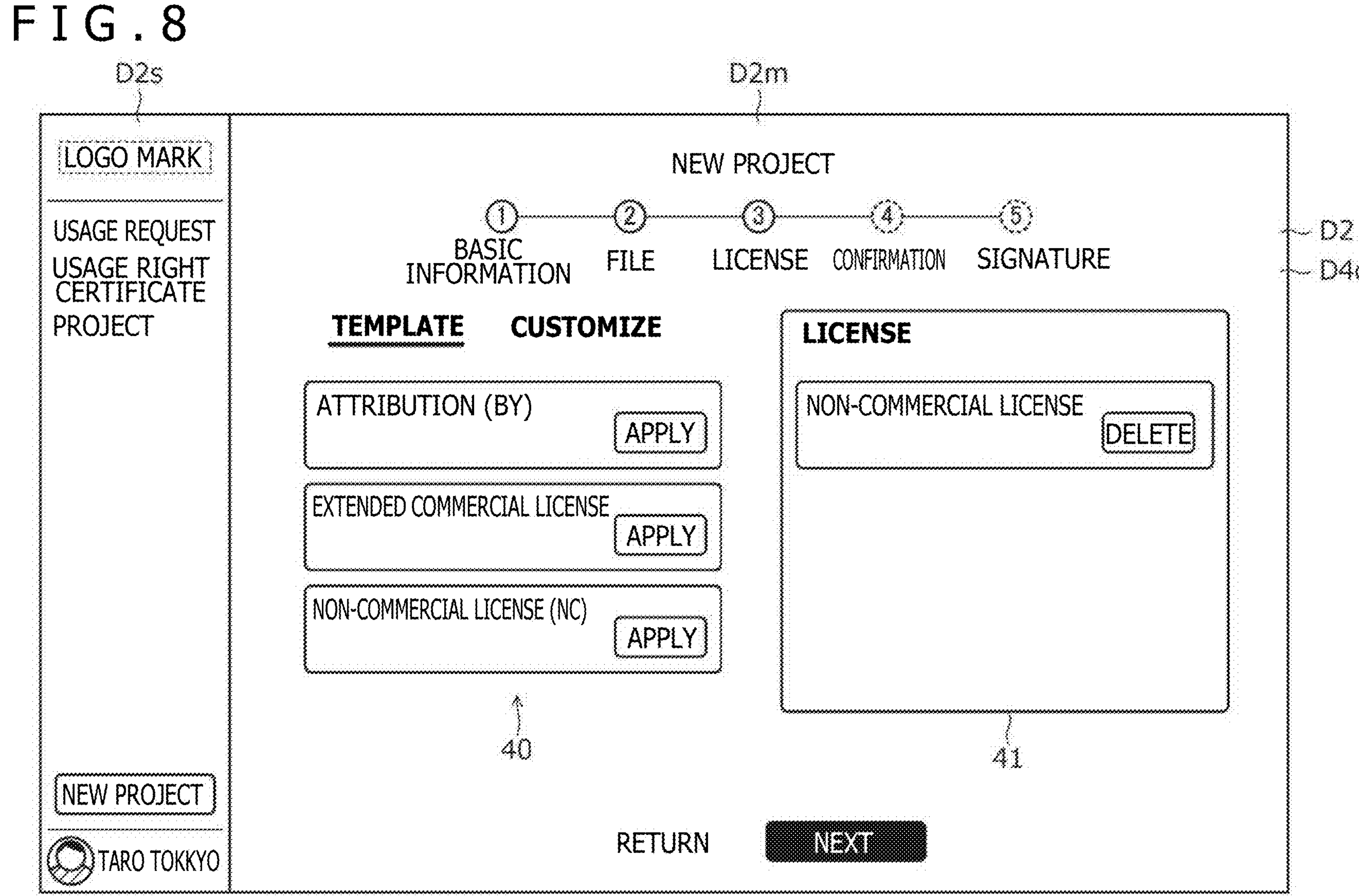
FIG. 8 is a diagram illustrating a project registration screen D4*c* for allowing the user to set a condition(s) at a time of licensing the usage right of the artwork in the project to another person.

The project registration screen D4*c* is a screen for allowing the user to set a condition(s) at a time of licensing the usage right of the artwork in the project to another person. As illustrated in FIG. 8, the project registration screen D4*c* includes a setting region 40 for the user to select or input a license condition(s); and a display region 41 that displays a list of the license condition(s) selected or input by the user. As an example of license conditions selectable by the user, FIG. 8 illustrates the following three: an attribution (BY) permitting the duplication, distribution, display, and execution of the artwork, production of a derivative piece of work, and a remix on condition that a predetermined condition be followed; an extended commercial license permitting the commercial usage of the artwork without a quantitative limitation; and a non-commercial license (NC) permitting the duplication, distribution, display, and execution of the artwork only in non-commercial usage. However, other kinds of licenses may naturally be made selectable.

When the user selects or inputs one or more license conditions in the setting region 40, the project management app 3*a* sets an icon(s) representing the selected or input license condition(s) within the display region 41. The thus set license condition(s) constitute(s) the metadata of the project together with the basic information of the project input on the project registration screen D4*a*. When the user depresses a "next" button on the project registration screen D4*c,* the project management app 3*a* displays a project registration screen D4*d* illustrated in FIG. 9 within the main screen D2*m*. When the user depresses a "return" button, on the other hand, the project management app 3*a* resets the setting contents, and displays the project registration screen D4*b* illustrated in FIG. 7 within the main screen D2*m* again.

The project registration screen D4*d* is a screen for allowing the user to confirm the input results thus far. As illustrated in FIG. 9, the project registration screen D4*d* includes a display section 50 of the basic information of the project, an icon 51 of the file, and a display region 52 of the list of the license condition(s). The display section 50 displays the basic information input on the project registration screen D4*a* in FIG. 6. The icon 51 is an icon representing the file F1 selected on the project registration screen D4*b* in FIG. 7. The icon 51 may be the same as the icon 32 illustrated in FIG. 7. The display region 52 displays the list of the license condition(s) set on the project registration screen D4*c* in FIG. 8. When the user depresses a "next" button on the project registration screen D4*d,* the project management app 3*a* displays a project registration screen D4*c* illustrated in FIG. 10 within the main screen D2*m*. When the user depresses a "return" button, on the other hand, the project management app 3*a* displays the project registration screen D4*d* illustrated in FIG. 9 within the main screen D2*m* again.

The project registration screen D4*e* is a screen for obtaining a signature of the user. As illustrated in FIG. 10, the project registration screen D4*e* includes a signature region 60. The signature region 60 is a region configured to enable a pen input by the pen P illustrated also in FIG. 1 to be performed. When the user depresses a "complete" button after making an entry within the signature region 60, the project management app 3*a* obtains biometric signature data including dynamic signature data representing the signature entered within the signature region 60 by the user. Then, the project management app 3*a* generates a registration request for the project, the registration request including the obtained biometric signature data, the file F1, and the metadata of the project, and transmits the registration request to the Web server 4. Receiving this registration request, the Web server 4 performs processing for registering the requested project with the Web server 4 itself. As will be described later in detail with reference to FIG. 13 and FIG. 14, this processing includes the generation of a DID of the project and the embedment of a watermark indicating the DID of the project in the artwork A1. In the following, the file constituting the artwork A1 in which the watermark is thus embedded will be referred to as a "file F1*w*."

After receiving a notification that the registration of the project is completed from the Web server 4, the project management app 3*a* makes a pop-up display of a registration completion screen C2 including a download button 61 for the file F1*w*, as illustrated in FIG. 10. When the user depresses the download button 61 on the registration completion screen C2, the project management app 3*a* downloads the file F1*w* to a folder specified by the user within the user terminal 3, and displays a project detail screen D5 illustrated in FIG. 11 within the main screen D2*m*.

Figure 11:
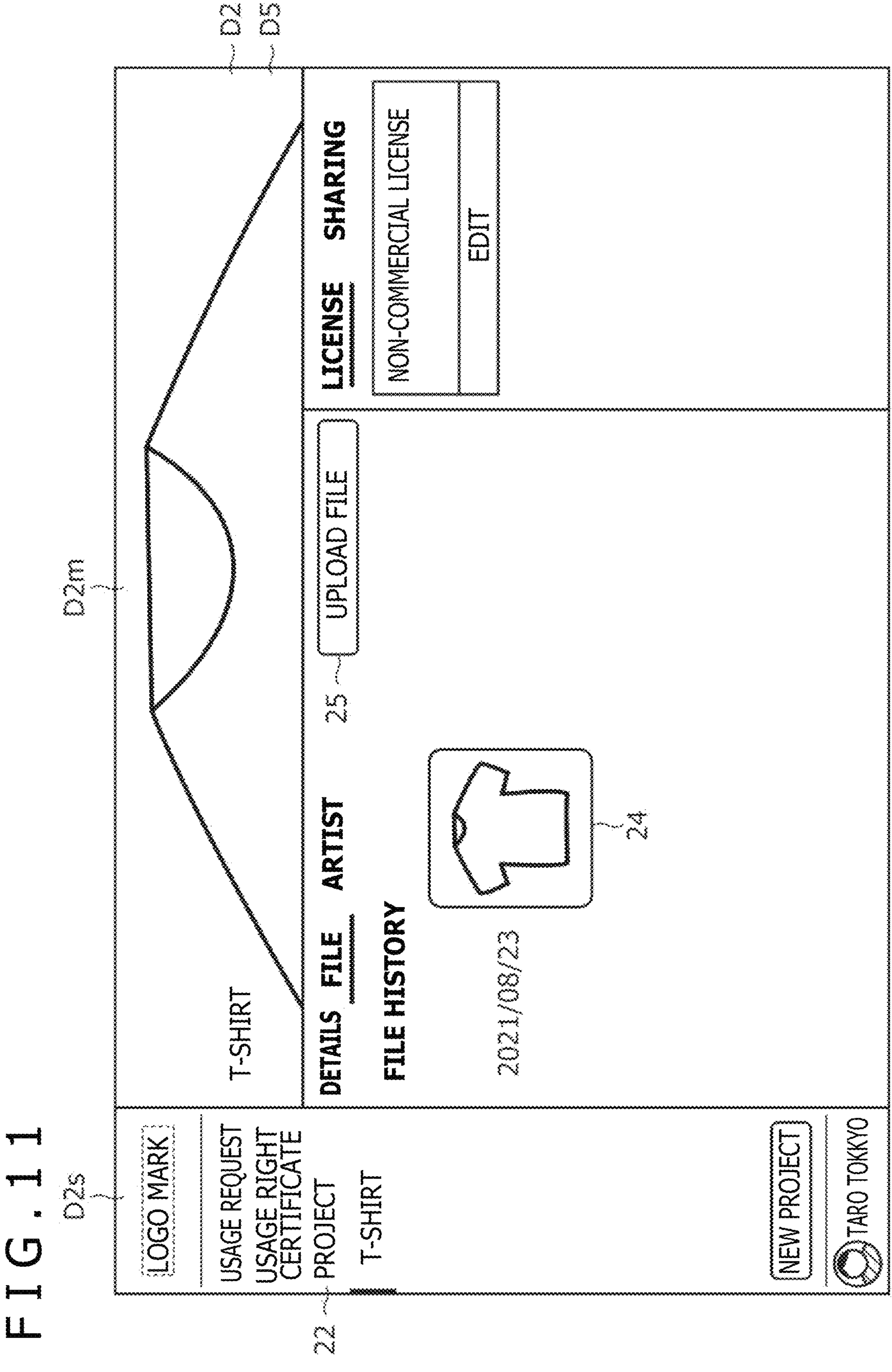
FIG. 11 is a diagram illustrating a project detail screen D5 indicating details of the project (state after the project including artwork A1 is registered).

The project detail screen D5 is a screen illustrating details of the corresponding project. As illustrated in FIG. 11, the project detail screen D5 includes an icon 24 of the artwork included in the project and an upload button 25. The icon 24 has a role of notifying the user of the artwork included in the project and has a role of serving as a download button for performing a re-download. The upload button 25 is a button used to add artwork to the project. Processing in a case where the user depresses the upload button 25 will be described later in detail with reference to FIGS. 16 to 21.

As illustrated in FIG. 11, the project management app 3*a* is configured to make a list display of individual project names under the project menu 22 within the side menu screen D2*s*. FIG. 11 illustrates an example in which only one project name of "T-shirt" is displayed. However, in a case where there are a plurality of projects, a plurality of project names are so arranged as to be lined up in a vertical direction. Each of the one or more project names displayed in a list has a role as a hyperlink to the project detail screen D5. That is, when the user depresses one of the project names, the project management app 3*a* displays the project detail screen D5 of the project within the main screen D2*m*.

FIG. 12 is a sequence diagram illustrating processing in a case where the user depresses the login button 14 illustrated in FIG. 4. In this case, detecting the depression of the login button 14, the project management app 3*a* first performs login processing with the Web server 4 by using an input email address and an input password (S1).

When the login succeeds, the Web server 4 determines whether or not a key pair (a combination of a public key and a private key of a public key cryptosystem; the same applies hereinafter) of the user is stored (S2). When determining as a result of the determination that the key pair of the user is not stored, the Web server 4 generates and stores a new key pair of the user (S3), and transmits the generated key pair to the project management app 3*a* (S4). The project management app 3*a* stores the thus received key pair of the user. When determining that the key pair of the user is stored, on the other hand, the Web server 4 advances the processing to S5 without performing S3 and S4.

Next, the Web server 4 determines whether or not a DID and a DID document of the user are stored (S5). When determining as a result of the determination that the DID and the DID document of the user are not stored, the Web server 4 generates and stores a new DID and a new DID document of the user (S6). When determining that the DID and the DID document of the user are stored, on the other hand, the Web server 4 advances the processing to S11 without performing processing from S6 to S10 to be described later.

FIG. 15A is a diagram illustrating an example of a configuration of the DID document of the user generated by the Web server 4 at S6. As illustrated in the figure, the DID document of the user can include the whole or a part of the user information and the public key of the user generated at S3.

Described with reference to FIG. 12 again, after generating and storing the DID and the DID document of the user, the Web server 4 registers the generated DID document with the distributed file system 6 (S7). The Web server 4 also generates a transaction indicating that the DID is generated for the wallet address of the user, and issues the transaction to the blockchain network 7 (S8). When the recording of the issued transaction on the blockchain is completed, the blockchain network 7 issues a transaction ID (transaction ID of the DID of the user) (S9). The Web server 4 receives the thus issued transaction ID from the blockchain network 7, and stores the transaction ID in association with the DID of the user. In addition, the Web server 4 transmits the generated DID and the generated DID document of the user to the project management app 3*a* (S10). The project management app 3*a* stores the thus received DID and the thus received DID document of the user.

Next, the Web server 4 generates the initial screen D2 illustrated in FIG. 5, and transmits the initial screen D2 to the project management app 3*a* (S11). The project management app 3*a* displays the thus received initial screen D2 (S12). Processing performed by the project management app 3*a* on the initial screen D2 is as described with reference to FIGS. 5 to 10.

FIG. 13 and FIG. 14 are a sequence diagram illustrating processing in a case where the user depresses the "complete" button illustrated in FIG. 10. Detecting the depression of the "complete" button illustrated in FIG. 10, the project management app 3*a* transmits a registration request for the project including the artwork A1 to the Web server 4, as illustrated in FIG. 13 (S20). This registration request includes the DID of the user, the file F1 constituting the artwork A1, the metadata of the project (metadata input in FIG. 6 and FIG. 8), the biometric signature data (biometric signature data including the dynamic signature data representing the signature entered in FIG. 10), and an electronic signature of the user. Of these, the electronic signature of the user is data generated by encrypting the hash value of data other than the electronic signature included in the registration request with use of the private key of the user, and is generated before the transmission of the registration request by the project management app 3*a*. Incidentally, while FIG. 13 and each of subsequent figures illustrate "FSS" as the biometric signature data, biometric signature data other than FSS may naturally be used.

Receiving the registration request for the project, the Web server 4 first confirms the validity of the electronic signature and the biometric signature data (S21 and S22). Here, it suffices to confirm the validity of the electronic signature by decrypting the electronic signature included in the registration request by the public key of the user and deriving the hash value of the data constituting the registration request (excluding the electronic signature), and making a comparison therebetween. In addition, it suffices to confirm the validity of the biometric signature data by extracting one or more pieces of dynamic signature data corresponding to the DID of the user included in the registration request from a database storing the one or more pieces of dynamic signature data in association with the DID of the user, and comparing the one or more pieces of dynamic signature data with the dynamic signature data included in the biometric signature data. Incidentally, when the validity of the biometric signature data is confirmed as a result of this comparison, the Web server 4 preferably adds to the database the dynamic signature data included in the registration request, as new dynamic signature data of the user.

Next, the Web server 4 generates and stores the key pair of the project (S23), and encrypts data related to the artwork A1 by the generated private key of the project (S24). Here, the data related to the artwork A1 as a target of the encryption at S24 is preferably data including the file F1 constituting the artwork A1 and the metadata of the project. In the following, the data encrypted at S24 will be referred to as "artwork A1 data."

Next, the Web server 4 registers the encrypted artwork A1 data with the distributed file system 6 (S25), and transmits, to the project management app 3*a*, a content ID as the hash value of the encrypted artwork A1 data and an address for externally accessing the encrypted artwork A1 data (address obtained by adding the content ID to the URL (Uniform Resource Locator) of the distributed file system 6) (S26). The project management app 3*a* stores the content ID and the address thus received.

Next, the Web server 4 generates and stores the DID and the DID document of the project (S27).

FIG. 15B is a diagram illustrating an example of a configuration of the DID document of the project generated by the Web server 4 at S27. As illustrated in the figure, the DID document of the project can include the DID of the user as an artist, the hash value of the biometric signature data of the user, the address of the encrypted artwork A1 data, the public key of the project, and the whole or a part of the metadata of the project.

Described with reference to FIG. 13 again, after generating and storing the DID and the DID document of the project, the Web server 4 registers the generated DID document with the distributed file system 6 (S28). The Web server 4 also generates a transaction indicating that the DID is generated for the wallet address of the user and issues the transaction to the blockchain network 7 (S29). When the recording of the issued transaction on the blockchain is completed, the blockchain network 7 issues a transaction ID (transaction ID of the DID of the project) (S30). The Web server 4 receives the thus issued transaction ID from the blockchain network 7 and stores the transaction ID in association with the DID of the project. In addition, the Web server 4 transmits the generated DID and the generated DID document of the project also to the project management app 3*a* (S31). The project management app 3*a* stores the thus received DID and the thus received DID document of the project.

Described next with reference to FIG. 14, the Web server 4 generates a watermark in reference to the generated DID of the project (S32). Then, the Web server 4 generates the file F1*w* by embedding the generated watermark in the artwork A1 and stores the file F1*w* in association with the DID of the project (S33). Incidentally, as a specific method for generating and embedding the watermark, it is preferable to generate a two-dimensional code indicating the DID of the project, and embed the generated two-dimensional code in the artwork A1 by using an approach that uses singular value decomposition (SVD: Singular Value Decomposition) (SVD Based Approach), an approach that uses a discrete cosine transform (DCT: Discrete Cosine Transform) (Optimal DCT-Psychovisual Threshold), an approach that uses encoding in a YCbCr color space (YCbCr Color Space Encoding Approach), or an approach that uses multi-resolution analysis (Multi-resolution Wavelet Decomposition).

Next, the Web server 4 generates an electronic signature by encrypting the hash value (identifier) of the DID document of the project with use of the private key of the user (S34). Then, the Web server 4 issues VC of the project including the generated electronic signature and the transaction ID of the DID of the project, and stores the VC of the project in association with the DID of the project (S35).

FIG. 15C is a diagram illustrating an example of a configuration of the VC of the project issued by the Web server 4 at S35. As illustrated in the figure, the VC of the project can include an issuance date, an issuer, the electronic signature of the issuer, and the transaction ID. A date of issuance of the VC by the Web server 4 is set as the issuance date. The DID of the user is set as the issuer. The electronic signature generated at S34 in FIG. 14 is set as the electronic signature of the issuer. The transaction ID of the DID of the project is set as the transaction ID.

Described with reference to FIG. 14 again, after generating and storing the VC of the project, the Web server 4 transmits the stored VC of the project to the project management app 3*a* (S36). The thus transmitted VC of the project serves also as a notification of completion of the registration. After storing the received VC of the project, the project management app 3*a* displays the registration completion screen C2 illustrated in FIG. 10 (S37). When the user thereafter depresses the download button 61 illustrated in FIG. 10, a download instruction is transmitted from the project management app 3*a* to the Web server 4 (S38). In response to this, the file F1*w* is transmitted from the Web server 4 to the project management app 3*a* (S39).

As described thus far, according to the artwork management system 1 of the present embodiment, the project for managing the production history of the artwork can be registered with the Web server 4. In addition, the DID of the project can be embedded as a watermark in the artwork A1, and the file F1*w* constituting the artwork A1 provided with the watermark can be downloaded to the user terminal 3. The thus downloaded file F1*w* is necessary when the copyright certificate and the usage right certificate of the artwork A1 are issued to be afterward.

Processing for Adding Artwork to Project

Figure 16:
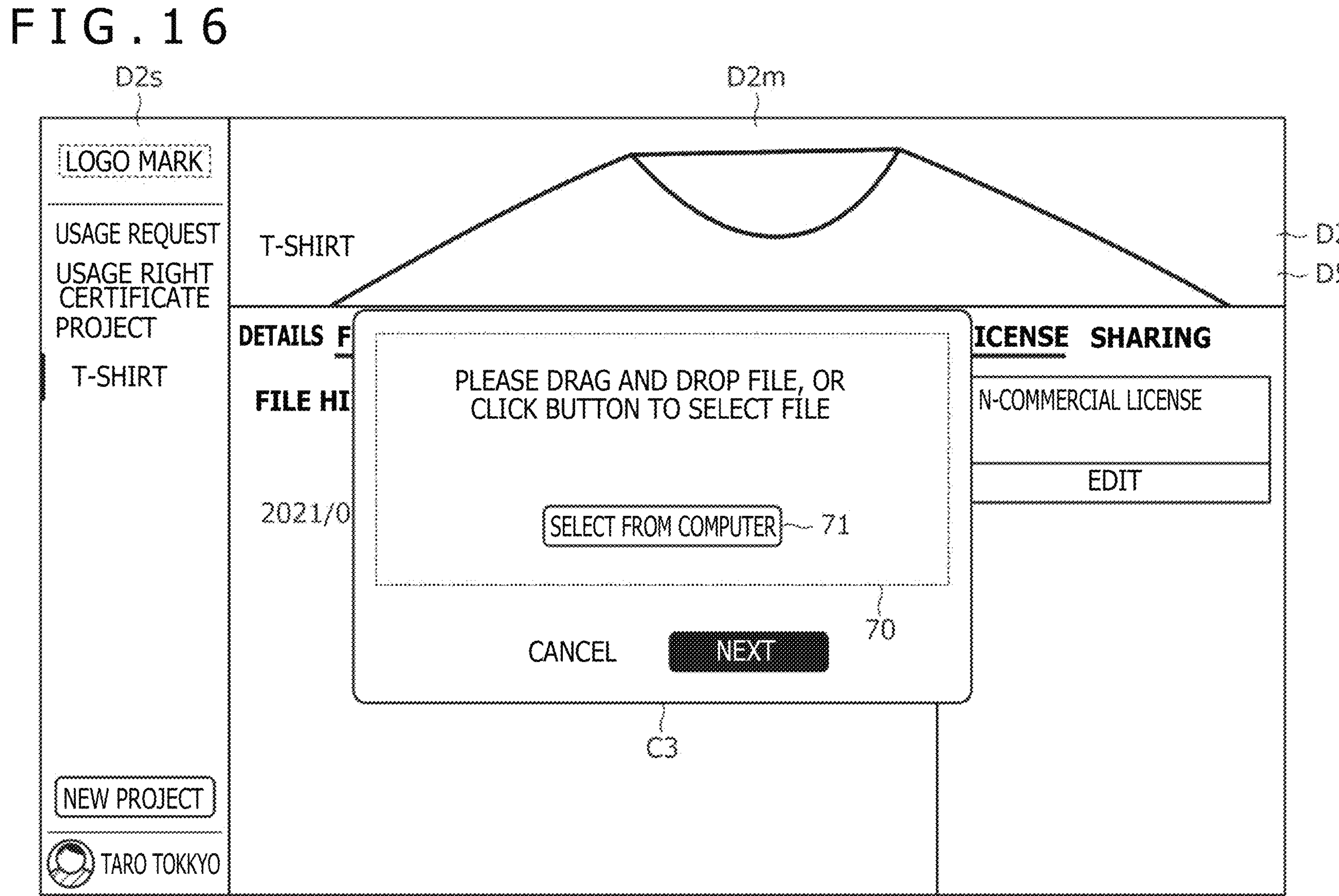
FIG. 16 is a diagram illustrating a screen displayed when the user depresses an upload button 25 on the project detail screen D5 illustrated in FIG. 11.
Figure 18:
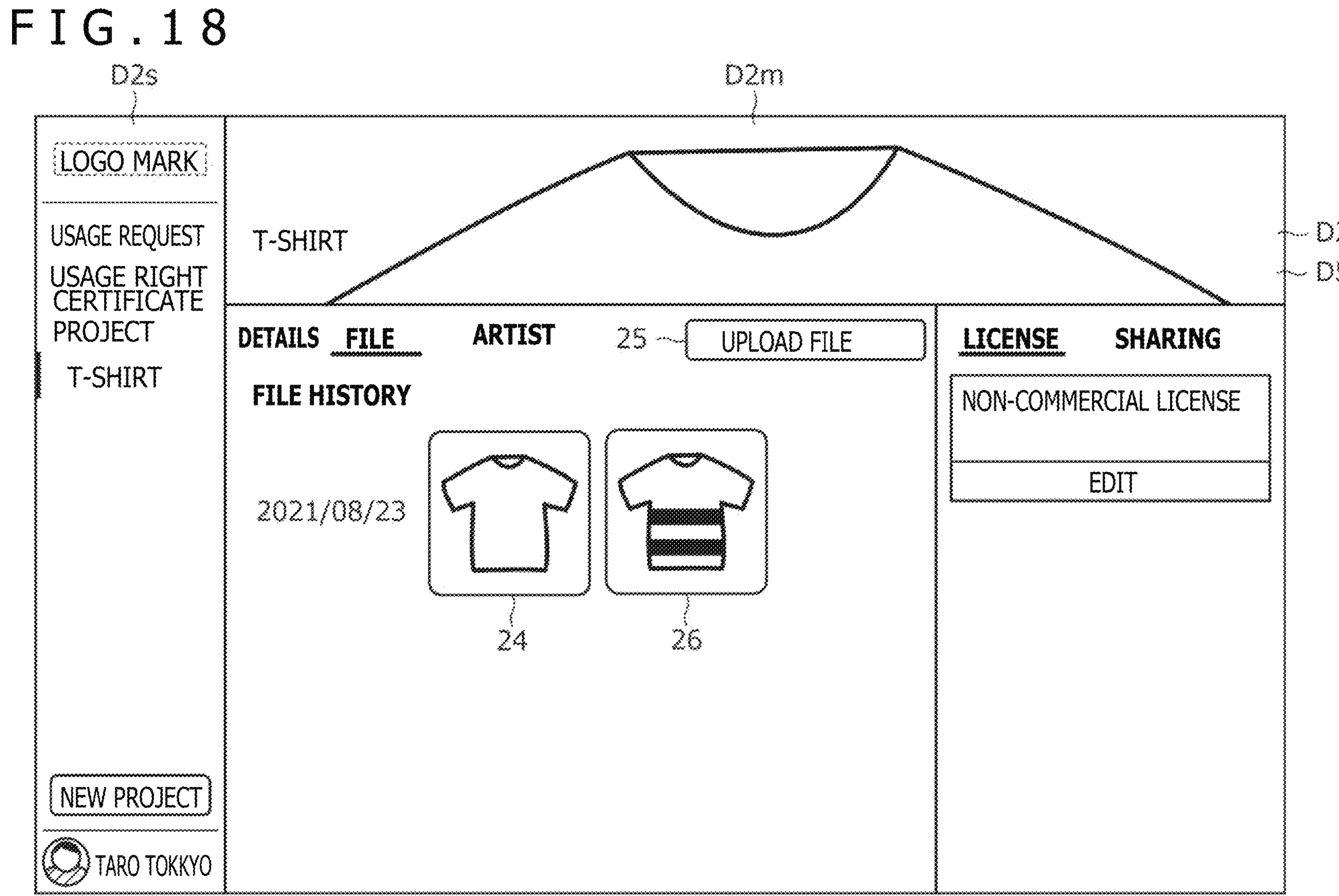
FIG. 18 is a diagram illustrating the project detail screen D5 indicating details of the project (state after artwork A2 is additionally registered).

FIGS. 16 to 18 are diagrams illustrating an example of screens of the project management app 3*a* displayed on the display of the user terminal 3 when artwork is added to the registered project. In the following, the artwork that the user intends to register additionally will be referred to as "artwork A2," and a file constituting the artwork A2 will be referred to as a "file F2." As an example, the artwork A2 results from completion of the artwork A1 being created, and is produced as artwork to be distributed.

FIG. 16 illustrates a screen displayed when the user depresses the upload button 25 on the project detail screen D5 illustrated in FIG. 11. As illustrated in the figure, detecting the depression of the upload button 25, the project management app 3*a* makes a pop-up display of a file selection screen C3 including a drop region 70 and a file selection button 71. When the user drags and drops the file F2 into the drop region 70 on the file selection screen C3, or when the user selects the file F2 on a file selection screen displayed by depression of the file selection button 71, the project management app 3*a* obtains a path to the file F2 within the user terminal 3. When the user thereafter depresses a "next" button within the file selection screen C3, the project management app 3*a* erases the file selection screen C3, and makes a pop-up display of a signature screen C4 illustrated in FIG. 17. When the user depresses a "cancel" button within the file selection screen C3, on the other hand, the project management app 3*a* performs only the processing of erasing the file selection screen C3.

The signature screen C4 is a screen for obtaining a signature of the user. As illustrated in FIG. 17, the signature screen C4 includes a signature region 72. As with the signature region 60 illustrated in FIG. 10, the signature region 72 is a region configured to enable a pen input by the pen P (see FIG. 1) to be performed. When the user depresses a "complete" button after making an entry within the signature region 72, the project management app 3*a* obtains biometric signature data including dynamic signature data representing the signature entered within the signature region 72 by the user. Then, the project management app 3*a* generates an additional registration request for the artwork A2, the additional registration request including the obtained biometric signature data and the file F2, and transmits the additional registration request to the Web server 4. Receiving this additional registration request, the Web server 4 performs processing for additionally registering the artwork A2 with the corresponding project. As will be described later in detail with reference to FIG. 19 and FIG. 20, this processing includes processing of embedding the watermark indicating the DID of the project in the artwork A2. In the following description, the file constituting the artwork A2 in which the watermark is thus embedded will be referred to as a "file F2*w*."

After receiving a notification that the additional registration of the artwork A2 is completed from the Web server 4, the project management app 3*a* makes a pop-up display of a registration completion screen C5 including a download button 73 for the file F2*w*, as illustrated in FIG. 17. When the user depresses the download button 73 on the registration completion screen C5, the project management app 3*a* downloads the file F2*w* to a folder specified by the user within the user terminal 3, and displays a project detail screen D5 illustrated in FIG. 18 within the main screen D2*m*.

As is understood by making a comparison between the project detail screen D5 illustrated in FIG. 18 and the project detail screen D5 illustrated in FIG. 11, an icon 26 representing the artwork A2 is added on the project detail screen D5 illustrated in FIG. 18. Because the project management app 3*a* thus additionally displays the icon 26 within the project detail screen D5, the user can check an artwork update history by checking the project detail screen D5. When artwork is desired to further be added to this project, it suffices for the user to depress the upload button 25 again. Processing similar to the processing performed when the upload button 25 is depressed in the state of FIG. 11 is thereby performed again, so that artwork can further be added to the project.

FIG. 19 and FIG. 20 are a sequence diagram illustrating processing in a case where the user depresses the "complete" button illustrated in FIG. 17. Detecting the depression of the "complete" button illustrated in FIG. 17, the project management app 3*a* transmits an additional registration request for the artwork A2 to the Web server 4, as illustrated in FIG. 19 (S40). This additional registration request includes the DID of the user, the DID of the project, the file F2 constituting the artwork A2, the biometric signature data (biometric signature data including the dynamic signature data representing the signature entered in FIG. 17), and an electronic signature of the user. The electronic signature of the user is data generated by encrypting the hash value of data other than the electronic signature included in the additional registration request with use of the private key of the user, and is generated before the transmission of the additional registration request by the project management app 3*a*.

Receiving the additional registration request for the artwork A2, the Web server 4 first confirms the validity of the electronic signature and the biometric signature data by processing similar to those in S21 and S22 in FIGS. 13 (S41 and S42). Next, the Web server 4 generates and stores a key pair of the artwork A2 (S43), and encrypts data related to the artwork A2 by the generated private key of the artwork A2 (S44). Here, the data related to the artwork A2 as a target of the encryption at S44 is preferably data including the file F2 constituting the artwork A2 and the metadata of the project. In the following description, the data encrypted at S44 will be referred to as "artwork A2 data."

Next, the Web server 4 registers the encrypted artwork A2 data with the distributed file system 6 (S45), and transmits, to the project management app 3*a,* a content ID as the hash value of the encrypted artwork A2 data and an address for externally accessing the encrypted artwork A2 data (address obtained by adding the content ID to the URL of the distributed file system 6) (S46). The project management app 3*a* stores the content ID and the address thus received.

Next, the Web server 4 generates and stores the DID and the DID document of the artwork A2 (S47).

FIG. 21A is a diagram illustrating an example of a configuration of the DID document of the artwork A2 generated by the Web server 4 at S47. As illustrated in the figure, the DID document of the artwork A2 may include the DID of the user as an artist, the hash value of the biometric signature data of the user, the address of the encrypted artwork A2 data, the public key of the artwork A2, and the whole or part of the metadata of the project. Since the address of the encrypted artwork A2 data and the public key of the artwork A2 are included, a person who has obtained the DID document of the artwork A2 can obtain the artwork A2 by downloading the encrypted artwork A2 data from the distributed file system 6 and decrypting the encrypted artwork A2 data by the public key of the artwork A2.

Described with reference to FIG. 19 again, after generating and storing the DID and the DID document of the artwork A2, the Web server 4 registers the generated DID document with the distributed file system 6 (S48). The Web server 4 also generates a transaction indicating that the DID is generated for the wallet address of the user and issues the transaction to the blockchain network 7 (S49). When the recording of the issued transaction on the blockchain is completed, the blockchain network 7 issues a transaction ID (transaction ID of the DID of the artwork A2) (S50). The Web server 4 receives the thus issued transaction ID from the blockchain network 7 and stores the transaction ID in association with the DID of the artwork A2. In addition, the Web server 4 transmits the generated DID and the generated DID document of the artwork A2 also to the project management app 3*a* (S51). The project management app 3*a* stores the thus received DID and the thus received DID document of the artwork A2.

Described next with reference to FIG. 20, the Web server 4 generates the file F2*w* by embedding the watermark generated at S32 in FIG. 14 (watermark generated in reference to the DID of the project) in the artwork A2, and stores the file F2*w* in association with each of the DID of the artwork A2 and the DID of the project (S52). Incidentally, the Web server 4 may generate the file F2*w* by generating here anew the watermark based on the DID of the project and embedding the generated watermark in the artwork A2. In addition, a specific method for generating and embedding the watermark may be similar to those in S32 and S33 illustrated in FIG. 14.

Next, the Web server 4 generates an electronic signature by encrypting the hash value of the DID document of the artwork A2 with use of the private key of the user (S53). Then, the Web server 4 issues VC of the artwork A2, the VC including the generated electronic signature and the transaction ID of the DID of the artwork A2, and stores the VC of the artwork A2 in association with each of the DID of the artwork A2 and the DID of the project (S54).

FIG. 21B is a diagram illustrating an example of a configuration of the VC of the artwork A2 issued by the Web server 4 at S54. As illustrated in the figure, the configuration of the VC of the artwork A2 is similar to the configuration of the VC of the project illustrated in FIG. 15C. A date of issuance of the VC by the Web server 4 is set as the issuance date. The DID of the user is set as the issuer. The electronic signature generated at S53 in FIG. 20 is set as the electronic signature of the issuer. The transaction ID of the DID of the artwork A2 is set as the transaction ID.

Described with reference to FIG. 20 again, after generating and storing the VC of the artwork A2, the Web server 4 transmits the stored VC of the artwork A2 to the project management app 3*a* (S55). The thus transmitted VC of the artwork A2 serves also as a notification of completion of the additional registration. After storing the received VC of the artwork A2, the project management app 3*a* displays the registration completion screen C5 illustrated in FIG. 17 (S56). When the user thereafter depresses the download button 73 illustrated in FIG. 17, a download instruction is transmitted from the project management app 3*a* to the Web server 4 (S57). In response to this, the file F2*w* is transmitted from the Web server 4 to the project management app 3*a* (S58).

As described thus far, according to the artwork management system 1 of the present embodiment, the artwork A2 can be additionally registered with the registered project. In addition, the watermark based on the DID of the project can be embedded also in the artwork A2 that is to be additionally registered, and the file F2*w* constituting the artwork A2 provided with the watermark can be downloaded to the user terminal 3. The thus downloaded file F2*w* is necessary when the copyright certificate and the usage right certificate of the artwork A2 are to be issued afterward.

Processing for Issuing Copyright Certificate of Artwork A2

FIGS. 22 to 26 are diagrams illustrating an example of screens of the certificate management app 3*b* displayed on the display of the user terminal 3 when the copyright certificate of the artwork A2 is to be issued. The user who intends to issue the copyright certificate of the artwork A2 registered in the project starts the certificate management app 3*b* on the user terminal 3 of the user himself/herself, and performs the issuance of the copyright certificate in the certificate management app 3*b*. Incidentally, while the following description will be made by taking the copyright certificate of the artwork A2 as an example, the same applies to the copyright certificate of the artwork A1.

Figure 22:
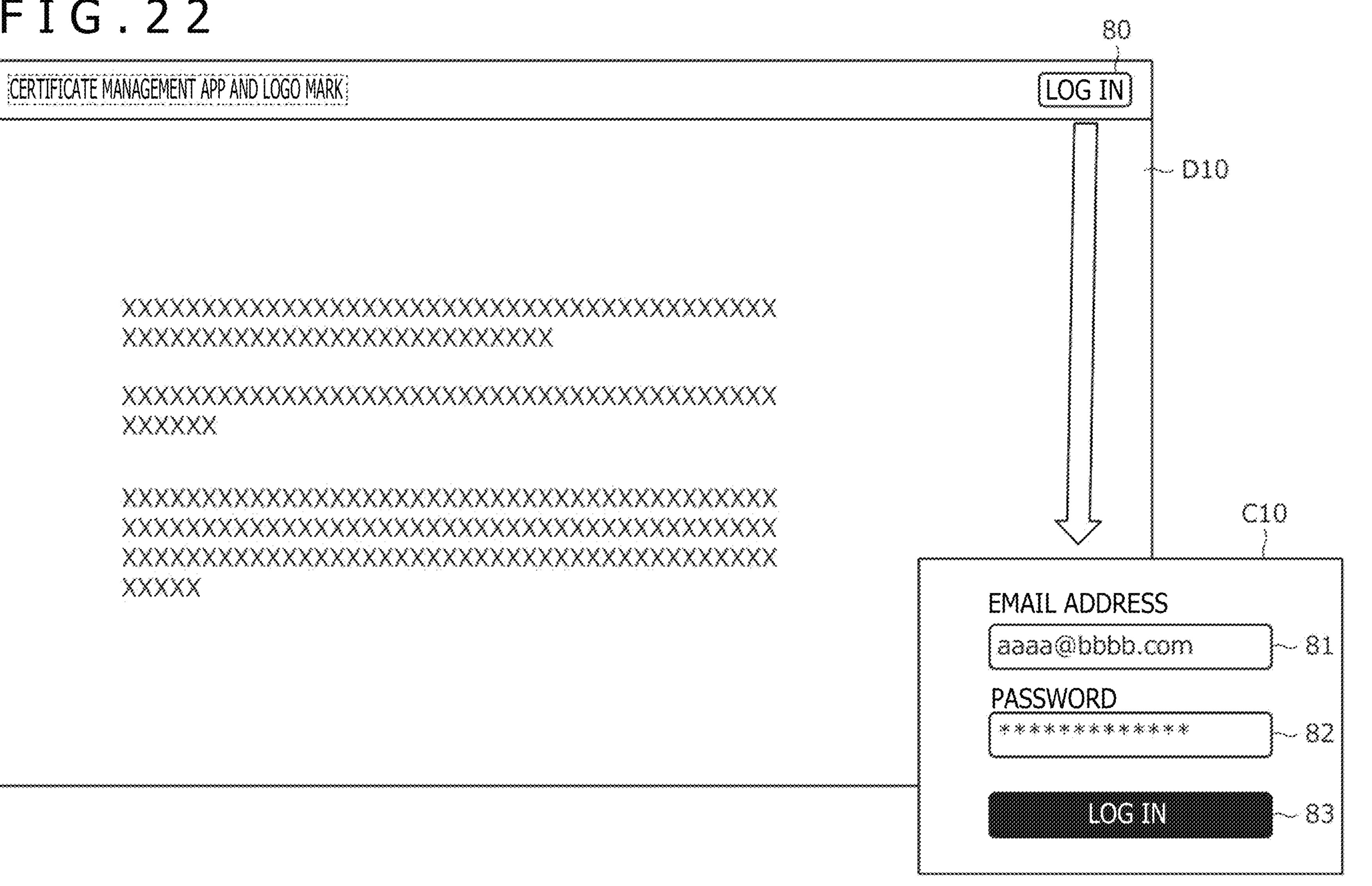
FIG. 22 is a diagram illustrating a start screen D10 displayed at a time of a start of a certificate management app 3*b*.

FIG. 22 illustrates a start screen D10 displayed at a time of a start of the certificate management app 3*b*. As illustrated in the figure, the start screen D10 of the certificate management app 3*b* includes a login button 80. Incidentally, in the present embodiment, description will be made on an assumption that the certificate management app 3*b* and the project management app 3*a* use the common user information. However, the certificate management app 3*b* and the project management app 3*a* may manage the user information individually. In this case, user registration similar to that in the project management app 3*a* is necessary also in the certificate management app 3*b*.

When the user depresses the login button 80 on the start screen D10, the certificate management app 3*b* displays a login screen C10 including an email address input field 81, a password input field 82, and a login button 83, as illustrated in FIG. 22. When the user depresses the login button 83 after inputting the registered email address and the registered password to the email address input field 81 and the password input field 82, respectively, on the login screen C10, the certificate management app 3*b* displays an initial screen D11 illustrated in FIG. 23.

Figure 23:
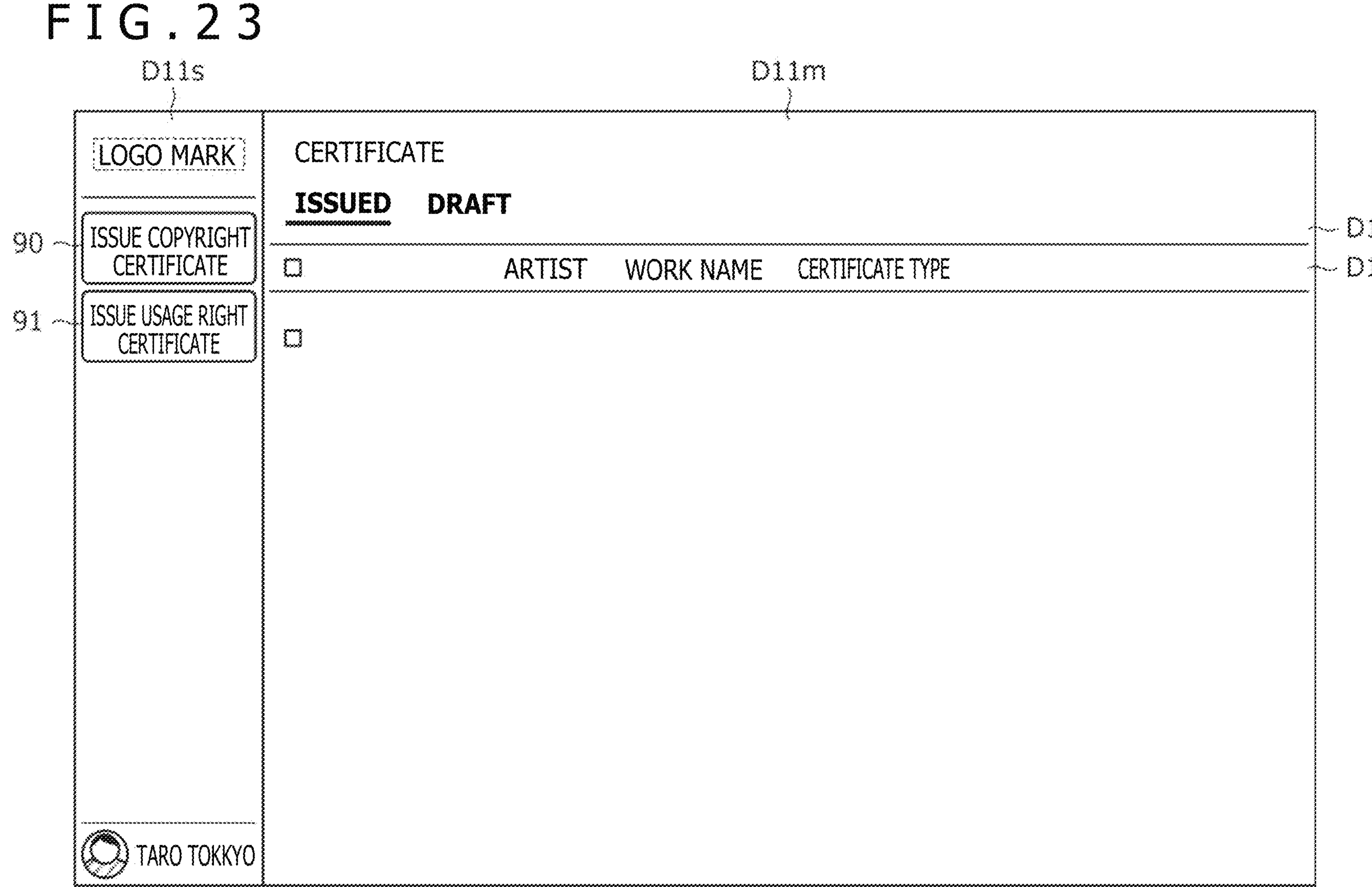
FIG. 23 is a diagram illustrating an initial screen D11 of the certificate management app 3*b* (state in which no certificate is issued).

As illustrated in FIG. 23, as with the initial screen D2 of the project management app 3*a*, the initial screen D11 of the certificate management app 3*b* has a configuration in which a side menu screen D11*s* is disposed along a side on a left side and a main screen D11*m* is disposed on the right side of the side menu screen D11*s*. The main screen D11*m* displays a certificate list screen D12 including a list of issued copyright certificates and usage right certificates. A copyright certificate issuance menu 90 and a usage right certificate issuance menu 91 are arranged in order from an upper end within the side menu screen D11*s*.

The copyright certificate issuance menu 90 is a hyperlink for displaying a screen for issuing a copyright certificate. In addition, the usage right certificate issuance menu 91 is a hyperlink for displaying a screen for issuing a usage right certificate. When the user depresses the copyright certificate issuance menu 90 among these, the certificate management app 3*b* displays a file selection screen D13 illustrated in FIG. 24. Processing in a case where the user depresses the usage right certificate issuance menu 91 will be described later.

The file selection screen D13 is a screen for allowing the user to select a file constituting artwork as a target for which a copyright certificate id to be issued. As illustrated in FIG. 24, the file selection screen D13 includes a file selection button 100 and a drop region 101. When the user selects the file F2*w* on a file selection screen displayed by depression of the file selection button 100, or when the user drags and drops the file F2*w* into the drop region 101, the certificate management app 3*b* obtains a path to the file F2*w* within the user terminal 3, and also generates an icon 102 of the file F2*w* and displays the icon 102 within the file selection screen D13.

Next, the certificate management app 3*b* attempts to detect a watermark from the file F2*w*. When the certificate management app 3*b* can detect the watermark, the certificate management app 3*b* makes a pop-up display of a confirmation screen C11 illustrated in FIG. 24. The confirmation screen C11 is a screen for inquiring of the user whether or not to confirm that the logged-in user is the artist himself/herself who produced the artwork A2. The confirmation screen C11 includes a "YES" button and a "NO" button. Here, when the "YES" button is depressed by the user, the certificate management app 3*b* transmits a character string (=Project DID) represented by the detected watermark to the Web server 4. When the "NO" button is depressed, on the other hand, the certificate management app 3*b* erases the confirmation screen C11 without performing the transmission of the above-described character string.

Processing of the Web server 4 when receiving the above-described character string from the certificate management app 3*b* will be described later in detail. The Web server 4 confirms whether or not the logged-in user is the artist himself/herself who produced the artwork A2, in reference to the thus received DID of the project and information concerning the logged-in user (specifically, the public key of the user). The Web server 4 returns the result (authentication OK or authentication NG) to the certificate management app 3*b*.

When receiving authentication NG (failure in authentication) from the Web server 4, the certificate management app 3*b* ends the processing for issuing a copyright certificate, and also erases the confirmation screen C11 and the file selection screen D13 and displays the initial screen D11 illustrated in FIG. 23 again. When receiving authentication OK (success in authentication) from the Web server 4, on the other hand, the certificate management app 3*b* erases the confirmation screen C11, and thereafter makes a pop-up display of a confirmation screen C12 illustrated in FIG. 24. The confirmation screen C12 is a screen for notifying the user that the logged-in user can be confirmed to be the artist himself/herself who produced the artwork A2, and inquiring of the user whether or not to issue a copyright certificate. The confirmation screen C12 includes a "YES" button and a "NO" button. Here, when the "YES" button is depressed by the user, the certificate management app 3*b* files an application with the Web server 4 for the issuance of a copyright certificate. When the "NO" button is depressed, on the other hand, the certificate management app 3*b* erases the confirmation screen C12 without filing an application for the issuance of a copyright certificate. As will be described later in detail, receiving the application for the issuance of a copyright certificate, the Web server 4 makes the certificate issuing server 5 generate an information input screen D14 illustrated in FIG. 25, receives the information input screen D14 from the certificate issuing server 5, and transfers the information input screen D14 to the certificate management app 3*b*.

Figure 25:
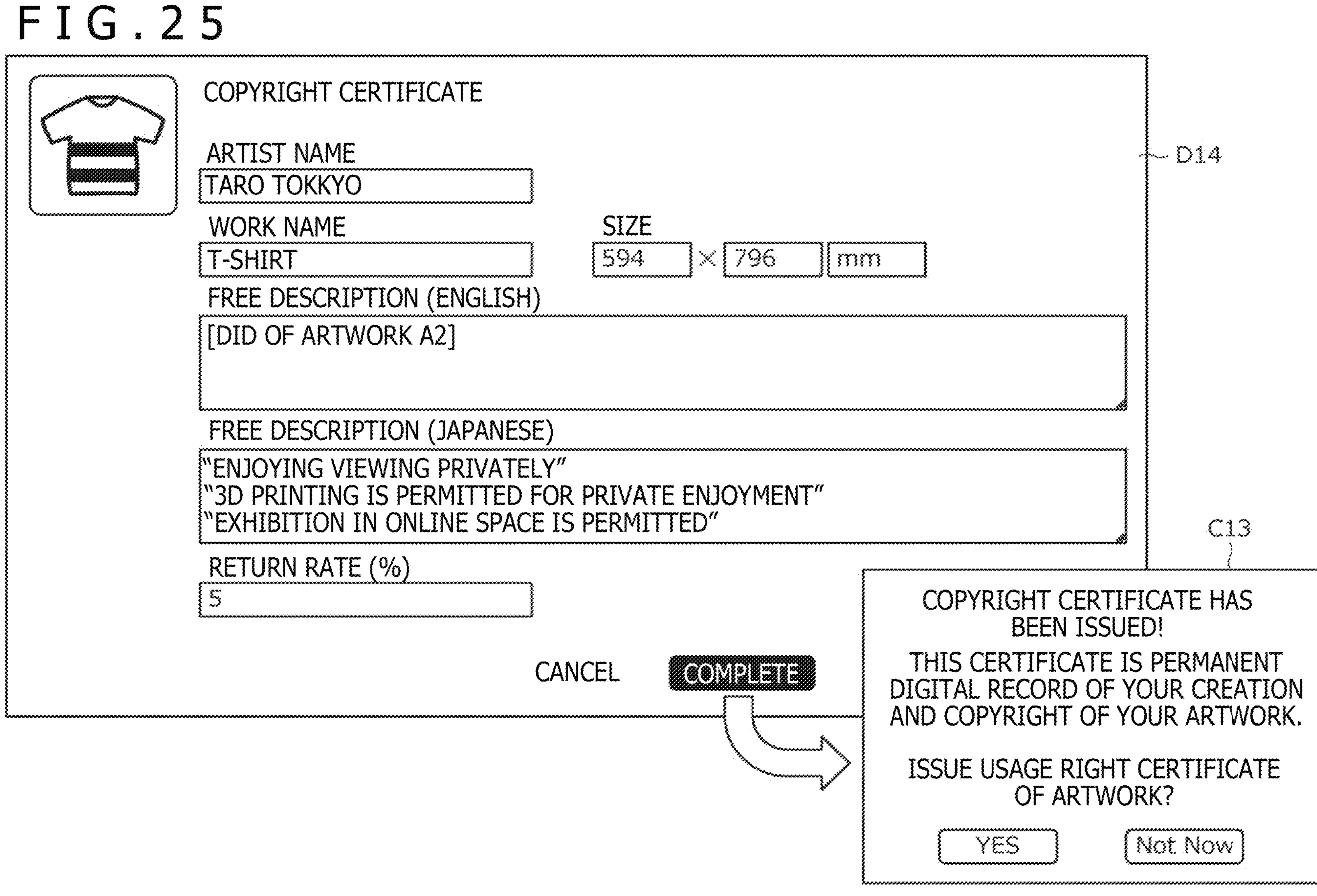
FIG. 25 is a diagram illustrating an information input screen D14 for allowing the user to input or confirm information to be entered in the copyright certificate.

The information input screen D14 is a screen for allowing the user to input or confirm information to be entered in the copyright certificate. As illustrated in FIG. 25, the information input screen D14 includes respective input fields for the name of the artist, the name of the work, the size of the artwork, a free description (English), a free description (Japanese), and a return rate. Of these, the return rate is a numerical value indicating the ratio of an amount of money to be returned to the author in a case where a profit is obtained by the sale, transfer, exhibition, or the like of the artwork A2. The certificate issuing server 5 enters information based on the metadata of the project and the like into the input fields in advance.

When the user depresses a "complete" button within the information input screen D14 after making a necessary entry or correction in each of the input fields of the screen, the certificate management app 3*b* transmits the input data to the Web server 4. Receiving the data, the Web server 4 makes the certificate issuing server 5 issue a copyright certificate in reference to the received data, stores the issued copyright certificate, and then notifies the certificate management app 3*b* of completion of the issuance. Receiving this notification, the certificate management app 3*b* makes a pop-up display of an issuance completion screen C13 illustrated in FIG. 25. The issuance completion screen C13 is a screen for notifying the user of the issuance of the copyright certificate and inquiring of the user whether or not to proceed to the issuance of a usage right certificate. The issuance completion screen C13 includes a "YES" button and a "Not Now" button. Here, when the user depresses the "Not Now" button, the certificate management app 3*b* displays the initial screen D11 (certificate list screen D12) illustrated in FIG. 26. When the user depresses the "YES" button, on the other hand, the certificate management app 3*b* displays an information input screen D15 illustrated in FIG. 32. Details of the information input screen D15 will be described later.

When the user depresses a "cancel" button on the information input screen D14, the certificate management app 3*b* displays the initial screen D11 (certificate list screen D12) illustrated in FIG. 23 without transmitting the input data. In this case, the processing is ended without the copyright certificate being issued.

Figure 26:
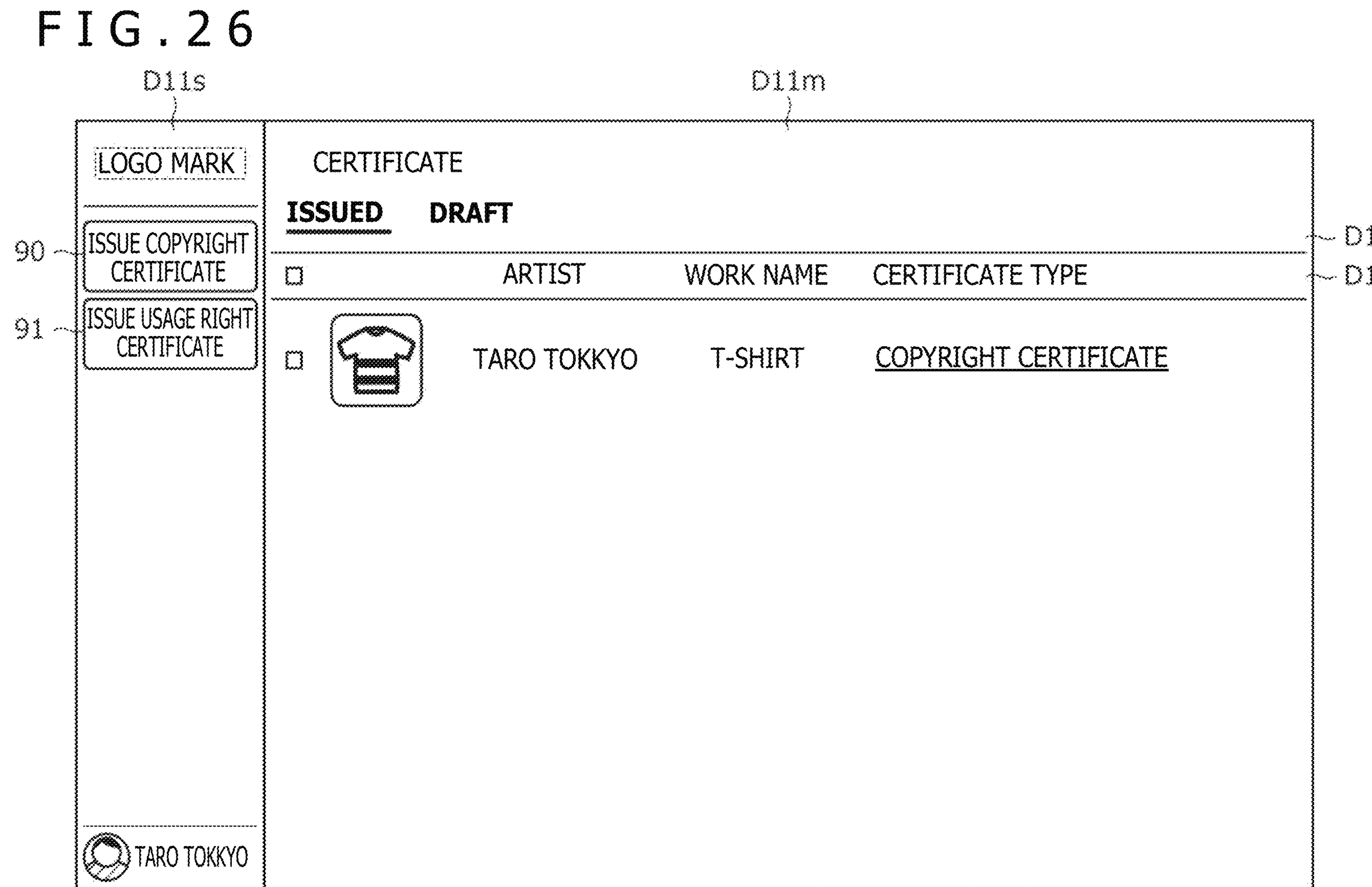
FIG. 26 is a diagram illustrating the initial screen D11 of the certificate management app 3*b* (state in which one copyright certificate is issued).

As is understood by making a comparison between the certificate list screen D12 illustrated in FIG. 26 and the certificate list screen D12 illustrated in FIG. 23, one copyright certificate is added to the list on the certificate list screen D12 illustrated in FIG. 26. Specifically, there is added a row which includes the icon of the artwork A2, the name of the artist who produced the artwork A2, the name (title) of the work, and information indicating the copyright certificate. In addition, the information indicating the copyright certificate is provided with a hyperlink to the address of the corresponding certificate within the Web server 4. When the certificate management app 3*b* thus additionally displays the copyright certificate within the certificate list screen D12, the user can confirm the issued copyright certificate and download the copyright certificate from the Web server 4.

FIG. 27 and FIG. 28 are a sequence diagram illustrating processing in a case where the user depresses the "YES" button within the confirmation screen C11 illustrated in FIG. 24. As illustrated in FIG. 27, detecting the depression of the "YES" button within the confirmation screen C11, the certificate management app 3*b* converts a detected watermark into a character string (S60), and transmits the character string to the Web server 4 (S61).

Receiving the character string from the certificate management app 3*b*, the Web server 4 regards the character string as the DID of the project, and attempts to obtain the VC (VC stored at S35 in FIG. 14) and the DID document (DID document stored at S27 in FIG. 13) of the corresponding project (S62). Then, the Web server 4 determines whether or not the VC and the DID document are obtained (S63). When the VC and the DID document are not obtained, the Web server 4 transmits authentication NG to the certificate management app 3*b* (S64). When the VC and the DID document are obtained, on the other hand, the Web server 4 further obtains the public key (public key stored at S3 in FIG. 12) of the logged-in user (S65).

Obtaining the public key of the user, the Web server 4 extracts an electronic signature from the VC of the project obtained at S62, and attempts to decrypt the electronic signature by the obtained public key of the user (S66). Then, the Web server 4 determines whether or not the electronic signature is decrypted (S67). When the electronic signature is not decrypted, the Web server 4 transmits authentication NG to the certificate management app 3*b* (S68). When the electronic signature is decrypted, on the other hand, the Web server 4 transmits authentication OK to the certificate management app 3*b* (S69). Incidentally, it suffices for the Web server 4 to make the determination at S37 by determining whether or not a value obtained by the decryption at S66 and the hash value of the DID document obtained at S62 are equal to each other.

The processing of S60 to S69 described thus far can confirm with high accuracy that the logged-in user is the artist himself/herself who produced the artwork A2. That is, being able to decrypt the electronic signature stored in the VC of the project by the public key of the logged-in user means that the user is the person himself/herself who created the project. Further, it can be said that only the artist who produced the artwork A1 and the artwork A2 can create the project including not only the artwork A2 but also the artwork A1 in process of creation that is not distributed. Hence, it can be said that the logged-in user is the artist himself/herself who produced the artwork A2. When necessary, it is also possible to make the personal identification with higher accuracy by confirming the signature with use of the hash value of the FSS of the user stored in the DID document of the project.

Thereafter, the certificate management app 3*b* and the Web server 4 may perform S70 to S81 illustrated in FIG. 27 and FIG. 28. Processing in S70 to S81 is similar to the processing in S60 to S69 except that an object from which a watermark is to be extracted is the file F1*w*. However, as for S70 to S81, S70 of making the user select the file F1*w* and S71 of determining whether or not the watermark can be detected from the file F1*w* are also illustrated. Processing similar to S70 and S71 is, in practice, performed also for the file F2*w* before S60. Performing S70 to S81 makes it possible to confirm more reliably that the logged-in user is the artist himself/herself who produced the artwork A2.

The certificate management app 3*b* determines whether or not a result of the personal identification of the artist based on the watermark is authentication OK as a result of each item of processing described above (S82). In a case where S70 to S81 are not performed, a result of this determination is authentication OK when the certificate management app 3*b* receives the authentication OK at S69. Otherwise, the determination result is authentication NG. In a case where S70 to S81 are performed, on the other hand, the determination result is authentication OK when the certificate management app 3*b* receives the authentication OK in both of S69 and S81. Otherwise, the determination result is authentication NG. When determining the authentication OK at S82, the certificate management app 3*b* erases the confirmation screen C11 illustrated in FIG. 24 and displays the confirmation screen C12 illustrated in FIG. 24 (S83). On the other hand, when determining the authentication NG, the certificate management app 3*b* only erases the confirmation screen C11 illustrated in FIG. 24. The processing is then ended.

Figure 29:
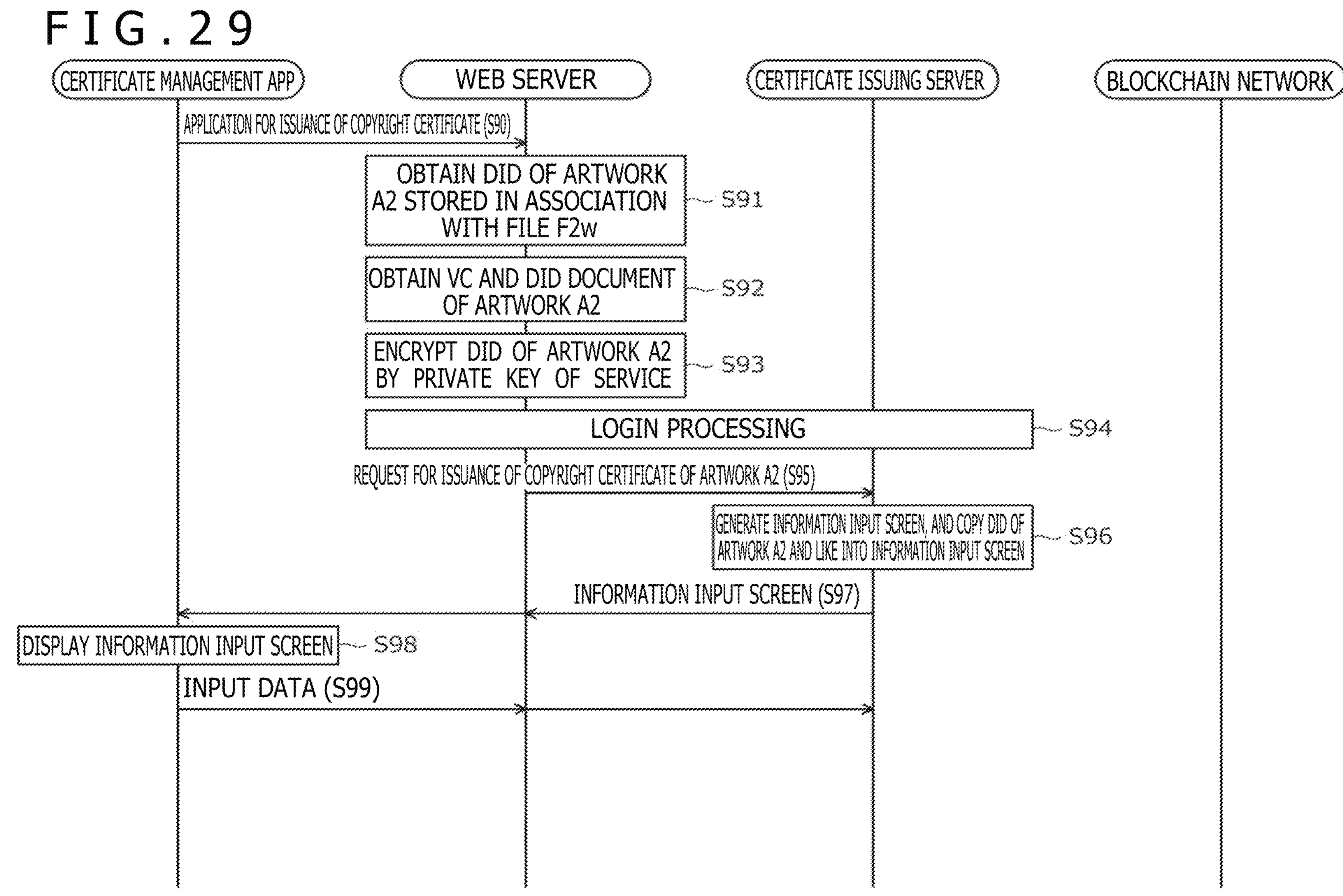
FIG. 29 is a sequence diagram illustrating processing in a case where the user depresses a "YES" button within a confirmation screen C12 illustrated in FIG. 24.

FIG. 29 and FIG. 30 are a sequence diagram illustrating processing in a case where the user depresses the "YES" button within the confirmation screen C12 illustrated in FIG. 24. As illustrated in FIG. 29, detecting the depression of the "YES" button within the confirmation screen C12, the certificate management app 3*b* transmits an application for the issuance of a copyright certificate to the Web server 4 (S90). This issuance application includes the file F2*w* selected by the user.

Receiving the issuance application, the Web server 4 first obtains the DID of the artwork A2 stored in association with the file F2*w* (S91). Then, in reference to the obtained DID of the artwork A2, the Web server 4 obtains the VC (VC stored at S54 in FIG. 20) and the DID document (DID document stored at S47 in FIG. 19) of the artwork A2 (S92). The Web server 4 also encrypts the DID of the artwork A2 by the private key of a service (private key constituting a key pair issued to the Web server 4 in advance) (S93).

Next, the Web server 4 performs predetermined login processing with the certificate issuing server 5 (S94), and thereafter transmits a request for the issuance of a copyright certificate of the artwork A2 to the certificate issuing server 5 (S95). This issuance request can include the user information of the logged-in user, the DID, the DID document, and the VC of the artwork A2, and the DID of the artwork A2 encrypted at S93.

Receiving the issuance request, the certificate issuing server 5 generates the information input screen D14 illustrated in FIG. 25 and copies a part of the data included in the issuance request into the information input screen D14 (S96). In an example, the certificate issuing server 5 copies the name of the user into the "artist name" field, copies the title of the project into the "work name" field, copies the DID of the artwork A2 into the "free description (English)" field, and copies information related to the license condition (license condition set by the user on the project registration screen D4*c* illustrated in FIG. 8) into the "free description (Japanese)" field. Then, the certificate issuing server 5 transmits the information input screen D14 including the copied information to the certificate management app 3*b* via the Web server 4 (S97).

The certificate management app 3*b* displays the received information input screen D14 (S98) and receives an input made by the user. Then, when the user depresses the "complete" button illustrated in FIG. 25, the certificate management app 3*b* transmits the data (input data) input to the information input screen D14 at this point in time to the certificate issuing server 5 via the Web server 4 (S99). Receiving the thus transmitted input data, the certificate issuing server 5 generates an NFT (hereinafter referred to as a "copyright NFT") including the input data and the VC of the artwork A2, as illustrated in FIG. 30 (S100). Then, the certificate issuing server 5 generates a transaction indicating that the copyright NFT is generated for the wallet address of the user and issues the transaction to the blockchain network 7 (S101). When the recording of the issued transaction on the blockchain is completed, the blockchain network 7 issues a token ID (token ID of the copyright NFT of the artwork A2) (S102). In response to the issuance of the token ID, the certificate issuing server 5 issues the copyright certificate of the artwork A2 (S103).

FIG. 31 is a diagram illustrating an example of a configuration of the copyright certificate of the artwork A2 issued by the certificate issuing server 5 at S103. As illustrated in the figure, the copyright certificate of the artwork A2 can include the token ID of the copyright NFT, the wallet address of the logged-in user as an owner of the copyright NFT, an issuance date and time, the DID of the artwork A2 encrypted by the private key of the service, and the data input on the information input screen D14 illustrated in FIG. 25.

Described with reference to FIG. 30 again, the certificate issuing server 5 transmits the issued copyright certificate of the artwork A2 to the Web server 4 (S104). The Web server 4 adds the received copyright certificate to a certificate list (S105), and then transmits an issuance completion notification to the certificate management app 3*b* (S106). Receiving the issuance completion notification, the certificate management app 3*b* displays the issuance completion screen C13 illustrated in FIG. 25 (S107). Then, when the user depresses the "Not Now" button on the issuance completion screen C13, the certificate management app 3*b* obtains the certificate list from the Web server 4 (S108), and thereafter displays the certificate list screen D12 including the obtained certificate list within the main screen D11*m*, as illustrated in FIG. 26 (S108). When the user thereafter depresses a hyperlink to the copyright certificate of the artwork A2 included in the certificate list, a download instruction is transmitted from the certificate management app 3*b* to the Web server 4 (S110). In response to this, the copyright certificate of the artwork A2 is transmitted from the Web server 4 to the certificate management app 3*b* (S112).

As described thus far, according to the artwork management system 1 of the present embodiment, only the person who has the file F2*w*, that is, the artist himself/herself who produced the artwork A2, can issue the copyright NFT and the copyright certificate of the artwork A2. In addition, information necessary for obtaining the artwork A2 is described in the copyright certificate. Thus, presenting the copyright certificate together with the artwork A2 makes it possible to verify that the person who presents the copyright certificate is the artist himself/herself who produced the artwork. Further, the information input by the user on the information input screen D14 is described in the copyright certificate. Thus, referring to the copyright certificate makes it possible to confirm the information concerning the artist, the license condition, and the like.

Processing for Issuing Usage Right Certificate of Artwork A2

Figure 32:
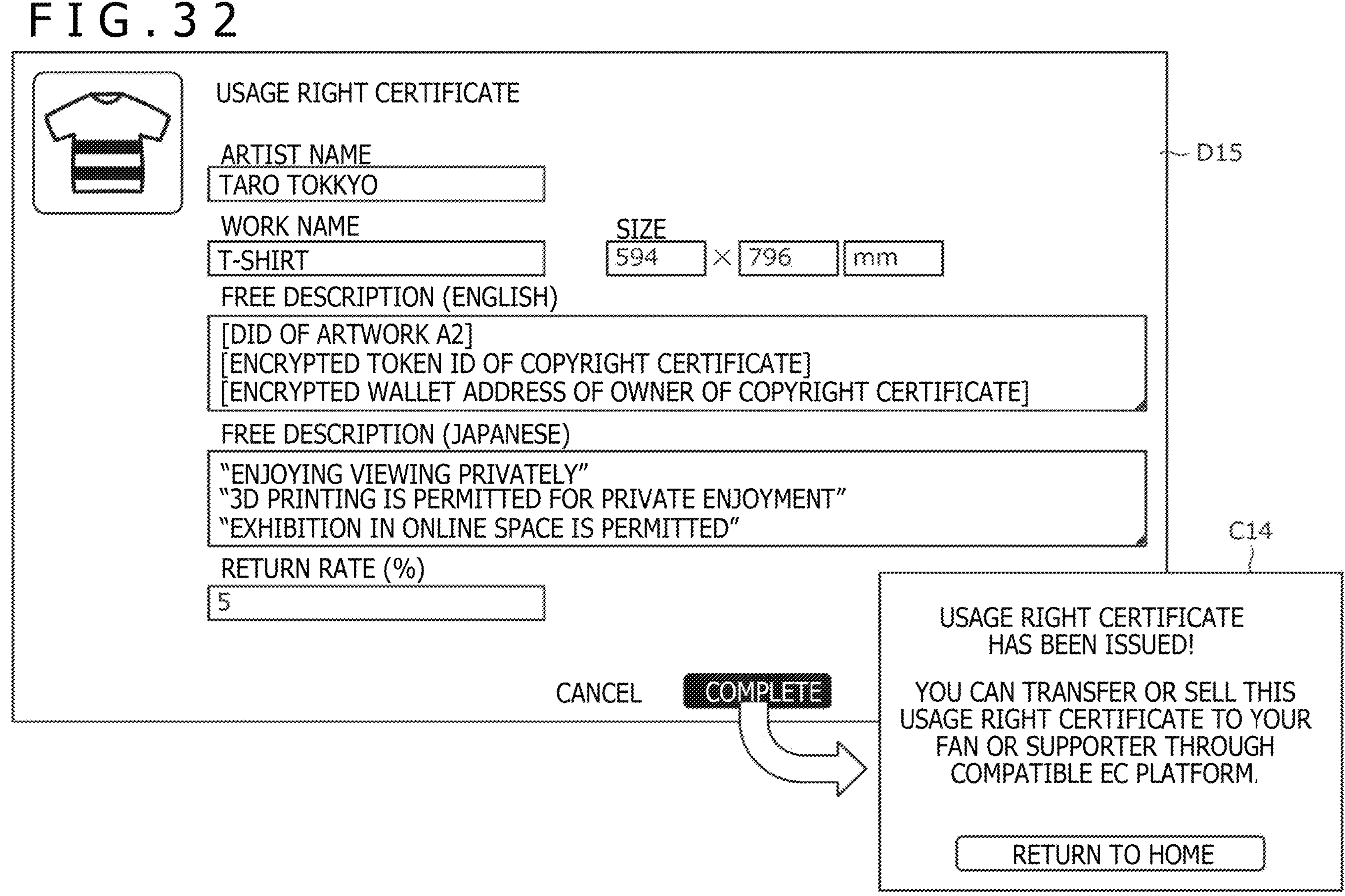
FIG. 32 is a diagram illustrating an information input screen D15 for allowing the user to input or confirm information to be entered in a usage right certificate.
Figure 33:
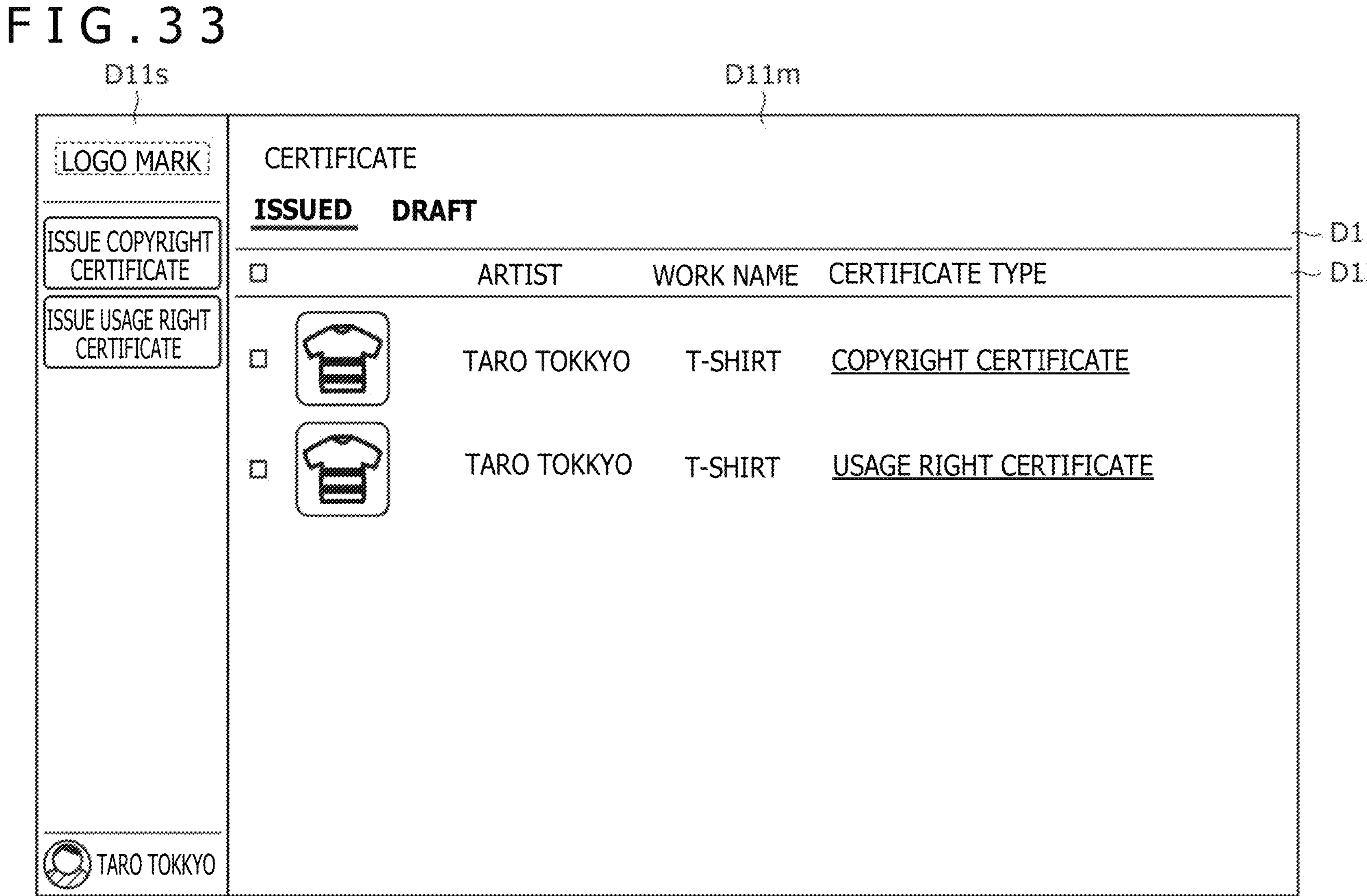
FIG. 33 is a diagram illustrating the initial screen D11 of the certificate management app 3*b* (state in which one copyright certificate and one usage right certificate are issued).

FIG. 32 and FIG. 33 are an example of screens of the certificate management app 3*b* displayed on the display of the user terminal 3 when a usage right certificate of the artwork A2 is to be issued. FIG. 32 represents a screen displayed when the user depresses the "YES" button on the issuance completion screen C13 illustrated in FIG. 25. Incidentally, it is possible to issue the usage right certificate from the usage right certificate issuance menu 91 illustrated in FIG. 23 and FIG. 26. However, the certificate management app 3*b* in this case displays the screen illustrated in FIG. 32 after making the user select the corresponding copyright certificate, as will be described later with reference to FIG. 34.

When the user depresses the "YES" button on the issuance completion screen C13 illustrated in FIG. 25, the certificate management app 3*b* files an application for the issuance of the usage right certificate of the artwork A2 with the Web server 4. As will be described later in detail, receiving the application for the issuance of the usage right certificate, the Web server 4 makes the certificate issuing server 5 generate the information input screen D15 illustrated in FIG. 32, receives the information input screen D15 from the certificate issuing server 5, and transfers the information input screen D15 to the certificate management app 3*b*.

The information input screen D15 is a screen for allowing the user to input or confirm information to be entered in the usage right certificate. As illustrated in FIG. 32, as in the case of the copyright certificate, the information input screen D15 includes respective input fields for the name of the artist, the name of the work, the size of the artwork, a free description (English), a free description (Japanese), and a return rate. The certificate issuing server 5 copies contents similar to those of the copyright certificate into the input fields in advance. However, the certificate issuing server 5 further adds, to the input field of the free description (English), the token ID of the copyright certificate and the wallet address of the owner of the copyright certificate that are each encrypted by the private key of the service. Incidentally, there is no particular limitation on the number of usage right certificates to be issued. Thus, the user can issue a plurality of usage right certificates including different license conditions and different return rates by changing the contents of respective input fields on the information input screen as appropriate. In addition, the user can also enter a condition for permitting the transfer of a usage right on the information input screen D15. This will be described later in detail with reference to FIG. 37.

When the user depresses a "complete" button within the information input screen D15 after making a necessary entry or correction in each of the input fields of the screen, the certificate management app 3*b* transmits the input data to the Web server 4. Receiving the data, the Web server 4 makes the certificate issuing server 5 issue the usage right certificate in reference to the received data, stores the issued usage right certificate, and then notifies the certificate management app 3*b* of completion of the issuance. Receiving this notification, the certificate management app 3*b* makes a pop-up display of an issuance completion screen C14 illustrated in FIG. 32. The issuance completion screen C14 is a screen for notifying the user of the issuance of the usage right certificate. The issuance completion screen C14 includes a "return to home" button. When the user depresses the "return to home" button, the certificate management app 3*b* displays the initial screen D11 (certificate list screen D12) illustrated in FIG. 33.

When the user depresses a "cancel" button on the information input screen D15, the certificate management app 3*b* displays the initial screen D11 (certificate list screen D12) illustrated in FIG. 26 without transmitting the input data. In this case, the processing is ended without the usage right certificate being issued.

As is understood by making a comparison between the certificate list screen D12 illustrated in FIG. 33 and the certificate list screen D12 illustrated in FIG. 26, one usage right certificate is added to the list on the certificate list screen D12 illustrated in FIG. 33. A specific method for displaying the usage right certificate within the certificate list screen D12 is similar to a method for displaying the copyright certificate which is described with reference to FIG. 26. When the certificate management app 3*b* thus additionally displays the usage right certificate within the certificate list screen D12, the user can confirm the issued usage right certificate and download the usage right certificate from the Web server 4.

Figure 35:
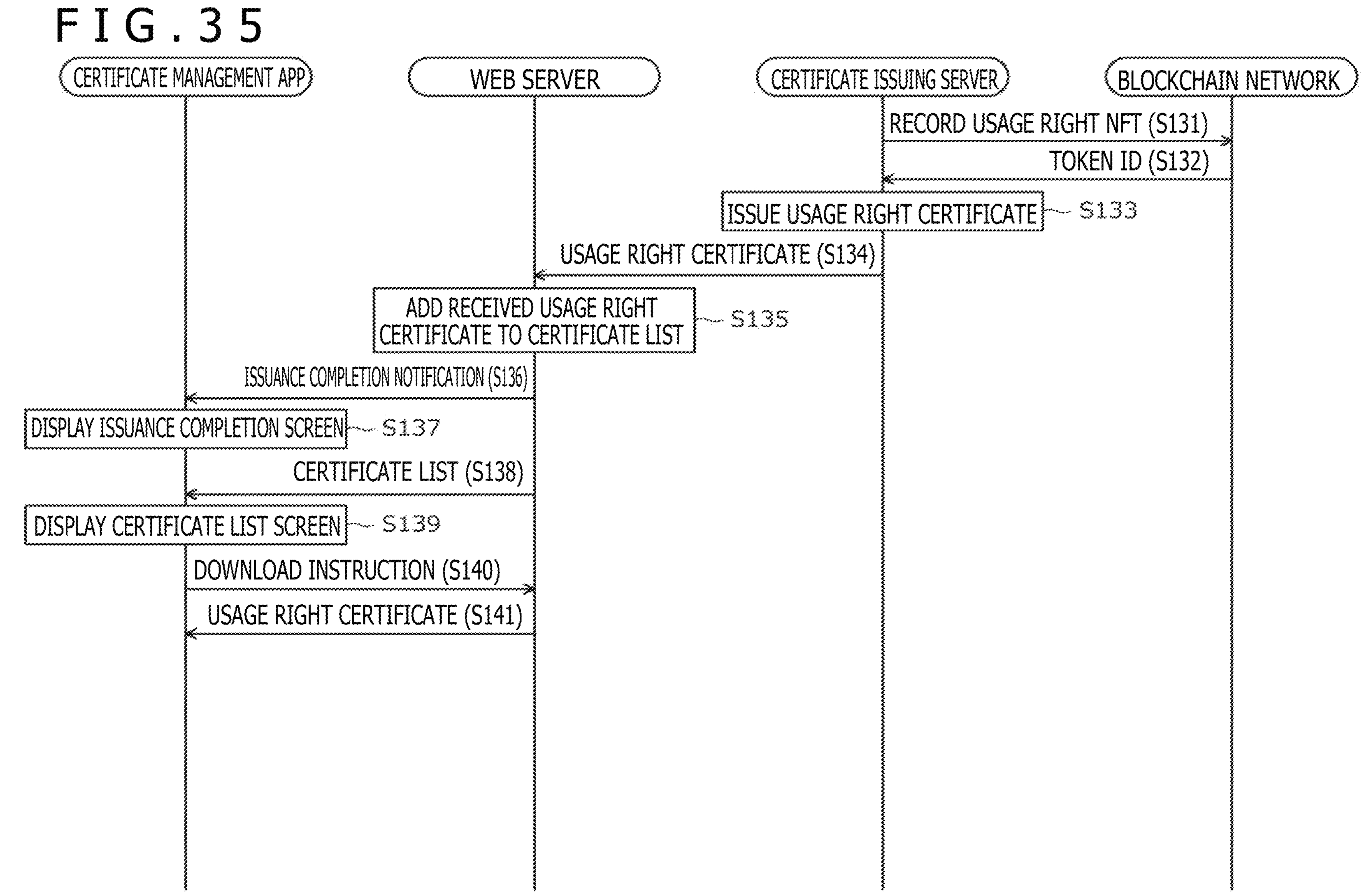
FIG. 35 is a sequence diagram illustrating the processing in the case where the user depresses the usage right certificate issuance menu 91 within the initial screen D11 illustrated in FIG. 26.

FIG. 34 and FIG. 35 are a sequence diagram illustrating processing in a case where the user depresses the usage right certificate issuance menu 91 within the initial screen D11 illustrated in FIG. 26. As illustrated in FIG. 34, detecting the depression of the usage right certificate issuance menu 91, the certificate management app 3*b* first makes the user select a copyright certificate, by displaying a copyright certificate selection screen (S120). Supposing here that the user selects the copyright certificate of the artwork A2 (S121), the certificate management app 3*b* transmits an application for the issuance of a usage right certificate of the artwork A2 to the Web server 4 (S122). Incidentally, in a case where the processing related to the issuance of the usage right certificate is started when the user depresses the "YES" button within the issuance completion screen C13 illustrated in FIG. 25, the certificate management app 3*b* omits S120 and S121 and starts the processing from S122.

Receiving the issuance application, the Web server 4 obtains the DID of the artwork A2, obtains the token ID and the wallet address of the owner from the copyright certificate, and encrypts each of the DID of the artwork A2, the token ID, and the wallet address of the owner by the private key of the service (S123). Then, the Web server 4 performs predetermined login processing with the certificate issuing server 5 (S124), and thereafter transmits a request for the issuance of the usage right certificate of the artwork A2 to the certificate issuing server 5 (S125). This issuance request can include the corresponding copyright certificate and each piece of data encrypted at S123.

Receiving the issuance request, the certificate issuing server 5 generates the information input screen D15 illustrated in FIG. 32, and copies a part of the data included in the issuance request into the information input screen D15 (S120). In an example, each piece of data included in the copyright certificate is copied into the respective corresponding input field, and the token ID and the wallet address of the owner of the copyright certificate encrypted at S123 are added to the "free description (English)" field. Then, the certificate issuing server 5 transmits the information input screen D15 including the entered information to the certificate management app 3*b* via the Web server 4 (S127).

The certificate management app 3*b* displays the received information input screen D15 (S128), and receives an input made by the user. Then, when the user depresses the "complete" button illustrated in FIG. 32, the certificate management app 3*b* transmits the data (input data) input to the information input screen D15 at this point in time to the certificate issuing server 5 via the Web server 4 (S129). Receiving the thus transmitted input data, the certificate issuing server 5 generates an NFT (hereinafter referred to as a "usage right NFT") including the input data and the VC of the artwork A2 (S130). Then, as illustrated in FIG. 35, the certificate issuing server 5 generates a transaction indicating that the usage right NFT is generated for the wallet address of the user and issues the transaction to the blockchain network 7 (S131). When the recording of the generated transaction on the blockchain is completed, the blockchain network 7 issues a token ID (token ID of the usage right NFT of the artwork A2) (S132). In response to the issuance of the token ID, the certificate issuing server 5 issues the usage right certificate of the artwork A2 (S133).

FIG. 36 is a diagram illustrating an example of a configuration of the usage right certificate of the artwork A2 issued by the certificate issuing server 5 at S133. As illustrated in the figure, the usage right certificate of the artwork A2 can include the token ID of usage right NFT, the wallet address of the logged-in user as an owner of the usage right NFT, an issuance date and time, the DID of the artwork A2 and the token ID of the copyright certificate and the wallet address of the owner of the copyright certificate that are each encrypted by the private key of the service, and the data input on the information input screen D15 illustrated in FIG. 32.

Described with reference to FIG. 35 again, the certificate issuing server 5 transmits the issued usage right certificate of the artwork A2 to the Web server 4 (S134). The Web server 4 adds the received usage right certificate to the certificate list (S135), and then transmits an issuance completion notification to the certificate management app 3*b* (S136). Receiving the issuance completion notification, the certificate management app 3*b* displays the issuance completion screen C14 illustrated in FIG. 32 (S137). Then, when the user depresses the "return to home" button on the issuance completion screen C14, the certificate management app 3*b* obtains the certificate list from the Web server 4 (S138), and thereafter displays the certificate list screen D12 including the obtained certificate list within the main screen D11*m*, as illustrated in FIG. 33 (S139). When the user thereafter depresses a hyperlink to the usage right certificate of the artwork A2 included in the certificate list, a download instruction is transmitted from the certificate management app 3*b* to the Web server 4 (S140). In response to this, the usage right certificate of the artwork A2 is transmitted from the Web server 4 to the certificate management app 3*b* (S141).

As described thus far, according to the artwork management system 1 of the present embodiment, only the person who has the copyright certificate of the artwork A2, that is, the artist himself/herself who produced the artwork A2, can issue the usage right NFT and the usage right certificate of the artwork A2. In addition, information necessary for obtaining the artwork A2 is described in the usage right certificate. Thus, presenting the usage right certificate together with the artwork A2 makes it possible to verify that the usage right certificate is produced by the artist himself/herself. Further, the information input by the user on the information input screen D15 is described in the usage right certificate. Therefore, referring to the usage right certificate makes it possible to confirm the contents of the usage right, a transfer condition, and the like.

Processing for Transferring Usage Right of Artwork

FIG. 37 is a sequence diagram illustrating processing in a case where the usage right of the artwork A2 is transferred from a certain user to another user. The certificate management app 3*b* illustrated in the figure is installed on a terminal of a user who intends to obtain the usage right of the artwork A2 anew (which will hereinafter be referred to as an "applicant").

The applicant accesses the Web server 4 from the certificate management app 3*b* of the applicant himself/herself, and searches for the artwork A2 desired to be used (S150). When the applicant then finds the artwork A2, the applicant identifies one of one or more usage right certificates corresponding to the artwork A2 which one is desired to be transferred, and transmits a usage application including the identified usage right certificate to the Web server 4 (S151). The usage application includes also the user information of the applicant.

Receiving the usage application, the Web server 4 checks the contents of the identified usage right certificate, and determines whether or not a condition for permitting the transfer is satisfied (S152). For example, in a case where metadata included in the usage right certificate includes such a limitation that "transfer is possible only once," it is determined that the condition is satisfied when this transfer is a first transfer, and it is determined that the condition is not satisfied when this transfer is a second transfer. In addition, in a case where the metadata included in the usage right certificate includes such a limitation that "transfer is possible only within six months of the issuance date and time," for example, it is determined that the condition is satisfied when the date and time of this transfer is within six months of the issuance date and time, and it is determined that the condition is not satisfied when the date and time of this transfer is not within six months of the issuance date and time. Incidentally, it suffices for the Web server 4 to make these determinations by referring to an owner history (to be described later) described in the usage right certificate. In addition, at S152, the Web server 4 may inquire of the owner described in the usage right certificate whether or not to permit the transfer, and reflect a result of the inquiry in the determination result.

When determining that the condition is not satisfied in the determination of S152, the Web server 4 transmits a non-permission notification to the certificate management app 3*b* that transmitted the usage application (S153). The processing is then ended. On the other hand, when determining that the condition is satisfied, the Web server 4 transmits a usage right transfer instruction for the artwork A2 to the certificate issuing server 5 (S154). This usage right transfer instruction includes the usage right certificate to be transferred and the wallet address of the user as a transfer destination.

Receiving the usage right transfer instruction for the artwork A2, the certificate issuing server 5 identifies the usage right NFT to be transferred, by obtaining the token ID in the usage right certificate. Then, the certificate issuing server 5 generates a transaction indicating the transfer of the identified usage right NFT (transaction of transfer from the wallet address of the original owner to the wallet address of the applicant), and issues the transaction to the blockchain network 7 (S155). When the recording of the issued transaction on the blockchain is completed, the blockchain network 7 issues a transaction ID (S156). In response to the issuance of the transaction ID, the certificate issuing server 5 updates the usage right certificate of the artwork A2 (S157).

FIG. 38 is a diagram illustrating an example of a configuration of the usage right certificate that has been updated at S157. As illustrated in the figure, the certificate issuing server 5 rewrites the wallet address of the owner with the wallet address of the applicant, and adds the wallet address of the original owner as an owner history to the usage right certificate together with information indicating a transfer date and time. Incidentally, the certificate issuing server 5 preferably adds an owner history each time transfer is performed. This makes it possible to check a transfer history by viewing the usage right certificate. In addition, the transaction ID issued at S156 may also be described in the usage right certificate.

The description returns to FIG. 37. The certificate issuing server 5 that has updated the usage right certificate transmits the updated usage right certificate to the Web server 4 (S158). Receiving this usage right certificate, the Web server 4 deletes the usage right certificate that has not yet been updated from the certificate list of the original owner (S159). Consequently, the original owner becomes unable to download the usage right certificate. In addition, the Web server 4 adds the received updated usage right certificate to the certificate list of the applicant (S160), and notifies the applicant of the completion of the transfer to the certificate management app 3*b* (S161). Consequently, the applicant becomes able to download the updated usage right certificate.

As described thus far, according to the artwork management system 1 of the present embodiment, the usage right certificate of the artwork included in the registered project can be transferred to a third party.

As described above, according to the artwork management system 1 of the present embodiment, a person who can issue the copyright NFT and the usage right NFT can be limited to the artist himself/herself who produced the artwork. Hence, it is possible to prevent the NFT conversion of the digital artwork by a person who does not have a legitimate right.

In addition, the watermark generated in reference to the DID of the project is embedded in the artwork A1 and the artwork A2. Thus, it can be confirmed by using the watermark embedded in the artwork A1 and the artwork A2 that a person who intends to issue the copyright NFT and the usage right NFT is the artist himself/herself who produced the artwork.

In addition, the artwork A1 that is not to be distributed is included in the project. Thus, the artist himself/herself can be identified on the basis of whether or not the artist retains the artwork A1.

In addition, at a time of registration of the project and at a time of additional registration of artwork, authentication is performed by use of the electronic signature and the biometric signature data. It is thus possible to ensure that the person who registered the project and additionally registered the artwork is the artist himself/herself.

In addition, the copyright certificate is issued so as to correspond to the copyright NFT, and the usage right certificate is issued so as to correspond to the usage right NFT. It is thus possible to verify the copyright and transfer the usage right by using these certificates.

In addition, the DID of the artwork is included in each of the copyright certificate and the usage right certificate. It is thus possible to obtain the data of the artwork via the DID document of the artwork by referring to the copyright certificate or the usage right certificate.

In addition, the information entered by the user is included in each of the copyright certificate and the usage right certificate. It is thus possible to know the information concerning the artist and the license condition as well as the transfer condition with regard to the usage right certificate by referring to the copyright certificate or the usage right certificate. In addition, whether or not transfer is possible can be determined automatically by using the transfer condition.

A preferred embodiment of the present disclosure has been described above. However, the present disclosure is not at all limited to such an embodiment, and the present disclosure can naturally be carried out in various modes without departing from the spirit of the present disclosure.

DESCRIPTION OF REFERENCE SYMBOLS

1: Artwork management system
2: Network
3: User terminal
3*a:* Project management app
3*b:* Certificate management app
4: Web server
5: Certificate issuing server
6: Distributed file system
7: Blockchain network
10: Registration button
11, 14, 80, 83: Login button
12, 81: Email address input field
13, 82: Password input field
20: Usage application menu
21: Usage right certificate menu
22: Project menu
23: New project button
24, 26, 32, 51, 102: Icon
25: Upload button
30, 70, 101: Drop region
31, 71, 100: File selection button
40: License condition setting region
41, 52: License condition list display region
50: Project basic information display section
60, 72: Signature region
61, 73: Download button
90: Copyright certificate issuance menu
91: Usage right certificate issuance menu
1000: Computer
1002: Storage device
1003: Input device
1004: Output device
1005: Communicating device
1006: Bus
A1, A2: Artwork
C1, C10: Login screen
C2, C5: Registration completion screen
C3: File selection screen
C4: Signature screen
C5: Registration completion screen
C11, C12: Confirmation screen
C13, C14: Issuance completion screen D1: Start screen of project management app 3*a*
D2: Initial screen of project management app 3*a*
D2*m:* Main screen
D2*s:* Side menu screen
D3: Project management screen
D4*a* to D4*e:* Project registration screen
D5: Project detail screen
D10: Start screen of certificate management app 3*b*
D11: Initial screen of certificate management app 3*b*
D11*m:* Main screen
D11*s:* Side menu screen
D12: Certificate list screen
D13: File selection screen
D14, D15: Information input screen
F1: File constituting artwork A1
F1*w:* File constituting artwork A1 in which watermark is embedded
F2: File constituting artwork A2
F2*w:* File constituting artwork A2 in which watermark is embedded
P: Pen The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of authentication, comprising:
receiving a selection of a first artwork in which a watermark is embedded;
authenticating, in reference to the watermark and information concerning a user who selects the first artwork, whether or not the user is an artist of the first artwork;
generating a first Non-Fungible Token indicating the first artwork when the authenticating succeeds;
receiving a second artwork;
generating a project including the first artwork and the second artwork; and
generating Verifiable Credentials of the project, the Verifiable Credentials including a first electronic signature generated by encrypting an identifier of a Decentralized Identity document of the project by a private key of the artist of the first artwork,
wherein authentication of the user who selects the first artwork is considered to have succeeded when the first electronic signature is able to be decrypted by a public key of the user, and the authenticating is considered to have failed when the first electronic signature is not able to be decrypted by the public key of the user.

2. The method according to claim 1, further comprising:
issuing a transaction indicating that the first Non-Fungible Token is generated for an address of the user to a blockchain network in a case where the first Non-Fungible Token is generated.

3. The method according to claim 1, further comprising:
receiving an input of a second electronic signature of the artist of the first artwork; and
receiving signature data representing a signature entered by the user,
wherein the project is generated when validity of both the second electronic signature and the signature data is confirmed, and
wherein the project is not generated when validity of at least one of the second electronic signature and the signature data is not confirmed.

4. The method according to claim 1, further comprising:
issuing a first certificate including a token Identity of the first Non-Fungible Token and a Decentralized Identity identifying a Decentralized Identity document of the first artwork.

5. The method according to claim 4, further comprising:
generating a second Non-Fungible Token representing the first artwork in a case where the first certificate is issued.

6. The method according to claim 5, further comprising:
issuing a transaction indicating that the second Non-Fungible Token is generated for an address of the user to a blockchain network in a case where the second Non-Fungible Token is generated.

7. The method according to claim 5, further comprising:
issuing a second certificate including the token Identity of the first Non-Fungible Token, the Decentralized Identity identifying the Decentralized Identity document of the first artwork, a token Identity of the second Non-Fungible Token, and an address of the user, in response to issuance of the token Identity of the second Non-Fungible Token.

8. The method according to claim 7, wherein
the token Identity of the first Non-Fungible Token and the address of the user are arranged within the second certificate, in a state of being encrypted by a private key of a service.

9. The method according to claim 7, further comprising:
issuing a transaction indicating a transfer of the second certificate to a blockchain network.

10. The method according to claim 1, wherein
a watermark embedded in the first artwork is generated in reference to a first Decentralized Identity indicating the first artwork.

11. The method according to claim 4, wherein
the first certificate includes information entered by the user.

12. The method according to claim 7, wherein
the second certificate includes information entered by the user.

13. A computer, comprising:
a processor; and
a memory storing instructions that, when executed by the processor, cause the computer to:
receive a selection of a first artwork in which a watermark is embedded;
authenticate, in reference to the watermark and information concerning a user who selects the first artwork, whether or not the user is an artist of the first artwork;
generate a first Non-Fungible Token indicating the first artwork when the authenticating succeeds;
receive a second artwork; and
generate a project including the first artwork and the second artwork;

generate Verifiable Credentials of the project, the Verifiable Credentials including a first electronic signature generated by encrypting an identifier of a Decentralized Identity document of the project by a private key of the artist of the first artwork, wherein authentication of the user who selects the first artwork is considered to have succeeded when the first electronic signature is able to be decrypted by a public key of the user, and the authenticating is considered to have failed when the first electronic signature is not able to be decrypted by the public key of the user.

14. The computer according to claim 13, wherein the instructions, when executed by the processor, cause the computer to:

issue a transaction indicating that the first Non-Fungible Token is generated for an address of the user to a blockchain network in a case where the first Non-Fungible Token is generated.

15. The computer according to claim 13, wherein the instructions, when executed by the processor, cause the computer to:

receive an input of a second electronic signature of the artist of the first artwork; and receive signature data representing a signature entered by the user, wherein the project is generated when validity of both the second electronic signature and the signature data is confirmed, and the project is not generated when validity of at least one of the second electronic signature and the signature data is not confirmed.

16. A non-transitory computer-readable medium storing a program that, when executed by a computer, causes the computer to:

receive a selection of a first artwork in which a watermark is embedded;

authenticate, in reference to the watermark and information concerning a user who selects the first artwork, whether or not the user is an artist of the first artwork;

generate a first Non-Fungible Token indicating the first artwork when the authenticating succeeds;

receive a second artwork;

generate a project including the first artwork and the second artwork; and generate Verifiable Credentials of the project, the Verifiable Credentials including a first electronic signature generated by encrypting an identifier of a Decentralized Identity document of the project by a private key of the artist of the first artwork, wherein authentication of the user who selects the first artwork is considered to have succeeded when the first electronic signature is able to be decrypted by a public key of the user, and the authenticating is considered to have failed when the first electronic signature is not able to be decrypted by the public key of the user.

17. The computer-readable medium according to claim 16, wherein the program, when executed by the computer, causes the computer to:

issue a transaction indicating that the first Non-Fungible Token is generated for an address of the user to a blockchain network in a case where the first Non-Fungible Token is generated.

18. The computer-readable medium according to claim 16, wherein the program, when executed by the computer, causes the computer to;

receive an input of a second electronic signature of the artist of the first artwork; and receive signature data representing a signature entered by the user, wherein the project is generated when validity of both the second electronic signature and the signature data is confirmed, wherein the project is not generated when validity of at least one of the second electronic signature and the signature data is not confirmed.

* * * * *